(12) United States Patent
Bataineh et al.

(10) Patent No.: US 12,450,177 B2
(45) Date of Patent: Oct. 21, 2025

(54) DYNAMIC BUFFER MANAGEMENT IN DATA-DRIVEN INTELLIGENT NETWORK

(71) Applicant: Hewlett Packard Enterprise Development LP, Houston, TX (US)

(72) Inventors: Abdulla M. Bataineh, Vista, CA (US); Timothy J. Johnson, Sun Prairie, WI (US); Jonathan P. Beecroft, Bristol (GB)

(73) Assignee: Hewlett Packard Enterprise Development LP, Spring, TX (US)

( * ) Notice: Subject to any disclaimer, the term of this patent is extended or adjusted under 35 U.S.C. 154(b) by 95 days.

(21) Appl. No.: 17/594,780

(22) PCT Filed: Mar. 23, 2020

(86) PCT No.: PCT/US2020/024239
§ 371 (c)(1),
(2) Date: Oct. 29, 2021

(87) PCT Pub. No.: WO2020/236267
PCT Pub. Date: Nov. 26, 2020

(65) Prior Publication Data
US 2022/0200923 A1 Jun. 23, 2022

Related U.S. Application Data

(60) Provisional application No. 62/852,273, filed on May 23, 2019, provisional application No. 62/852,203, (Continued)

(51) Int. Cl.
*G06F 13/16* (2006.01)
*G06F 9/50* (2006.01)
(Continued)

(52) U.S. Cl.
CPC .......... *G06F 13/1642* (2013.01); *G06F 9/505* (2013.01); *G06F 9/546* (2013.01);
(Continued)

(58) Field of Classification Search
None
See application file for complete search history.

(56) References Cited

U.S. PATENT DOCUMENTS

| 4,807,118 A | 2/1989 | Lin et al. |
| 5,138,615 A | 8/1992 | Lamport et al. |

(Continued)

FOREIGN PATENT DOCUMENTS

| CN | 101729609 A | 6/2010 |
| CN | 102932203 A | 2/2013 |

(Continued)

OTHER PUBLICATIONS

International Search Report and Written Opinion received for PCT Patent Application No. PCT/US20/24340, mailed on Oct. 26, 2020, 9 pages.

(Continued)

*Primary Examiner* — Chirag G Shah
*Assistant Examiner* — Suk Jin Kang
(74) *Attorney, Agent, or Firm* — Dickinson Wright

(57) ABSTRACT

Systems and methods for dynamic buffer management in switches that facilitate a data-driven intelligent networking system are provided. The system can accommodate dynamic traffic with fast, effective congestion control while providing efficient use of internal input buffer space.

21 Claims, 20 Drawing Sheets

Related U.S. Application Data filed on May 23, 2019, provisional application No. 62/852,289, filed on May 23, 2019.

(51) Int. Cl.

| | |
|---|---|
| G06F 9/54 | (2006.01) |
| G06F 12/0862 | (2016.01) |
| G06F 12/1036 | (2016.01) |
| G06F 12/1045 | (2016.01) |
| G06F 13/14 | (2006.01) |
| G06F 13/28 | (2006.01) |
| G06F 13/38 | (2006.01) |
| G06F 13/40 | (2006.01) |
| G06F 13/42 | (2006.01) |
| G06F 15/173 | (2006.01) |
| H04L 1/00 | (2006.01) |
| H04L 43/0876 | (2022.01) |
| H04L 43/10 | (2022.01) |
| H04L 45/00 | (2022.01) |
| H04L 45/02 | (2022.01) |
| H04L 45/021 | (2022.01) |
| H04L 45/028 | (2022.01) |
| H04L 45/12 | (2022.01) |
| H04L 45/122 | (2022.01) |
| H04L 45/125 | (2022.01) |
| H04L 45/16 | (2022.01) |
| H04L 45/24 | (2022.01) |
| H04L 45/42 | (2022.01) |
| H04L 45/745 | (2022.01) |
| H04L 47/10 | (2022.01) |
| H04L 47/11 | (2022.01) |
| H04L 47/12 | (2022.01) |
| H04L 47/122 | (2022.01) |
| H04L 47/20 | (2022.01) |
| H04L 47/22 | (2022.01) |
| H04L 47/24 | (2022.01) |
| H04L 47/2441 | (2022.01) |
| H04L 47/2466 | (2022.01) |
| H04L 47/2483 | (2022.01) |
| H04L 47/30 | (2022.01) |
| H04L 47/32 | (2022.01) |
| H04L 47/34 | (2022.01) |
| H04L 47/52 | (2022.01) |
| H04L 47/62 | (2022.01) |
| H04L 47/625 | (2022.01) |
| H04L 47/6275 | (2022.01) |
| H04L 47/629 | (2022.01) |
| H04L 47/76 | (2022.01) |
| H04L 47/762 | (2022.01) |
| H04L 47/78 | (2022.01) |
| H04L 47/80 | (2022.01) |
| H04L 49/00 | (2022.01) |
| H04L 49/101 | (2022.01) |
| H04L 49/15 | (2022.01) |
| H04L 49/90 | (2022.01) |
| H04L 49/9005 | (2022.01) |
| H04L 49/9047 | (2022.01) |
| H04L 67/1097 | (2022.01) |
| H04L 69/22 | (2022.01) |
| H04L 69/40 | (2022.01) |
| H04L 45/28 | (2022.01) |
| H04L 45/7453 | (2022.01) |
| H04L 69/28 | (2022.01) |

(52) U.S. Cl.
CPC ...... *G06F 12/0862* (2013.01); *G06F 12/1036* (2013.01); *G06F 12/1063* (2013.01); *G06F 13/14* (2013.01); *G06F 13/16* (2013.01); *G06F 13/1673* (2013.01); *G06F 13/28* (2013.01); *G06F 13/385* (2013.01); *G06F 13/4022* (2013.01); *G06F 13/4068* (2013.01); *G06F 13/4221* (2013.01); *G06F 15/17331* (2013.01); *H04L 1/0083* (2013.01); *H04L 43/0876* (2013.01); *H04L 43/10* (2013.01); *H04L 45/02* (2013.01); *H04L 45/021* (2013.01); *H04L 45/028* (2013.01); *H04L 45/122* (2013.01); *H04L 45/123* (2013.01); *H04L 45/125* (2013.01); *H04L 45/16* (2013.01); *H04L 45/20* (2013.01); *H04L 45/22* (2013.01); *H04L 45/24* (2013.01); *H04L 45/38* (2013.01); *H04L 45/42* (2013.01); *H04L 45/46* (2013.01); *H04L 45/566* (2013.01); *H04L 45/70* (2013.01); *H04L 45/745* (2013.01); *H04L 47/11* (2013.01); *H04L 47/12* (2013.01); *H04L 47/122* (2013.01); *H04L 47/18* (2013.01); *H04L 47/20* (2013.01); *H04L 47/22* (2013.01); *H04L 47/24* (2013.01); *H04L 47/2441* (2013.01); *H04L 47/2466* (2013.01); *H04L 47/2483* (2013.01); *H04L 47/30* (2013.01); *H04L 47/32* (2013.01); *H04L 47/323* (2013.01); *H04L 47/34* (2013.01); *H04L 47/39* (2013.01); *H04L 47/52* (2013.01); *H04L 47/621* (2013.01); *H04L 47/6235* (2013.01); *H04L 47/626* (2013.01); *H04L 47/6275* (2013.01); *H04L 47/629* (2013.01); *H04L 47/76* (2013.01); *H04L 47/762* (2013.01); *H04L 47/781* (2013.01); *H04L 47/80* (2013.01); *H04L 49/101* (2013.01); *H04L 49/15* (2013.01); *H04L 49/30* (2013.01); *H04L 49/3009* (2013.01); *H04L 49/3018* (2013.01); *H04L 49/3027* (2013.01); *H04L 49/90* (2013.01); *H04L 49/9005* (2013.01); *H04L 49/9021* (2013.01); *H04L 49/9036* (2013.01); *H04L 49/9047* (2013.01); *H04L 67/1097* (2013.01); *H04L 69/22* (2013.01); *H04L 69/40* (2013.01); *G06F 13/1689* (2013.01); *G06F 2212/50* (2013.01); *G06F 2213/0026* (2013.01); *G06F 2213/3808* (2013.01); *H04L 45/28* (2013.01); *H04L 45/7453* (2013.01); *H04L 69/28* (2013.01)

(56) References Cited

U.S. PATENT DOCUMENTS

| | | |
|---|---|---|
| 5,457,687 A | 10/1995 | Newman |
| 5,937,436 A | 8/1999 | Watkins |
| 5,960,178 A | 9/1999 | Cochinwala et al. |
| 5,970,232 A | 10/1999 | Passint et al. |
| 5,983,332 A | 11/1999 | Watkins |
| 6,112,265 A | 8/2000 | Harriman et al. |
| 6,230,252 B1 | 5/2001 | Passint et al. |
| 6,246,682 B1 | 6/2001 | Roy et al. |
| 6,493,347 B2 | 12/2002 | Sindhu et al. |
| 6,545,981 B1 | 4/2003 | Garcia et al. |
| 6,633,580 B1 | 10/2003 | Toerudbakken et al. |
| 6,674,720 B1 | 1/2004 | Passint et al. |
| 6,714,553 B1 | 3/2004 | Poole et al. |
| 6,728,211 B1 | 4/2004 | Peris et al. |
| 6,732,212 B2 | 5/2004 | Sugahara et al. |
| 6,735,173 B1 | 5/2004 | Lenoski et al. |
| 6,894,974 B1 | 5/2005 | Aweya et al. |
| 7,023,856 B1 | 4/2006 | Washabaugh et al. |

(56) References Cited

U.S. PATENT DOCUMENTS

| | | |
|---|---|---|
| 7,133,940 B2 | 11/2006 | Blightman et al. |
| 7,218,637 B1 | 5/2007 | Best et al. |
| 7,269,180 B2 | 9/2007 | Bly et al. |
| 7,305,487 B2 | 12/2007 | Blumrich et al. |
| 7,337,285 B2 | 2/2008 | Tanoue |
| 7,397,797 B2 | 7/2008 | Alfieri et al. |
| 7,430,559 B2 | 9/2008 | Lomet |
| 7,441,006 B2 | 10/2008 | Biran et al. |
| 7,464,174 B1 | 12/2008 | Ngai |
| 7,483,442 B1 | 1/2009 | Torudbakken et al. |
| 7,562,168 B1 * | 7/2009 | Yifrach .................. H04L 47/30 710/52 |
| 7,562,366 B2 | 7/2009 | Pope et al. |
| 7,593,329 B2 | 9/2009 | Kwan et al. |
| 7,596,628 B2 | 9/2009 | Aloni et al. |
| 7,620,791 B1 | 11/2009 | Wentzlaff et al. |
| 7,633,869 B1 | 12/2009 | Morris et al. |
| 7,639,616 B1 | 12/2009 | Manula et al. |
| 7,734,894 B1 | 6/2010 | Wentzlaff et al. |
| 7,774,461 B2 | 8/2010 | Tanaka et al. |
| 7,782,869 B1 | 8/2010 | Chitlur Srinivasa |
| 7,796,579 B2 | 9/2010 | Bruss |
| 7,856,026 B1 | 12/2010 | Finan et al. |
| 7,933,282 B1 | 4/2011 | Gupta et al. |
| 7,953,002 B2 | 5/2011 | Opsasnick |
| 7,975,120 B2 | 7/2011 | Sabbatini, Jr. et al. |
| 8,014,278 B1 | 9/2011 | Subramanian et al. |
| 8,023,521 B2 | 9/2011 | Woo et al. |
| 8,050,180 B2 | 11/2011 | Judd |
| 8,077,606 B1 | 12/2011 | Litwack |
| 8,103,788 B1 * | 1/2012 | Miranda ............... G06F 13/385 709/224 |
| 8,160,085 B2 | 4/2012 | Voruganti et al. |
| 8,175,107 B1 | 5/2012 | Yalagandula et al. |
| 8,249,072 B2 | 8/2012 | Sugumar et al. |
| 8,281,013 B2 | 10/2012 | Mundkur et al. |
| 8,352,727 B2 | 1/2013 | Chen et al. |
| 8,353,003 B2 | 1/2013 | Noehring et al. |
| 8,443,151 B2 | 5/2013 | Tang et al. |
| 8,473,783 B2 | 6/2013 | Andrade et al. |
| 8,543,534 B2 | 9/2013 | Alves et al. |
| 8,619,793 B2 | 12/2013 | Lavian et al. |
| 8,626,957 B2 | 1/2014 | Blumrich et al. |
| 8,650,582 B2 | 2/2014 | Archer et al. |
| 8,706,832 B2 | 4/2014 | Blocksome |
| 8,719,543 B2 | 5/2014 | Kaminski et al. |
| 8,811,183 B1 | 8/2014 | Anand et al. |
| 8,948,175 B2 | 2/2015 | Bly et al. |
| 8,971,345 B1 * | 3/2015 | McCanne ........... H04L 47/2441 370/412 |
| 9,001,663 B2 | 4/2015 | Attar et al. |
| 9,053,012 B1 | 6/2015 | Northcott et al. |
| 9,088,496 B2 | 7/2015 | Vaidya et al. |
| 9,094,327 B2 | 7/2015 | Jacobs et al. |
| 9,178,782 B2 | 11/2015 | Matthews et al. |
| 9,208,071 B2 | 12/2015 | Talagala et al. |
| 9,218,278 B2 | 12/2015 | Talagala et al. |
| 9,231,876 B2 | 1/2016 | Mir et al. |
| 9,231,888 B2 | 1/2016 | Bogdanski et al. |
| 9,239,804 B2 | 1/2016 | Kegel et al. |
| 9,269,438 B2 | 2/2016 | Nachimuthu et al. |
| 9,276,864 B1 | 3/2016 | Pradeep |
| 9,436,651 B2 | 9/2016 | Underwood et al. |
| 9,455,915 B2 | 9/2016 | Sinha et al. |
| 9,460,178 B2 | 10/2016 | Bashyam et al. |
| 9,479,426 B2 | 10/2016 | Munger et al. |
| 9,496,991 B2 | 11/2016 | Plamondon et al. |
| 9,544,234 B1 | 1/2017 | Markine |
| 9,548,924 B2 | 1/2017 | Pettit et al. |
| 9,594,521 B2 | 3/2017 | Blagodurov et al. |
| 9,635,121 B2 | 4/2017 | Mathew et al. |
| 9,742,855 B2 | 8/2017 | Shuler et al. |
| 9,762,488 B2 | 9/2017 | Previdi et al. |
| 9,762,497 B2 | 9/2017 | Kishore et al. |
| 9,830,273 B2 | 11/2017 | Bk et al. |
| 9,838,500 B1 | 12/2017 | Ilan et al. |
| 9,853,900 B1 | 12/2017 | Mula et al. |
| 9,887,923 B2 | 2/2018 | Chorafakis et al. |
| 10,003,544 B2 | 6/2018 | Liu et al. |
| 10,009,270 B1 | 6/2018 | Stark et al. |
| 10,031,857 B2 | 7/2018 | Menachem et al. |
| 10,050,896 B2 | 8/2018 | Yang et al. |
| 10,061,613 B1 | 8/2018 | Brooker et al. |
| 10,063,481 B1 | 8/2018 | Jiang et al. |
| 10,089,220 B1 | 10/2018 | Mckelvie et al. |
| 10,169,060 B1 | 1/2019 | Vincent et al. |
| 10,178,035 B2 | 1/2019 | Dillon |
| 10,200,279 B1 | 2/2019 | Aljaedi |
| 10,218,634 B2 | 2/2019 | Aldebert et al. |
| 10,270,700 B2 | 4/2019 | Burnette et al. |
| 10,305,772 B2 | 5/2019 | Zur et al. |
| 10,331,590 B2 | 6/2019 | Macnamara et al. |
| 10,353,833 B2 | 7/2019 | Hagspiel et al. |
| 10,454,835 B2 | 10/2019 | Contavalli et al. |
| 10,498,672 B2 | 12/2019 | Graham et al. |
| 10,567,307 B2 | 2/2020 | Fairhurst et al. |
| 10,728,173 B1 | 7/2020 | Agrawal et al. |
| 10,802,828 B1 | 10/2020 | Volpe et al. |
| 10,817,502 B2 | 10/2020 | Talagala et al. |
| 11,128,561 B1 | 9/2021 | Matthews et al. |
| 11,271,869 B1 | 3/2022 | Agrawal et al. |
| 11,416,749 B2 | 8/2022 | Bshara et al. |
| 11,444,886 B1 | 9/2022 | Stawitzky et al. |
| 2001/0010692 A1 | 8/2001 | Sindhu et al. |
| 2001/0047438 A1 | 11/2001 | Forin |
| 2002/0174279 A1 | 11/2002 | Wynne et al. |
| 2003/0016808 A1 | 1/2003 | Hu et al. |
| 2003/0026267 A1 * | 2/2003 | Oberman ............... H04L 47/16 370/400 |
| 2003/0041168 A1 | 2/2003 | Musoll |
| 2003/0110455 A1 | 6/2003 | Baumgartner et al. |
| 2003/0174711 A1 | 9/2003 | Shankar |
| 2003/0200363 A1 | 10/2003 | Futral |
| 2003/0223420 A1 | 12/2003 | Ferolito |
| 2004/0008716 A1 | 1/2004 | Stiliadis |
| 2004/0059828 A1 | 3/2004 | Hooper et al. |
| 2004/0095882 A1 | 5/2004 | Hamzah et al. |
| 2004/0133634 A1 | 7/2004 | Luke et al. |
| 2004/0223452 A1 | 11/2004 | Santos et al. |
| 2005/0021837 A1 | 1/2005 | Haselhorst et al. |
| 2005/0047334 A1 | 3/2005 | Paul et al. |
| 2005/0058130 A1 * | 3/2005 | Christ ................... H04L 47/16 370/389 |
| 2005/0088969 A1 | 4/2005 | Carlsen et al. |
| 2005/0091396 A1 | 4/2005 | Nilakantan et al. |
| 2005/0108444 A1 | 5/2005 | Flauaus et al. |
| 2005/0108518 A1 | 5/2005 | Pandya |
| 2005/0152274 A1 | 7/2005 | Simpson |
| 2005/0182854 A1 | 8/2005 | Pinkerton et al. |
| 2005/0270974 A1 | 12/2005 | Mayhew |
| 2005/0270976 A1 | 12/2005 | Yang et al. |
| 2006/0023705 A1 | 2/2006 | Zoranovic et al. |
| 2006/0050632 A1 * | 3/2006 | Griggs .................. H04L 47/16 370/229 |
| 2006/0056292 A1 * | 3/2006 | Mayhew ................ H04L 47/10 370/229 |
| 2006/0067347 A1 | 3/2006 | Naik et al. |
| 2006/0075480 A1 | 4/2006 | Noehring et al. |
| 2006/0174251 A1 | 8/2006 | Pope et al. |
| 2006/0203728 A1 | 9/2006 | Kwan et al. |
| 2007/0061433 A1 | 3/2007 | Reynolds et al. |
| 2007/0070901 A1 | 3/2007 | Aloni et al. |
| 2007/0198804 A1 | 8/2007 | Moyer |
| 2007/0211746 A1 * | 9/2007 | Oshikiri ............. G06F 13/4022 370/437 |
| 2007/0242611 A1 | 10/2007 | Archer et al. |
| 2007/0268825 A1 | 11/2007 | Corwin et al. |
| 2008/0013453 A1 | 1/2008 | Chiang et al. |
| 2008/0013549 A1 | 1/2008 | Okagawa et al. |
| 2008/0071757 A1 | 3/2008 | Ichiriu et al. |
| 2008/0084864 A1 | 4/2008 | Archer et al. |
| 2008/0091915 A1 | 4/2008 | Moertl et al. |
| 2008/0147881 A1 | 6/2008 | Krishnamurthy et al. |
| 2008/0159138 A1 | 7/2008 | Shepherd et al. |

(56) References Cited

U.S. PATENT DOCUMENTS

| | | |
|---|---|---|
| 2008/0189522 A1* | 8/2008 | Meil .................. G06F 9/52 712/E9.016 |
| 2008/0253289 A1 | 10/2008 | Naven et al. |
| 2009/0003212 A1 | 1/2009 | Kwan et al. |
| 2009/0010157 A1 | 1/2009 | Holmes et al. |
| 2009/0013175 A1 | 1/2009 | Elliott |
| 2009/0055496 A1 | 2/2009 | Garg et al. |
| 2009/0092046 A1 | 4/2009 | Naven et al. |
| 2009/0141621 A1 | 6/2009 | Fan et al. |
| 2009/0198958 A1 | 8/2009 | Arimilli et al. |
| 2009/0259713 A1 | 10/2009 | Blumrich et al. |
| 2009/0285222 A1 | 11/2009 | Hoover et al. |
| 2010/0061241 A1 | 3/2010 | Sindhu et al. |
| 2010/0169608 A1 | 7/2010 | Kuo et al. |
| 2010/0172260 A1 | 7/2010 | Kwan et al. |
| 2010/0183024 A1 | 7/2010 | Gupta |
| 2010/0220595 A1 | 9/2010 | Petersen |
| 2010/0274876 A1 | 10/2010 | Kagan et al. |
| 2010/0302942 A1 | 12/2010 | Shankar et al. |
| 2010/0316053 A1 | 12/2010 | Miyoshi et al. |
| 2011/0051724 A1 | 3/2011 | Scott et al. |
| 2011/0066824 A1 | 3/2011 | Bestler |
| 2011/0072179 A1 | 3/2011 | Lacroute et al. |
| 2011/0099326 A1 | 4/2011 | Jung et al. |
| 2011/0110383 A1 | 5/2011 | Yang et al. |
| 2011/0128959 A1 | 6/2011 | Bando et al. |
| 2011/0158096 A1 | 6/2011 | Leung et al. |
| 2011/0158248 A1 | 6/2011 | Vorunganti et al. |
| 2011/0164496 A1 | 7/2011 | Loh et al. |
| 2011/0173370 A1 | 7/2011 | Jacobs et al. |
| 2011/0264822 A1 | 10/2011 | Ferguson et al. |
| 2011/0276699 A1* | 11/2011 | Pedersen .................. H04L 47/24 709/227 |
| 2011/0280125 A1* | 11/2011 | Jayakumar ............ H04L 47/805 370/230 |
| 2011/0320724 A1 | 12/2011 | Mejdrich et al. |
| 2012/0093505 A1 | 4/2012 | Yeap et al. |
| 2012/0102506 A1 | 4/2012 | Hopmann et al. |
| 2012/0117423 A1 | 5/2012 | Andrade et al. |
| 2012/0137075 A1 | 5/2012 | Vorbach |
| 2012/0144064 A1 | 6/2012 | Parker et al. |
| 2012/0144065 A1 | 6/2012 | Parker et al. |
| 2012/0147752 A1 | 6/2012 | Ashwood-Smith et al. |
| 2012/0170462 A1 | 7/2012 | Sinha |
| 2012/0170575 A1 | 7/2012 | Mehra |
| 2012/0213118 A1 | 8/2012 | Lindsay et al. |
| 2012/0250512 A1 | 10/2012 | Jagadeeswaran et al. |
| 2012/0287821 A1 | 11/2012 | Godfrey et al. |
| 2012/0297083 A1 | 11/2012 | Ferguson et al. |
| 2012/0300669 A1 | 11/2012 | Zahavi |
| 2012/0314707 A1 | 12/2012 | Epps et al. |
| 2013/0010636 A1 | 1/2013 | Regula |
| 2013/0039169 A1 | 2/2013 | Schlansker et al. |
| 2013/0060944 A1 | 3/2013 | Archer et al. |
| 2013/0103777 A1 | 4/2013 | Kagan et al. |
| 2013/0121178 A1 | 5/2013 | Mainaud et al. |
| 2013/0136090 A1 | 5/2013 | Liu et al. |
| 2013/0182704 A1 | 7/2013 | Jacobs et al. |
| 2013/0194927 A1 | 8/2013 | Yamaguchi et al. |
| 2013/0203422 A1 | 8/2013 | Masputra et al. |
| 2013/0205002 A1 | 8/2013 | Wang et al. |
| 2013/0208593 A1 | 8/2013 | Nandagopal |
| 2013/0246552 A1 | 9/2013 | Underwood et al. |
| 2013/0290673 A1 | 10/2013 | Archer et al. |
| 2013/0301645 A1 | 11/2013 | Bogdanski et al. |
| 2013/0304988 A1 | 11/2013 | Totolos et al. |
| 2013/0311525 A1 | 11/2013 | Neerincx et al. |
| 2013/0329577 A1 | 12/2013 | Suzuki et al. |
| 2013/0336164 A1 | 12/2013 | Yang et al. |
| 2014/0019661 A1 | 1/2014 | Hormuth et al. |
| 2014/0032695 A1 | 1/2014 | Michels et al. |
| 2014/0036680 A1* | 2/2014 | Lih .................... H04L 47/6215 370/235 |
| 2014/0064082 A1 | 3/2014 | Yeung et al. |
| 2014/0095753 A1 | 4/2014 | Crupnicoff et al. |
| 2014/0098675 A1 | 4/2014 | Frost et al. |
| 2014/0119367 A1 | 5/2014 | Han et al. |
| 2014/0122560 A1 | 5/2014 | Ramey et al. |
| 2014/0129664 A1 | 5/2014 | Mcdaniel et al. |
| 2014/0133292 A1 | 5/2014 | Yamatsu et al. |
| 2014/0136646 A1 | 5/2014 | Tamir et al. |
| 2014/0169173 A1 | 6/2014 | Naouri et al. |
| 2014/0185621 A1 | 7/2014 | Decusatis et al. |
| 2014/0189174 A1* | 7/2014 | Ajanovic .................. G06F 5/06 710/106 |
| 2014/0207881 A1 | 7/2014 | Nussle et al. |
| 2014/0211804 A1 | 7/2014 | Makikeni et al. |
| 2014/0226488 A1 | 8/2014 | Shamis et al. |
| 2014/0241164 A1 | 8/2014 | Cociglio et al. |
| 2014/0258438 A1 | 9/2014 | Ayoub |
| 2014/0301390 A1 | 10/2014 | Scott et al. |
| 2014/0307554 A1 | 10/2014 | Basso et al. |
| 2014/0325013 A1 | 10/2014 | Tamir et al. |
| 2014/0328172 A1 | 11/2014 | Kumar et al. |
| 2014/0347997 A1 | 11/2014 | Bergamasco et al. |
| 2014/0362698 A1 | 12/2014 | Arad |
| 2014/0369360 A1 | 12/2014 | Carlstrom |
| 2014/0379847 A1 | 12/2014 | Williams |
| 2015/0003247 A1 | 1/2015 | Mejia et al. |
| 2015/0006849 A1 | 1/2015 | Xu et al. |
| 2015/0009823 A1* | 1/2015 | Ganga .................. H04L 47/2441 370/235 |
| 2015/0026361 A1 | 1/2015 | Matthews et al. |
| 2015/0029848 A1 | 1/2015 | Jain |
| 2015/0055476 A1 | 2/2015 | Decusatis et al. |
| 2015/0055661 A1 | 2/2015 | Boucher et al. |
| 2015/0067095 A1 | 3/2015 | Gopal et al. |
| 2015/0089495 A1 | 3/2015 | Persson et al. |
| 2015/0103667 A1 | 4/2015 | Elias et al. |
| 2015/0124826 A1 | 5/2015 | Edsall et al. |
| 2015/0146527 A1 | 5/2015 | Kishore et al. |
| 2015/0154004 A1 | 6/2015 | Aggarwal |
| 2015/0161064 A1 | 6/2015 | Pope |
| 2015/0180782 A1 | 6/2015 | Rimmer et al. |
| 2015/0186318 A1 | 7/2015 | Kim et al. |
| 2015/0193262 A1 | 7/2015 | Archer et al. |
| 2015/0195388 A1 | 7/2015 | Snyder et al. |
| 2015/0208145 A1 | 7/2015 | Parker et al. |
| 2015/0220449 A1 | 8/2015 | Stark et al. |
| 2015/0237180 A1 | 8/2015 | Swartzentruber et al. |
| 2015/0244617 A1 | 8/2015 | Nakil et al. |
| 2015/0244804 A1 | 8/2015 | Warfield et al. |
| 2015/0261434 A1 | 9/2015 | Kagan et al. |
| 2015/0263955 A1 | 9/2015 | Talaski et al. |
| 2015/0263994 A1 | 9/2015 | Haramaty et al. |
| 2015/0288626 A1 | 10/2015 | Aybay |
| 2015/0365337 A1 | 12/2015 | Pannell |
| 2015/0370586 A1 | 12/2015 | Cooper et al. |
| 2016/0006664 A1 | 1/2016 | Sabato et al. |
| 2016/0012002 A1 | 1/2016 | Arimilli et al. |
| 2016/0028613 A1 | 1/2016 | Haramaty et al. |
| 2016/0065455 A1 | 3/2016 | Wang et al. |
| 2016/0094450 A1 | 3/2016 | Ghanwani et al. |
| 2016/0134518 A1 | 5/2016 | Callon et al. |
| 2016/0134535 A1 | 5/2016 | Callon |
| 2016/0134559 A1 | 5/2016 | Abel et al. |
| 2016/0134573 A1 | 5/2016 | Gagliardi et al. |
| 2016/0142318 A1 | 5/2016 | Beecroft |
| 2016/0154756 A1 | 6/2016 | Dodson et al. |
| 2016/0182383 A1* | 6/2016 | Pedersen .................. H04L 45/24 709/226 |
| 2016/0205023 A1 | 7/2016 | Janardhanan |
| 2016/0226797 A1 | 8/2016 | Aravinthan et al. |
| 2016/0254991 A1 | 9/2016 | Eckert et al. |
| 2016/0259394 A1* | 9/2016 | Ragavan .................. H04L 49/00 |
| 2016/0283422 A1 | 9/2016 | Crupnicoff et al. |
| 2016/0285545 A1 | 9/2016 | Schmidtke et al. |
| 2016/0285677 A1 | 9/2016 | Kashyap et al. |
| 2016/0294694 A1 | 10/2016 | Parker et al. |
| 2016/0294926 A1 | 10/2016 | Zur et al. |
| 2016/0301610 A1 | 10/2016 | Amit et al. |
| 2016/0344620 A1 | 11/2016 | G. Santos et al. |
| 2016/0381189 A1 | 12/2016 | Caulfield et al. |
| 2017/0024263 A1 | 1/2017 | Verplanken |

(56) References Cited

U.S. PATENT DOCUMENTS

| | | |
|---|---|---|
| 2017/0039063 A1 | 2/2017 | Gopal et al. |
| 2017/0041239 A1 | 2/2017 | Goldenberg et al. |
| 2017/0048144 A1 | 2/2017 | Liu |
| 2017/0054633 A1 | 2/2017 | Underwood et al. |
| 2017/0091108 A1 | 3/2017 | Arellano et al. |
| 2017/0097840 A1 | 4/2017 | Bridgers |
| 2017/0103108 A1 | 4/2017 | Datta et al. |
| 2017/0118090 A1 | 4/2017 | Pettit et al. |
| 2017/0118098 A1 | 4/2017 | Littlejohn et al. |
| 2017/0153852 A1 | 6/2017 | Ma et al. |
| 2017/0177541 A1 | 6/2017 | Berman et al. |
| 2017/0220500 A1 | 8/2017 | Tong |
| 2017/0237654 A1 | 8/2017 | Turner et al. |
| 2017/0237671 A1* | 8/2017 | Rimmer ............... H04L 49/70 370/235 |
| 2017/0242753 A1 | 8/2017 | Sherlock et al. |
| 2017/0250914 A1 | 8/2017 | Caulfield et al. |
| 2017/0251394 A1 | 8/2017 | Johansson et al. |
| 2017/0270051 A1 | 9/2017 | Chen et al. |
| 2017/0272331 A1 | 9/2017 | Lissack |
| 2017/0272370 A1* | 9/2017 | Ganga ............... H04L 47/2441 |
| 2017/0286316 A1 | 10/2017 | Doshi et al. |
| 2017/0289066 A1 | 10/2017 | Haramaty et al. |
| 2017/0295098 A1 | 10/2017 | Watkins et al. |
| 2017/0324664 A1 | 11/2017 | Xu et al. |
| 2017/0371778 A1 | 12/2017 | Mckelvie et al. |
| 2018/0004705 A1 | 1/2018 | Menachem et al. |
| 2018/0019948 A1 | 1/2018 | Patwardhan et al. |
| 2018/0026878 A1 | 1/2018 | Zahavi et al. |
| 2018/0077064 A1 | 3/2018 | Wang |
| 2018/0083868 A1 | 3/2018 | Cheng |
| 2018/0097645 A1 | 4/2018 | Rajagopalan et al. |
| 2018/0097912 A1 | 4/2018 | Chumbalkar et al. |
| 2018/0113618 A1 | 4/2018 | Chan et al. |
| 2018/0115469 A1 | 4/2018 | Erickson et al. |
| 2018/0131602 A1 | 5/2018 | Civanlar et al. |
| 2018/0131678 A1 | 5/2018 | Agarwal et al. |
| 2018/0150374 A1 | 5/2018 | Ratcliff |
| 2018/0152317 A1 | 5/2018 | Chang et al. |
| 2018/0152357 A1 | 5/2018 | Natham et al. |
| 2018/0157604 A1* | 6/2018 | Tietz ............... G06F 13/4022 |
| 2018/0173557 A1 | 6/2018 | Nakil et al. |
| 2018/0183724 A1 | 6/2018 | Callard et al. |
| 2018/0191609 A1 | 7/2018 | Caulfield et al. |
| 2018/0198736 A1 | 7/2018 | Labonte et al. |
| 2018/0212876 A1 | 7/2018 | Bacthu et al. |
| 2018/0212902 A1 | 7/2018 | Steinmacher-Burow |
| 2018/0219804 A1 | 8/2018 | Graham et al. |
| 2018/0225238 A1 | 8/2018 | Karguth et al. |
| 2018/0234343 A1 | 8/2018 | Zdornov et al. |
| 2018/0254945 A1 | 9/2018 | Bogdanski et al. |
| 2018/0260324 A1 | 9/2018 | Marathe et al. |
| 2018/0278540 A1 | 9/2018 | Shalev et al. |
| 2018/0287928 A1 | 10/2018 | Levi et al. |
| 2018/0323898 A1 | 11/2018 | Dods |
| 2018/0335974 A1 | 11/2018 | Simionescu et al. |
| 2018/0341494 A1 | 11/2018 | Sood et al. |
| 2019/0007349 A1 | 1/2019 | Wang et al. |
| 2019/0018808 A1 | 1/2019 | Beard et al. |
| 2019/0036771 A1 | 1/2019 | Sharpless et al. |
| 2019/0042337 A1 | 2/2019 | Dinan et al. |
| 2019/0042518 A1* | 2/2019 | Marolia ............... G06F 13/4221 |
| 2019/0044809 A1 | 2/2019 | Willis et al. |
| 2019/0044827 A1 | 2/2019 | Ganapathi et al. |
| 2019/0044863 A1 | 2/2019 | Mula et al. |
| 2019/0044872 A1 | 2/2019 | Ganapathi et al. |
| 2019/0044875 A1 | 2/2019 | Murty et al. |
| 2019/0052327 A1 | 2/2019 | Motozuka et al. |
| 2019/0058663 A1 | 2/2019 | Song |
| 2019/0068501 A1 | 2/2019 | Schneider et al. |
| 2019/0081903 A1 | 3/2019 | Kobayashi et al. |
| 2019/0095134 A1 | 3/2019 | Li |
| 2019/0104057 A1 | 4/2019 | Goel et al. |
| 2019/0104206 A1 | 4/2019 | Goel et al. |
| 2019/0108106 A1 | 4/2019 | Aggarwal et al. |
| 2019/0108332 A1 | 4/2019 | Glew et al. |
| 2019/0109791 A1 | 4/2019 | Mehra et al. |
| 2019/0121781 A1* | 4/2019 | Kasichainula ...... H04L 12/4645 |
| 2019/0140979 A1 | 5/2019 | Levi et al. |
| 2019/0146477 A1 | 5/2019 | Cella et al. |
| 2019/0171612 A1 | 6/2019 | Shahar et al. |
| 2019/0196982 A1 | 6/2019 | Rozas et al. |
| 2019/0199646 A1 | 6/2019 | Singh et al. |
| 2019/0253354 A1* | 8/2019 | Caulfield ............... H04L 47/12 |
| 2019/0280978 A1 | 9/2019 | Schmatz et al. |
| 2019/0294575 A1 | 9/2019 | Dennison et al. |
| 2019/0306134 A1 | 10/2019 | Shanbhogue et al. |
| 2019/0332314 A1 | 10/2019 | Zhang et al. |
| 2019/0334624 A1 | 10/2019 | Bernard |
| 2019/0356611 A1* | 11/2019 | Das Sharma ......... H04L 47/527 |
| 2019/0361728 A1 | 11/2019 | Kumar et al. |
| 2019/0379610 A1 | 12/2019 | Srinivasan et al. |
| 2020/0036644 A1 | 1/2020 | Belogolovy et al. |
| 2020/0084150 A1 | 3/2020 | Burstein et al. |
| 2020/0145725 A1 | 5/2020 | Eberle et al. |
| 2020/0177505 A1 | 6/2020 | Li |
| 2020/0177521 A1* | 6/2020 | Blumrich ............ H04L 49/3036 |
| 2020/0259755 A1 | 8/2020 | Wang et al. |
| 2020/0272579 A1 | 8/2020 | Humphrey et al. |
| 2020/0274832 A1 | 8/2020 | Humphrey et al. |
| 2020/0334195 A1 | 10/2020 | Chen et al. |
| 2020/0349098 A1* | 11/2020 | Caulfield ................ G06F 9/505 |
| 2021/0081410 A1 | 3/2021 | Chavan et al. |
| 2021/0152494 A1 | 5/2021 | Johnsen et al. |
| 2021/0263779 A1 | 8/2021 | Haghighat et al. |
| 2021/0334206 A1 | 10/2021 | Colgrove et al. |
| 2021/0377156 A1 | 12/2021 | Michael et al. |
| 2021/0409351 A1* | 12/2021 | Das Sharma ......... G06F 13/385 |
| 2022/0131768 A1 | 4/2022 | Ganapathi et al. |
| 2022/0166705 A1 | 5/2022 | Froese |
| 2022/0200900 A1 | 6/2022 | Roweth |
| 2022/0210058 A1 | 6/2022 | Bataineh et al. |
| 2022/0217078 A1 | 7/2022 | Ford et al. |
| 2022/0217101 A1 | 7/2022 | Yefet et al. |
| 2022/0245072 A1 | 8/2022 | Roweth et al. |
| 2022/0278941 A1 | 9/2022 | Shalev et al. |
| 2022/0309025 A1 | 9/2022 | Chen et al. |
| 2023/0035420 A1* | 2/2023 | Sankaran ............ G06F 13/4221 |
| 2023/0046221 A1 | 2/2023 | Pismenny et al. |

FOREIGN PATENT DOCUMENTS

| | | |
|---|---|---|
| CN | 110324249 A | 10/2019 |
| CN | 110601888 A | 12/2019 |
| EP | 0275135 A2 | 7/1988 |
| EP | 2187576 A1 | 5/2010 |
| EP | 2219329 A1 | 8/2010 |
| EP | 2947832 A1 | 11/2015 |
| EP | 3445006 A1 | 2/2019 |
| JP | 2003-244196 A | 8/2003 |
| JP | 3459653 B2 | 10/2003 |
| KR | 10-2012-0062864 A | 6/2012 |
| KR | 10-2012-0082739 A | 7/2012 |
| KR | 10-2014-0100529 A | 8/2014 |
| KR | 10-2015-0026939 A | 3/2015 |
| KR | 10-2015-0104056 A | 9/2015 |
| KR | 10-2017-0110106 A | 10/2017 |
| KR | 10-1850749 B1 | 4/2018 |
| WO | 2001/069851 A2 | 9/2001 |
| WO | 02/47329 A2 | 6/2002 |
| WO | 2003/019861 A2 | 3/2003 |
| WO | 2004/001615 A1 | 12/2003 |
| WO | 2005/094487 A2 | 10/2005 |
| WO | 2007/034184 A2 | 3/2007 |
| WO | 2009/010461 A2 | 1/2009 |
| WO | 2009/018232 A1 | 2/2009 |
| WO | 2014/092780 A1 | 6/2014 |
| WO | 2014/137382 A1 | 9/2014 |
| WO | 2014/141005 A1 | 9/2014 |
| WO | 2018/004977 A1 | 1/2018 |

(56) References Cited

FOREIGN PATENT DOCUMENTS

| WO | 2018/046703 A1 | 3/2018 |
|----|----------------|--------|
| WO | 2019/072072 A1 | 4/2019 |

OTHER PUBLICATIONS

International Search Report and Written Opinion received for PCT Patent Application No. PCT/US20/24342, mailed on Oct. 27, 2020, 10 pages.

International Search Report and Written Opinion received for PCT Patent Application No. PCT/US2020/024192, mailed on Oct. 23, 2020, 9 pages.

International Search Report and Written Opinion received for PCT Patent Application No. PCT/US2020/024221, mailed on Oct. 26, 2020, 9 pages.

International Search Report cited in PCT/US2020/024170 mailed Dec. 16, 2020; 3 pages.

Maabi, S., et al.; "ERFAN: Efficient reconfigurable fault-tolerant deflection routing algorithm for 3-D Network-on-Chip"; Sep. 6-9, 2016.

Maglione-Mathey, G., et al.; "Scalable Deadlock-Free Deterministic Minimal-Path Routing Engine for InfiniBand-Based Dragonfly Networks"; Aug. 21, 2017; 15 pages.

Mamidala, A. R., et al.; "Efficient Barrier and Allreduce on Infiniband clusters using multicast and adaptive algorithms"; Sep. 20-23, 2004; 10 pages.

Mammeri, Z; "Reinforcement Learning Based Routing in Networks: Review and Classification of Approaches"; Apr. 29, 2019; 35 pages.

Mollah; M. A., et al.; "High Performance Computing Systems. Performance Modeling, Benchmarking, and Simulation: 8th International Workshop"; Nov. 13, 2017.

Open Networking Foundation; "OpenFlow Switch Specification"; Mar. 26, 2015; 283 pages.

Prakash, P., et al.; "The TCP Outcast Problem: Exposing Unfairness in Data Center Networks"; 2011; 15 pages.

Ramakrishnan, K., et al.; "The Addition of Explicit Congestion Notification (ECN) to IP"; Sep. 2001; 63 pages.

Roth, P. C., et al; "MRNet: A Software-Based Multicast/Reduction Network for Scalable Tools1"; Nov. 15-21, 2003; 16 pages.

Silveira, J., et al.; "Preprocessing of Scenarios for Fast and Efficient Routing Reconfiguration in Fault-Tolerant NoCs"; Mar. 4-6, 2015.

Tsunekawa, K .; "Fair bandwidth allocation among LSPs for AF class accommodating TCP and UDP traffic in a Diffserv-capable MPLS network"; Nov. 17, 2005; 9 pages.

Underwood, K.D., et al.; "A hardware acceleration unit for MPI queue processing"; Apr. 18, 2005; 10 pages.

Wu, J.; "Fault-tolerant adaptive and minimal routing in mesh-connected multicomputers using extended safety levels"; Feb. 2000; 11 pages.

Xiang, D., et al.; "Fault-Tolerant Adaptive Routing in Dragonfly Networks"; Apr. 12, 2017; 15 pages.

Xiang, D., et al.; "Deadlock-Free Broadcast Routing in Dragonfly Networks without Virtual Channels", submission to IEEE transactions on Parallel and Distributed Systems, 2015, 15 pages.

Ramakrishnan et al., RFC 3168, "The addition of Explicit Congestion Notification (ECN) to IP", Sep. 2001 (Year: 2001).

Awerbuch, B., et al.; "An On-Demand Secure Routing Protocol Resilient to Byzantine Failures"; Sep. 2002; 10 pages.

Belayneh L.W., et al.; "Method and Apparatus for Routing Data in an Inter-Nodal Communications Lattice of a Massively Parallel Computer System by Semi-Randomly Varying Routing Policies for Different Packets"; 2019; 3 pages.

Bhatele, A., et al.; "Analyzing Network Health and Congestion in Dragonfly-based Supercomputers"; May 23-27, 2016; 10 pages.

Blumrich, M.A., et al.; "Exploiting Idle Resources in a High-Radix Switch for Supplemental Storage"; Nov. 2018; 13 pages.

Chang, F., et al.; "PVW: Designing Vir PVW: Designing Virtual World Ser orld Server Infr er Infrastructur astructure"; 2010; 8 pages.

Chang, F., et al; "PVW: Designing Virtual World Server Infrastructure"; 2010; 8 pages.

Chen, F., et al.; "Requirements for RoCEv3 Congestion Management"; Mar. 21, 2019; 8 pages.

Cisco Packet Tracer; "packet-tracer;—ping"; https://www.cisco.com/c/en/us/td/docs/security/asa/asa-command-reference/I-R/cmdref2/p1.html; 2017.

Cisco; "Understanding Rapid Spanning Tree Protocol (802.1w)"; Aug. 1, 2017; 13 pages.

Eardley, Ed, P; "Pre-Congestion Notification (PCN) Architecture"; Jun. 2009; 54 pages.

Escudero-Sahuquillo, J., et al.; "Combining Congested-Flow Isolation and Injection Throttling in HPC Interconnection Networks"; Sep. 13-16, 2011; 3 pages.

Hong, Y.; "Mitigating the Cost, Performance, and Power Overheads Induced by Load Variations in Multicore Cloud Servers"; Fall 2013; 132 pages.

Huawei; "The Lossless Network For Data Centers"; Nov. 7, 2017; 15 pages.

International Search Report and Written Opinion received for PCT Application No. PCT/US2020/024248, mailed on Jul. 8, 2020, 11 pages.

International Search Report and Written Opinion received for PCT Application No. PCT/US20/024332, mailed on Jul. 8, 2020, 13 pages.

International Search Report and Written Opinion received for PCT Application No. PCT/US20/24243, mailed on Jul. 9, 2020, 10 pages.

International Search Report and Written Opinion received for PCT Application No. PCT/US20/24253, mailed on Jul. 6, 2020, 12 pages.

International Search Report and Written Opinion received for PCT Application No. PCT/US20/24256, mailed on Jul. 7, 2020, 11 pages.

International Search Report and Written Opinion received for PCT Application No. PCT/US20/24257, mailed on Jul. 7, 2020, 10 pages.

International Search Report and Written Opinion received for PCT Application No. PCT/US20/24258, mailed on Jul. 7, 2020, 9 pages.

International Search Report and Written Opinion received for PCT Application No. PCT/US20/24259, mailed on Jul. 9, 2020, 13 pages.

International Search Report and Written Opinion received for PCT Application No. PCT/US20/24260, mailed on Jul. 7, 2020, 11 pages.

International Search Report and Written Opinion received for PCT Application No. PCT/US20/24268, mailed on Jul. 9, 2020, 11 pages.

International Search Report and Written Opinion received for PCT Application No. PCT/US20/24269, mailed on Jul. 9, 2020, 11 pages.

International Search Report and Written Opinion received for PCT Application No. PCT/US20/24339, mailed on Jul. 8, 2020, 11 pages.

International Search Report and Written Opinion received for PCT Application No. PCT/US2020/024125, mailed on Jul. 10, 2020, 5 pages.

International Search Report and Written Opinion received for PCT Application No. PCT/US2020/024129, mailed on Jul. 10, 2020, 11 pages.

International Search Report and Written Opinion received for PCT Application No. PCT/US2020/024237, mailed on Jul. 14, 2020, 5 pages.

International Search Report and Written Opinion received for PCT Application No. PCT/US2020/024241, mailed on Jul. 14, 2020, 13 pages.

International Search Report and Written Opinion received for PCT Application No. PCT/US2020/024242, mailed on Jul. 6, 2020, 11 pages.

(56) References Cited

OTHER PUBLICATIONS

International Search Report and Written Opinion received for PCT Application No. PCT/US2020/024244, mailed on Jul. 13, 2020, 10 pages.
International Search Report and Written Opinion received for PCT Application No. PCT/US2020/024245, mailed on Jul. 14, 2020, 11 pages.
International Search Report and Written Opinion received for PCT Application No. PCT/US2020/024246, mailed on Jul. 14, 2020, 10 pages.
International Search Report and Written Opinion received for PCT Application No. PCT/US2020/024250, mailed on Jul. 14, 2020, 12 pages.
International Search Report and Written Opinion received for PCT Application No. PCT/US2020/024254, mailed on Jul. 13, 2020, 10 pages.
International Search Report and Written Opinion received for PCT Application No. PCT/US2020/024262, mailed on Jul. 13, 2020, 10 pages.
International Search Report and Written Opinion received for PCT Application No. PCT/US2020/024266, mailed on Jul. 9, 2020, 10 pages.
International Search Report and Written Opinion received for PCT Application No. PCT/US2020/024270, mailed on Jul. 10, 2020, 13 pages.
International Search Report and Written Opinion received for PCT Application No. PCT/US2020/024271, mailed on Jul. 9, 2020, 10 pages.
International Search Report and Written Opinion received for PCT Application No. PCT/US2020/024272, mailed on Jul. 9, 2020, 10 pages.
International Search Report and Written Opinion received for PCT Application No. PCT/US2020/024276, mailed on Jul. 13, 2020, 9 pages.
International Search Report and Written Opinion received for PCT Application No. PCT/US2020/024304, mailed on Jul. 15, 2020, 11 pages.
International Search Report and Written Opinion received for PCT Application No. PCT/US2020/024311, mailed on Jul. 17, 2020, 8 pages.
International Search Report and Written Opinion received for PCT Application No. PCT/US2020/024321, mailed on Jul. 9, 2020, 9 pages.
International Search Report and Written Opinion received for PCT Application No. PCT/US2020/024324, mailed on Jul. 14, 2020, 10 pages.
International Search Report and Written Opinion received for PCT Application No. PCT/US2020/024327, mailed on Jul. 10, 2020, 15 pages.
International Search Report and Written Opinion received for PCT Application No. PCT/US2020/24158, mailed on Jul. 6, 2020, 18 pages.
International Search Report and Written Opinion received for PCT Application No. PCT/US2020/24251, mailed on Jul. 6, 2020, 11 pages.
International Search Report and Written Opinion received for PCT Application No. PCT/US2020/24267, mailed on Jul. 6, 2020, 9 pages.
International Search Report and Written Opinion received for PCT Patent Application No. PCT/US20/24303, mailed on Oct. 21, 2020, 9 pages.
International Search Report and Written Opinion received for PCT Application No. PCT/US2020/024239, mailed on Jul. 14, 2020, 11 pages.
Extended European Search Report and Search Opinion received for EP Application No. 20809930.9, mailed on Mar. 2, 2023, 9 pages.
Extended European Search Report and Search Opinion received for EP Application No. 20810784.7, mailed on Mar. 9, 2023, 7 pages.

\* cited by examiner

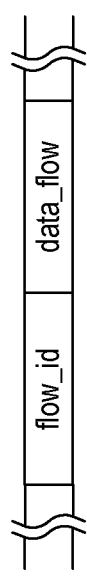
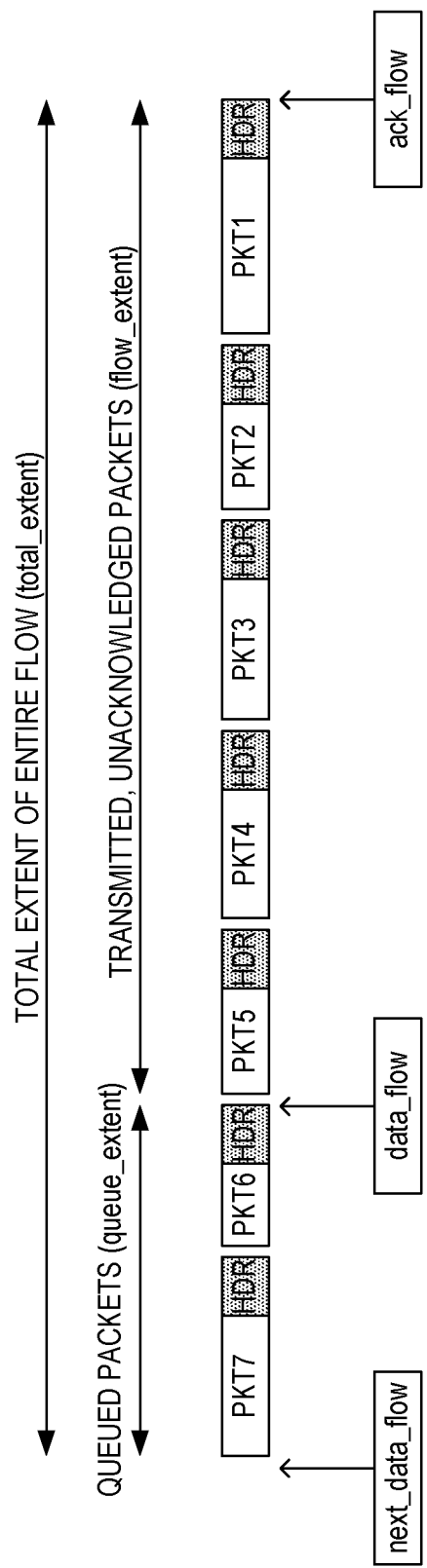

DYNAMIC BUFFER MANAGEMENT IN DATA-DRIVEN INTELLIGENT NETWORK

BACKGROUND

Field

This is generally related to the technical field of networking. More specifically, this disclosure is related to dynamic buffer management in switches that facilitate scalable, data-driven intelligent networks.

Related Art

As network-enabled devices and applications become progressively more ubiquitous, various types of traffic as well as the ever-increasing network load continue to demand more performance from the underlying network architecture. For example, applications such as high-performance computing (HPC), media streaming, and Internet of Things (IOT) can generate different types of traffic with distinctive characteristics. As a result, in addition to conventional network performance metrics such as bandwidth and delay, network architects continue to face challenges such as scalability, versatility, and efficiency.

SUMMARY

Systems and methods for dynamic buffer management in switches that facilitate a data-driven intelligent networking system are provided. The system can accommodate dynamic traffic with fast, effective congestion control while providing efficient use of internal input buffer space.

BRIEF DESCRIPTION OF THE FIGURES

FIG. 3A shows an exemplary fabric header for a data packet.

FIG. 3B shows an exemplary acknowledgement (ACK) packet format.

FIG. 3C shows the relationship between different variables used to derive and maintain state information of a flow.

In the figures, like reference numerals refer to the same figure elements.

DETAILED DESCRIPTION

Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown.

Overview

The present disclosure describes systems and methods that accommodate dynamic data traffic with fast, effective congestion control by maintaining state information of individual packet streams. More specifically, packets injected into a network of switches can be categorized into streams, which can be mapped to their layer-2, layer-3, or other protocol-specific header information. Each stream can be marked by a distinctive identifier that is local to an input port of a switch, and provided with a stream-specific input buffer, so that each stream can be individually flow-controlled. In addition, packets of a respective stream can be acknowledged upon reaching the egress point of the network, and the acknowledgement packets can be sent back to the ingress point of the stream along the same data path in the reverse direction. As a result, each switch can obtain state information of active packet streams it is forwarding, and can perform highly responsive, stream-specific flow control. Such flow control can allow the network to operate at higher capacity while providing versatile traffic-engineering capabilities.

In this disclosure, packet streams can also be referred to as "packet flows," or simply "flows." The data path traversed by a flow, together with its configuration information maintained by switches, can be referred to as a "flow channel." Furthermore, the terms "buffer" and "queue" are used interchangeably in this disclosure.

Figure 1:
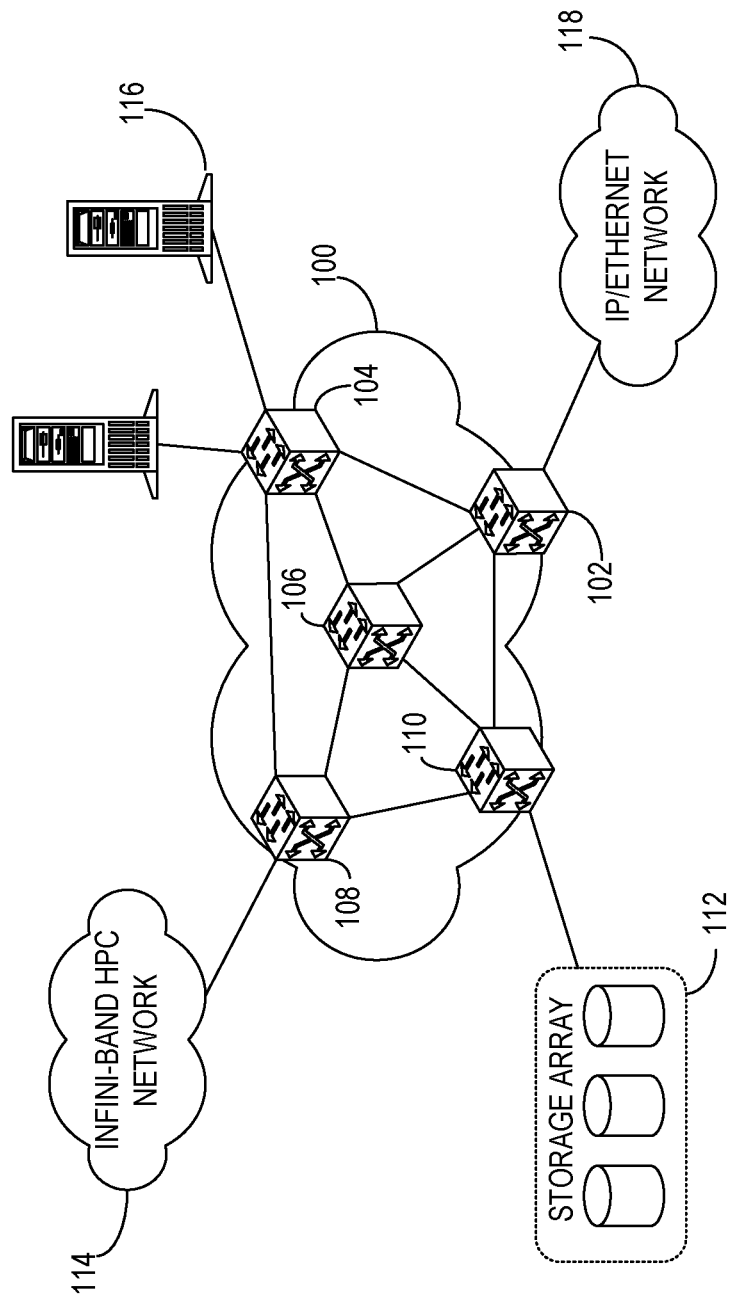
FIG. 1 shows an exemplary network that facilitates flow channels.

FIG. 1 shows an exemplary network that facilitates flow channels. In this example, a network 100 of switches, which can also be referred to as a "switch fabric," can include switches 102, 104, 106, 108, and 110. Each switch can have a unique address or ID within switch fabric 100. Various types of devices and networks can be coupled to a switch fabric. For example, a storage array 112 can be coupled to switch fabric 100 via switch 110; an InfiniBand (IB) based HPC network 114 can be coupled to switch fabric 100 via switch 108; a number of end hosts, such as host 116, can be coupled to switch fabric 100 via switch 104; and an IP/Ethernet network 118 can be coupled to switch fabric 100 via switch 102. In general, a switch can have edge ports and fabric ports. An edge port can couple to a device that is external to the fabric. A fabric port can couple to another switch within the fabric via a fabric link.

Typically, traffic can be injected into switch fabric 100 via an ingress port of an edge switch, and leave switch fabric 100 via an egress port of another (or the same) edge switch. An ingress edge switch can group injected data packets into flows, which can be identified by flow ID's. The concept of a flow is not limited to a particular protocol or layer (such as layer-2 or layer-3 in the Open System Interface (OSI) reference model). For example, a flow can be mapped to traffic with a particular source Ethernet address, traffic between a source IP address and destination IP address, traffic corresponding to a TCP or UDP port/IP 5-tuple (source and destination IP addresses, source and destination TCP or UDP port numbers, and IP protocol number), or traffic produced by a process or thread running on an end host. In other words, a flow can be configured to map to data between any physical or logic entities. The configuration of this mapping can be done remotely or locally at the ingress edge switch.

Upon receiving injected data packets, the ingress edge switch can assign a flow ID to the flow. This flow ID can be included in a special header, which the ingress edge switch can use to encapsulate the injected packets. Furthermore, the ingress edge switch can also inspect the original header fields of an injected packet to determine the appropriate egress edge switch's address, and include this address as a destination address in the encapsulation header. Note that the flow ID can be a locally significant value specific to a link, and this value can be unique only to a particular input port on a switch. When the packet is forwarded to the next-hop switch, the packet enters another link, and the flow-ID can be updated accordingly. As the packets of a flow traverses multiple links and switches, the flow IDs corresponding to this flow can form a unique chain. That is, at every switch, before a packet leaves the switch, the packet's flow ID can be updated to a flow ID used by the outgoing link. This up-stream-to-down-stream one-to-one mapping between flow ID's can begin at the ingress edge switch and end at the egress edge switch. Because the flow ID's only need to be unique within an incoming link, a switch can accommodate a large number of flows. For example, if a flow ID is 11 bits long, an input port can support up to 2048 flows. Furthermore, the match pattern (one or more header fields of a packet) used to map to a flow can include a greater number of bits. For instance, a 32-bit long match pattern, which can include multiple fields in a packet header, can map up 2^32 different header field patterns. If a fabric has N ingress edge ports, a total number of N*2^32 identifiable flows can be supported.

A switch can assign every flow a separate, dedicated input queue. This configuration allows the switch to monitor and manage the level of congestion of individual flows, and prevent head-of-queue blocking which could occur if shared buffer were used for multiple flows. When a packet is delivered to the destination egress switch, the egress switch can generate and send back an acknowledgement (ACK) in the upstream direction along the same data path to the ingress edge switch. As this ACK packet traverses the same data path, the switches along the path can obtain the state information associated with the delivery of the corresponding flow by monitoring the amount of outstanding, unacknowledged data. This state information can then be used to perform flow-specific traffic management to ensure the health of the entire network and fair treatment of the flows. As explained in more detail below, this per-flow queuing, combined with flow-specific delivery acknowledgements, can allow the switch fabric to implement effective, fast, and accurate congestion control. In turn, the switch fabric can deliver traffic with significantly improved network utilization without suffering from congestion.

Flows can be set up and released dynamically, or "on the fly," based on demand. Specifically, a flow can be set up (e.g., the flow-ID to packet header mapping is established) by an ingress edge switch when a data packet arrives at the switch and no flow ID has been previously assigned to this packet. As this packet travels through the network, flow IDs can be assigned along every switch the packet traverses, and a chain of flow IDs can be established from ingress to egress. Subsequent packets belonging to the same flow can use the same flow IDs along the data path. When packets are delivered to the destination egress switch and ACK packets are received by the switches along the data path, each switch can update its state information with respect to the amount of outstanding, unacknowledged data for this flow. When a switch's input queue for this flow is empty and there is no more unacknowledged data, the switch can release the flow ID (i.e., release this flow channel) and re-use the flow-ID for other flows. This data-driven dynamic flow setup and tear-down mechanism can obviate the need for centralized flow management, and allows the network to respond quickly to traffic pattern changes.

Note that the network architecture described herein is different from software-defined networks (SDN's), which typically uses the OpenFlow protocol. In SDN, switches are configured by a central network controller, and packets are forwarded based one or more fields in the layer-2 (data link layer, such as Ethernet), layer-3 (network layer, such as IP), or layer-4 (transport layer, such as TCP or UDP) headers. In SDN such header-field lookup is performed at every switch in the network, and there is no fast flow ID-based forwarding as is done in the networks described herein. Furthermore, because the OpenFlow header-field lookup is done using ternary content-addressable memory (TCAM), the cost of such lookups can be high. Also, because the header-field mapping configuration is done by the central controller, the setup and tear-down of each mapping relationship is relatively slow and could require a fair amount of control traffic. As a result, an SDN network's response to various network situations, such as congestion, can be slow. In contrast, in the network described herein, the flows can be set up and torn down dynamically based on traffic demand; and packets can be forwarded by a fixed-length flow ID. In other words, flow channels can be data driven and managed (i.e., set up, monitored, and torn down) in a distributed manner, without the intervention of a central controller. Furthermore, the flow ID-based forwarding can reduce the amount of TCAM space used and as a result a much greater number of flows can be accommodated.

Referring to the example shown in FIG. 1, suppose that storage array 112 is to send data using TCP/IP to host 116. During operation, storage array 112 can send the first packet with host 116's IP address as the destination address and a predetermined TCP port specified in the TCP header. When this packet reaches switch 110, the packet processor at the input port of switch 110 can identify a TCP/IP 5-tuple of this packet. The packet processor of switch 110 can also determine that this 5-tuple currently is not mapped to any flow ID, and can allocate a new flow ID to this 5-tuple. Furthermore, switch 110 can determine the egress switch, which is switch 104, for this packet based on the destination (i.e., host 116's) IP address (assuming switch 110 has knowledge that host 116 is coupled to switch 104). Subsequently, switch 110 can encapsulate the received packet with a fabric header that indicates the newly assigned flow ID and switch 104's fabric address. Switch 110 can then schedule the encapsulated packet to be forwarded toward switch 104 based on a fabric forwarding table, which can be computed by all the switches in fabric 100 using a routing algorithm such as link state or distance vector.

Note that the operations described above can be performed substantially at line speed with little buffering and delay when the first packet is received. After the first packet is processed and scheduled for transmission, subsequent packets from the same flow can be processed by switch 110 even faster because the same flow ID is used. In addition, the design of the flow channels can be such that the allocation, matching, and deallocation of flow channels can have substantially the same cost. For example, a conditional allocation of a flow channel based on a lookup match and a separate, independent deallocation of another flow channel can be performed concurrently in nearly every clock cycle. This means that generating and controlling the flow channels can add nearly no additional overhead to the regular forwarding of packets. The congestion control mechanism, on the other hand, can improve the performance of some applications by more than three orders of magnitude.

At each switch along the data path (which includes switches 110, 106, and 104), a dedicated input buffer can be provided for this flow, and the amount of transmitted but unacknowledged data can be tracked. When the first packet reaches switch 104, switch 104 can determine that the destination fabric address in the packet's fabric header matches its own address. In response, switch 104 can decapsulate the packet from the fabric header, and forward the decapsulated packet to host 116. Furthermore, switch 104 can generate an ACK packet and send this ACK packet back to switch 110. As this ACK packet traverses the same data path, switches 106 and 110 can each update their own state information for the unacknowledged data for this flow.

In general, congestion within a network can cause the network buffers to fill. When a network buffer is full, the traffic trying to pass through the buffer ideally should be slowed down or stopped. Otherwise, the buffer could overflow and packets could be dropped. In conventional networks, congestion control is typically done end-to-end at the edge. The core of the network is assumed to function only as "dumb pipes," the main purpose of which is to forward traffic. Such network design often suffers from slow responses to congestions, because congestion information often cannot be sent to the edge devices quickly, and the resulting action taken by the edge devices cannot always be effective in removing the congestion. This slow response in turn limits the utilization of the network, because to keep the network free of congestion the network operator often needs to limit the total amount of traffic injected into the network. Furthermore, end-to-end congestion control usually is only effective provided that the network is not already congested. Once the network is heavily congested, end-to-end congestion control would not work, because the congestion notification messages can be congested themselves (unless a separate control-plane network that is different from the data-plane network is used for sending congestion control messages).

In contrast, the flow channels can prevent such congestion from growing within the switch fabric. The flow channel mechanism can recognize when a flow is experiencing some degree of congestion, and in response can slow down or stop new packets of the same flow from entering the fabric. In turn, these new packets can be buffered in a flow channel queue on the edge port and are only allowed into the fabric when packets for the same flow leave the fabric at the destination edge port. This process can limit the total buffering requirements of this flow within the fabric to an amount that would not cause the fabric buffers to become too full.

With flow channels, the switches have a reasonably accurate state information on the amount of outstanding in-transit data within the fabric. This state information can be aggregated for all the flows on an ingress edge port. This means that the total amount of data injected by an ingress edge port can be known. Consequently, the flow channel mechanism can set a limit on the total amount of data in the fabric. When all edge ports apply this limit action, the total amount of packet data in the entire fabric can be well controlled, which in turn can prevent the entire fabric from being saturated. The flow channels can also slow the progress of an individual congested flow within the fabric without slowing down other flows. This feature can keep packets away from a congestion hot spot while preventing buffers from becoming full and ensuring free buffer space for unrelated traffic.

Operation of Flow Channel

In general, flow channels can define a path for each communication session across the switch fabric. The path and amount of data belonging to each flow can be described in a set of dynamically connecting flow tables associated with each link of the switch fabric. On every ingress port, edge and fabric, a set of flow channel queues can be defined. There can be one queue for each flow channel. As packets arrive, they either can be assigned to a flow channel on an edge port, or have been assigned to a flow channel by the link partner's egress fabric port on a fabric ingress port. The flow channel information can be used to direct the packets into the appropriate flow channel queue.

Figure 2A:
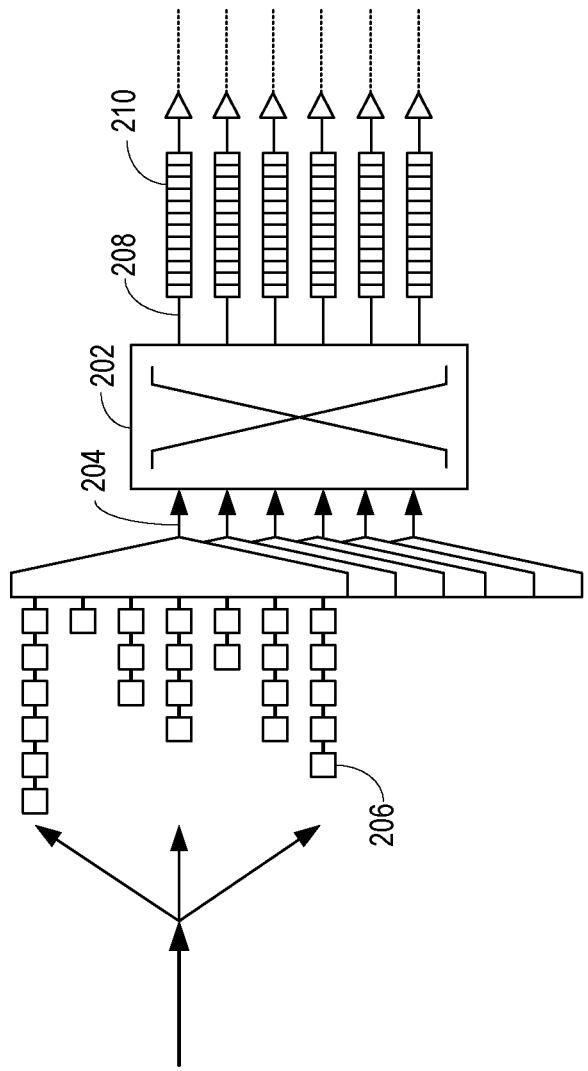
FIG. 2A shows an exemplary switch that facilitates flow channels.

FIG. 2A shows an exemplary switch that facilitates flow channels. In this example, the switch can include a crossbar switch 202. Crossbar switch 202 can have a number of input ports, such as input port 204, and a number of output ports, such as output 208. Crossbar switch 202 can forward packets from an input port to an output port. Each input port can be associated with a number of input queues, each assigned to a different incoming flow arriving on that input port. For example, data arriving on a given port of the switch can first be separated, based on their individual flows, and stored in flow-specific input queues, such as input queue 206. The packets stored in the input queues can be dequeued and sent to crossbar switch 202 based on scheduling algorithms designed to control congestions (described in more detail in later sections). On the output side, once a packet passes crossbar switch 202, it can be temporarily stored in an output transmission queue, such as output transmission queue 210, which can be shared by all the flows leaving on the same output port. Meanwhile, before a packet is dequeued from the output transmission queue and transmitted on the outgoing link, the packet's header can be updated with the flow ID for the outgoing link. Note that this hop-by-hop flow ID mapping can be done when the first packet in the flow travels across the network. When the packet reaches the next-hop switch, the packet can be stored again in a flow-specific input queue and the same process can be repeated. Note that a flow ID is used to distinguish between flows traveling on the same fabric link, and can be typically assigned by the transmitter end of this link, which is the output port of the switch that is transmitting onto this link.

By providing flow-specific input queues, the switch can allow each flow to move independently of all other flows. The switch can avoid the head-of-queue blocking problem, which is common with shared input buffers. The flow-specific input queue also allows the packets within a single flow to be kept in order. When a flow passes through the switches, a flow-specific input queue on each input port can be allocated for this flow and these input queues become linked, effectively forming one long queue that reaches across the entire fabric for this flow, and the packets of this flow can be kept in order.

The progress of successful delivery of packets belonging to a flow can be reported by a sequence of ACKs generated by the edge port of an egress switch. The ACK packets can travel in the reverse direction along the data path traversed by the data packets and can be forwarded by the switches according to the forwarding information maintained in flow tables. As ACK packets travel upstream, they can be processed by each switch's input queue manager, which can update the corresponding flow's state information based on information carried by the ACK packets. The ACK packets can have a type field to provide advanced information about the downstream data path, such as congestions. A switch's input queue manager can use this information to make decisions, such as throttling the transmission rate or changing the forwarding path, about the pending data packets currently buffered in its input queues. In addition, the input queue manager can update the information carried in an ACK packet based on state information of a buffered flow, so that the upstream switches can make proper decisions. For example, if an input queue for a given flow is experiencing congestion (e.g., the amount of data in the queue is above a predetermined threshold), the input queue manager can update an ACK packet that is being forwarded to the next upstream switch to include this congestion information.

If an ACK corresponds to the last packet of a flow, a switch can determine that there is no more unacknowledged data for that flow. Correspondingly, the switch can free the flow channel by removing the corresponding entry in the flow table.

Figure 2B:
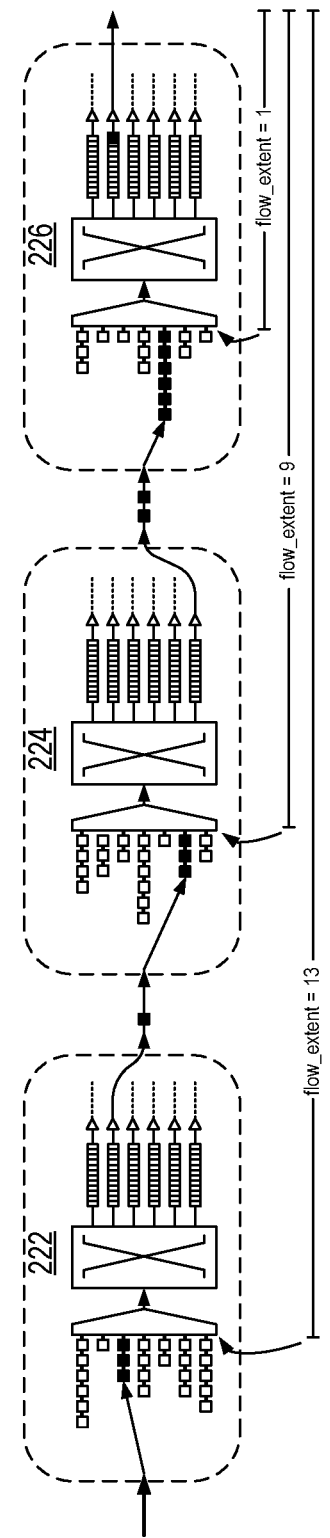
FIG. 2B shows an example of how switches along a data path can maintain flow state information.

As mentioned above, the input queue manager at each switch can maintain information about transmitted but unacknowledged data of a given flow. FIG. 2B shows an example of how switches along a data path can maintain flow state information. In this example, the data path taken by a flow can include switches 222, 224, and 226. The amount of transmitted but unacknowledged flow data can be indicated by a variable "flow_extent," which can be measured in number of fixed-length data units, such as 256 bytes. Furthermore, flow_extent and other flow state information can be maintained by a switch's input queue manager, which can continuously monitor all the flow-specific queues.

In the example in FIG. 2B, the value of flow_extent at the input queue manager of switch is 1, because there is one unit of data that has been sent out of the input queue and forwarded through the crossbar switch. Note that a data packet sent by an input queue might be temporarily buffered in the output transmission buffer due to the scheduling of all the data packets to be transmitted via an output link. When such a packet is buffered in the output port's transmission buffer, the packet can still be considered by the input queue as transmitted for the purpose of updating the flow_extent value.

Correspondingly, because the input queue for the given flow at switch 226 has six queued data units, and two additional data units are in transit between switches 224 and 226, the flow_extent value at switch 224 is 9. Similarly, the flow_extent value at switch 222 is 13, because there are three data units stored in the input queue at switch 224 and one data unit in transit between switches 222 and 224.

In general, a flow channel can remain allocated to a single flow until all the ACKs for all the packets sent on the flow channel have been returned. This means that flow channel table entries can remain active for longer near the fabric ingress edge port than near the egress edge port. If a single packet is injected into the network, a flow channel can be allocated for the ingress edge port and then another flow channel can be allocated for the next fabric link the packet traverses and so on, until the last flow channel is allocated when the packet reaches the last fabric link. Each allocation can generate a flow ID, denoted as variable "flow_id," to identify the entries of the flow tables of the fabric link. (More details on flow channel tables are provided in the description below in conjunction with FIG. 4A.) This first packet may cause the allocation of a different flow_id, on each of the fabric links the packet traverses across the switch fabric.

At the input queue of each switch, the flow channel table entries can indicate each flow's state information, including the flow_extent value, from this point downstream to the flow's egress destination edge port. Packets received on the local input port can increase this flow_extent value by the amount of incoming data, and ACKs can reduce the flow_extent by the amount of acknowledged, delivered data.

When a packet reaches the final destination egress port, an ACK packet can be generated and returned for that packet. This ACK can be routed using the data path information stored in the corresponding entry of the flow channel tables at every switch along the data path. Optionally, the ACK packet itself does not need to carry path information and therefore can be small and light weight. If no other data packet is sent on the flow, the ACK can release each flow channel in the reverse order. Once released, the flow channel at each switch can be allocated to a different flow.

If another packet follows the first packet on the same flow, the ACK corresponding to the second packet would need to be received before the flow channel can be released at a given switch. In one embodiment, the flow channel can only be released when ACKs for all the transmitted packets of the same flow have been returned.

Typically, various protocols may require in-order packet delivery. The flow channels can be used to guarantee this delivery order, even when the fabric uses adaptive routing for load balancing across multiple data paths. If packets between an ingress edge port and an egress edge port, perhaps in a different switch on the far side of the fabric, are injected at a very low rate, then each packet injected could reach its destination and return an ACK back to the source before the next packet is injected. In this case, each packet can be a lead packet and free to take any path across the fabric, using the best available dynamic adaptive routing choice. This is possible because the first packet can define the flow's path through the fabric.

Now assume that the packet injection rate is increased slightly to the point where the next packet of the same flow is injected before the current packet's ACK has returned to the source. The second packet can pass the ACK of the first packet somewhere along the flow's data path. Beyond this passing point, the ACK will have released the flow channels allocated to the first packet, because the flow_extent value associated with the first packet is returned to zero when the ACK is processed by the flow channel's logic. Meanwhile, the second packet can now define a new flow, because it is again causing flow channels to be allocated on each of the subsequent fabric links. This second packet, while it is causing flow channels to be allocated beyond the passing point, can be forwarded to a different path based on dynamic adaptive routing. On the other hand, before the passing point, the second packet can extend the outstanding flow created by the first packet to include the second packet. This means the first packet's ACK may not reduce the flow_extent value to zero and the flow channels may remain active before the passing point. It also means that the second packet may follow the exact path taken by the first packet up to the passing point. Note that while it is following the previous packet, the second packet cannot arrive at the egress edge port before the first packet does, and therefore correct packet order can be maintained.

If the injection rate for this flow is increased further, the second packet will pass the first packet's ACK at a location closer to the destination edge port. It is also possible that a third, fourth, fifth, or additional packet may enter the fabric before the first packet's ACK is returned to the source edge port, depending on the data packet injection rate of this flow and the data packet-ACK round trip delay. The maximum packet rate can depend on the size of the packets and the bandwidth of the links. The round trip delay of the data packet and ACK can be an important parameter for a fabric implementation and can be used along with the maximum packet rate to calculate the maximum required number of flow channels for each link. Ideally, a design can provide a reasonable number of unallocated flow channels regardless of the traffic pattern. The demand for the number of flow channel can be high when a large number of packets arriving at an ingress edge port have different destinations and these packets have small sizes and high injection rates. In the most extreme case, each packet could be allocated a different flow channel. These flow channels are freed when the packets' ACKs are returned. Correspondingly, the number of flow channels needed can be calculated as ((Packet rate)*(Average packet to ACK round trip latency)).

Note that packet rate on a single flow channel is not to be confused with packet rate on a link. If the traffic pattern is such that many small packets are being sent to different destinations, then successive packets sent onto the link can have different destinations. This means that each packet could belong to a different flow and could be the only packet to use the corresponding flow channel. In this example, the link can experience a high packet rate, but the packet rate of individual flows can be low. Optionally, a number of ACKs (e.g., 48 ACKs) can be aggregated together into a single ACK frame for transmission over a link and protected by a Frame Check Sequence (e.g., a 32-bit FCS). For example, the ACKs can occupy 25 bits each, and there can be a 9-byte overhead to the frame. That is, the overhead per ACK on a full size frame is approximately $9/(^{25}/_{8}*48)*100\%=6\%$. The logic can optimize the number of ACKs per frame so an ACK does not need to wait too long to be aggregated when the ACKs are arriving slowly. For example, the ACK aggregation logic block can use three timers to manage ACK transmission based on the activity of an outgoing link. These timers can be started when a new ACK arrives at the ACK aggregation logic block. If the outgoing link is idle, a first timer, which can for example be set at 30 ns, can be used to hold the ACK while waiting for additional ACKs to arrive. When this timer expires, all the ACK received within the corresponding time window can be aggregated into one frame and transmitted onto the outgoing link. If the outgoing link is busy, a second timer, which can for example be set at 60 ns, can be used to wait for additional ACKs. Using this second timer can allow more ACKs to be aggregated into a single frame, and this frame can be transmitted only if a predetermined number of ACKs are collected. Note that due to the Ethernet framing constrains, some numbers of ACKs in a single frame can use less wire bandwidth per ACKs than other numbers of ACKs. If no efficient number of ACKs are collected, and the outgoing link remains busy sending normal data packets, then a third timer, which can for example be set at 90 ns, can be used. Once this third timer expires, all the ACKs that have been collected can be aggregated in a frame and transmitted onto the link. By using these three timers, the system can significantly reduce the overhead of sending ACKs on the outgoing link.

In some examples, the ingress edge port of a switch can encapsulate a received data packet with a fabric header, which allows the packet to be forwarded using flow channels. FIG. 3A shows an exemplary fabric header for a data packet. The fabric header can include a flow_id field, which can identify the flow channel, and a "data_flow" field, which can indicate the progression of the entire flow.

When a data packet is delivered to its destination, at least one ACK can be generated. FIG. 3B shows an exemplary ACK packet format. An ACK packet can include a "flow_id" field, an "ack_flow" field, an "ACK type" field, and a cyclic redundancy check (CRC) field. The flow_id field can indicate the flow this ACK packet belongs to. The ack_flow field can indicate the data packet to which this ACK packet acknowledges. Recall that each switch can maintain a flow_extent value which indicates the amount of transmitted but unacknowledged data. The value of flow_extent can be derived as flow_extent=data_flow−ack_flow, wherein data_flow value is taken from the last transmitted data packet.

The ACK type field can indicate different types of ACKs. As mentioned above, during normal operation, when a data packet is delivered to the destination edge port, a regular ACK packet can be generated and sent back to the source. Correspondingly, the ACK type field in the ACK packet can indicate a normal ACK. When congestion occurs in the fabric, the ACK type field can be used to indicate various types and severity of congestion, such as a new congestion, a persistent congestion, or a severe congestion at the egress edge port that calls for rerouting of the flow. In addition, under special circumstances such as the presence of a severely congested fabric link, dropped packets, or link error, an ACK can also be generated by an intermediate switch that is not the final destination, and the ACK type field can be used to notify upstream switches of different types of network condition. Other additional fields can also be included in an ACK packet.

FIG. 3C shows the relationship between different variables used to derive and maintain state information of a flow. In this example, a switch can use the variable "total_extent" to track the total amount of unacknowledged transmitted data and data currently queued at the switch. The value of total_extent can equal the sum of flow_extent, which is the amount of transmitted and unacknowledged data, and queue_extent, which is the amount of data stored in the input queue for the corresponding flow. The variable "ack_flow" can indicate the data position that corresponds to the latest ACK for this flow. The variable "data_flow" can indicate the position of the next data packet to be transmitted, which also corresponds to the data packet stored at the head of the input queue. The variable "next_data_flow" can indicate the position of the next data packet that the switch can expect to receive from the upstream switch. Note that queue_extent=next_data_flow−data_flow, and flow_extent=data_flow−ack_flow.

Figure 4A:
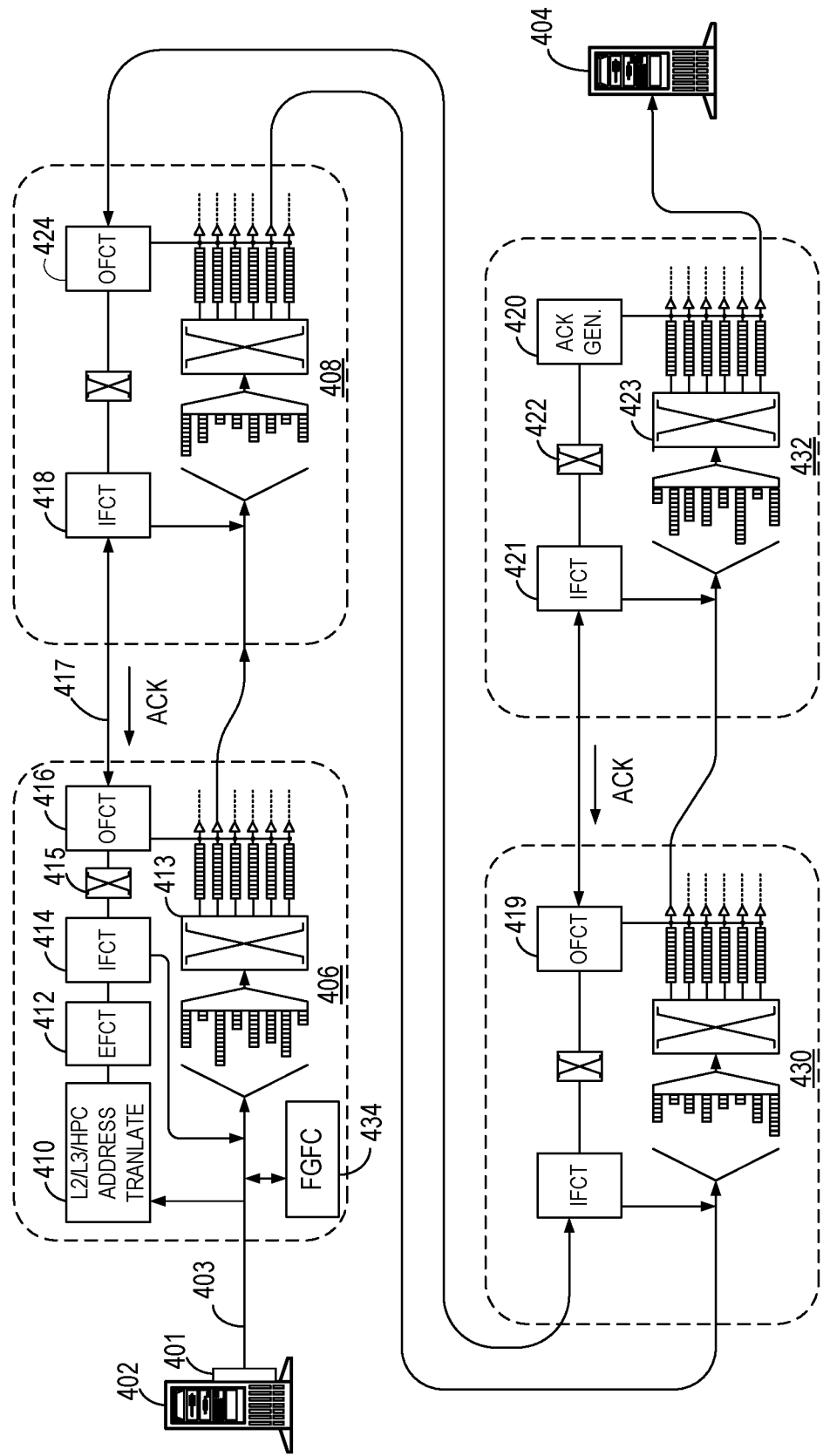
FIG. 4A shows an example of how flow channel tables can be used to deliver a flow.

In some examples, flow channel tables can be used to facilitate flow channels throughout a fabric is. Flow channel tables are data structures that store the forwarding and state information for a given flow at the port of a switch. FIG. 4A shows an example of how flow channel tables can be used to store state information associated with multiple flows. This state information can be specific to each flow and efficiently stored in a table. Assume that a source host 402 is sending data packets to a destination host 404 via a fabric. The data path traversed by the data packets can include an ingress edge switch 406, intermediate switches 408 and 430, and egress edge switch 432.

When a packet arrives on an ingress edge link 403 of switch 406, the packet's header can be analyzed by an address translate logic block 410. Address translate logic block 410 can determine the destination fabric address of the egress switch (which in this case is switch 432) based on the packet's Ethernet, IP, or HPC header information. Note that header information associated with other protocols or a combination of different protocols can also be used by address translate logic block 410. The fabric destination address determined by address translate logic block 410 can then be used to perform a lookup in an edge flow channel table (EFCT) 412. EFCT 412 can perform a lookup operation for the packet using the packet's fabric destination address and optionally additional values extracted from the packet's header, which can be referred to as a match pattern. EFCT 412 can compare the packet's match pattern against stored match patterns of all existing allocated flows. If a match is found, then this packet is part of an existing flow and the previously allocated flow ID can be returned for this packet. If no match is found, a new flow ID can be allocated for this packet, and a match pattern can be added to EFCT 412. In other words, EFCT 412 can be used to determine whether a flow channel already exists for the incoming packet, or whether a new flow channel needs to be allocated. In addition to the destination fabric address, other packet header information such as traffic class, TCP or UDP port number, and process or thread ID can be used to map or allocate flow IDs.

The flow ID obtained by EFCT 412 can then be used as an index to map to an entry in an input flow channel table (IFCT) 414. Each entry in IFCT 414 can be indexed by a flow ID and store state information for the corresponding flow. An entry in IFCT 414 can store the values of next_data_flow, data_flow, and ack_flow (see FIG. 3C) associated with a flow. In addition, an IFCT entry can store other parameters for congestion control and dynamic routing for a flow.

The flow ID can also be used to identify or allocate a flow-specific input queue in which the incoming packet can be temporarily stored. The state information for a particular queue, as well as parameters for monitoring and controlling the queue (such as threshold for detecting congestion) can be stored in the corresponding entry in IFCT 414. An input queue management logic block can determine when a packet can be dequeued from the input queue and sent to a data crossbar switch 413 based on flow-control parameters stored in the entry of IFCT 414.

When a packet is dequeued from the input queue and sent through crossbar switch 413 to an output port, the packet is sent with the input port number on which it has arrived at switch 406. When the packet reaches an output port's transmission buffer, the packet's header can be updated, based on the packet's flow ID and input port number, with a new flow ID to be used by the next-hop switch (i.e., switch 408) for the same flow. This is because each link, in each direction, can have its own set of flow channels identified by their respective flow IDs. The mapping from the incoming flow ID to the outgoing flow ID used on the next link can be done by looking up an output flow channel table (OFCT) 416. OFCT 416 can perform a lookup using a match pattern that is a combination of the local input port number corresponding to link 403 and the packet's flow ID which is produced by EFCT 412. If a match is found, then the flow has already been defined, and the packet's flow ID is updated with the value corresponding to the match pattern (this new outgoing flow ID is to be used by the downstream next-hop switch 408). If a match is not found, then a new flow channel can be allocated with a new, outgoing flow ID, which can be mapped to the input port number and the previous, incoming flow ID. An entry including the outgoing flow ID, input port number, and incoming flow ID can be stored in OFCT 416.

In the case where the packet is the first packet in the flow, a lookup in OFCT 416 would not produce any mapping. In turn, OFCT 416 can allocate for the packet a flow channel with a flow ID to be used by the input port and IFCT 418 on switch 408. This new flow channel, identified by its flow ID, can be added to the packet header for transmission onto link 417, and can be used by the link partner's (which is switch 408) IFCT 418 to access the flow channel's congestion information. As before, OFCT 424 can further generate a new flow channel if no match is found, using the match pattern of its immediate upstream input port number and flow ID associated with link 417. OFCT 424 can then allocate a new flow channel identified by a new flow ID. Note that OFCT 416 can also function as a forwarding table for ACKs of this flow in the upstream direction. After being forwarded upstream from switch 408 to switch 406, the ACK packet can be updated with the flow ID associated with edge link 403 and forwarded to the appropriate input port on switch 406 as indicated by the corresponding entry in OFCT 416. The ACK packets can be forwarded to the input port by an ACK crossbar switch 415 in the upstream direction.

Subsequently, when the packet arrives at switch 408, its flow ID can be used to identify an input queue to use and to determine an entry in IFCT 418. If the packet's flow ID has not been previously allocated by switch 408, a new input queue can be provided and a new entry in IFCT 418 can be created. From this point onward, a similar process can be performed to forward the packet across switches 408 and 430 until the packet reaches egress switch 432.

When the packet reaches switch 432, after the packet is forwarded by a data crossbar switch 423, an ACK generator logic block 420 can generate an ACK packet based on the packet's flow ID and input port number. This ACK packet can then be forwarded in the upstream direction by an ACK crossbar switch 422. At the same time, based on the ACK packet, an IFCT 421 can update the state information for the flow in the corresponding table entry. When the ACK packet reaches switch 430, an OFCT 419 can be looked up to determine the upstream flow ID and upstream input port to which the ACK packet is to be forwarded. The ACK packet can then have its flow ID updated and be forwarded to the appropriate input port in the upstream direction. As the ACK packet traverses the data path upstream in a similar way, the IFCT at each switch can update its table entry for the flow based on the ACK.

Note that the flow_extent variable can be an important parameter, because it represents the total amount of downstream packet data for a flow. A flow channel is considered free to be reallocated to another flow when the flow_extent of an entry is zero. In general, on receipt of a new packet, the input logic can make a request to send data to an output port. The selected output port can be a function of the flow_extent stored in the IFCT. If flow_extent is zero, there are no packets downstream in the flow to the destination egress edge port. As a result, the switch can use a load based adaptive route selection to choose any valid path that leads to the destination. In a multi-path network, dynamic adaptive routing can be done without the packet being reordered. If flow_extent is not zero, and if in-order delivery is required, the packet can use the same route taken by previous packets. The IFCT can have a field that stores a previous output port number, which is loaded when a packet request is made to an output port and can be used to ensure a connection to the previously used output port.

As mentioned before, the flow channels can use a match function to recognize packets belonging to an existing flow. Received Ethernet frames or other types of packets can be parsed in real time when the frame or packet is received on an ingress edge port and some fields of the packet header can be used for a lookup in a CAM or Ternary Content Addressable Memory (TCAM). If there is a match, the match address can become the flow ID used to select a flow channel. When no match occurs, the switch hardware can load the pattern that fails to match directly onto a free line of the CAM, which can be done without additional delay. As a result, any following packet can be matched to this new entry without significant amount of buffering. The free entry chosen becomes the new flow ID for the new flow channel entry. Note that no external software intervention is required for the loading of the new entry. The process can be completed autonomously by the switch hardware.

The de-allocation of flow IDs and corresponding CAM match lines can also be automatically performed by the hardware when the last ACK is returned for the flow. The de-allocation can occur in hardware with respect to potentially matching new packets, without external software intervention.

In some examples, ingress edge switch 406 can include a fine-grain flow control logic block 434, which can communicate with a network interface controller (NIC) 401 on host 402 to apply flow control on a per-flow basis. More details on find-grain flow control are provided below in conjunction with the description on congestion management.

Figure 4B:
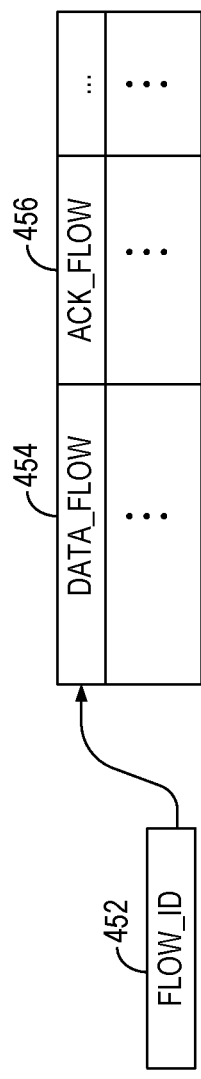
FIG. 4B shows an example of an edge flow channel table (EFCT).

FIG. 4B shows an example of an EFCT. In this example, an EFCT can include a data_flow field 454, an ACK_flow field 456, and optionally additional fields. The EFCT can be associated with an input port, and entries in the EFCT can be indexed by flow_ID values, such as flow_ID 452. In one embodiment, the match pattern field can reside in the match function logic block, which can include a CAM or TCAM. The match function logic block can use the match pattern to generate the flow_ID value, which in turn can be used as an index to the corresponding EFCT entry. From this EFCT's perspective, the flow_extent (i.e., data_flow–ack_flow) can include all the unacknowledged data downstream of this table, which can include the local flow_queue plus the corresponding IFCT's flow_extent value.

Figure 4C:
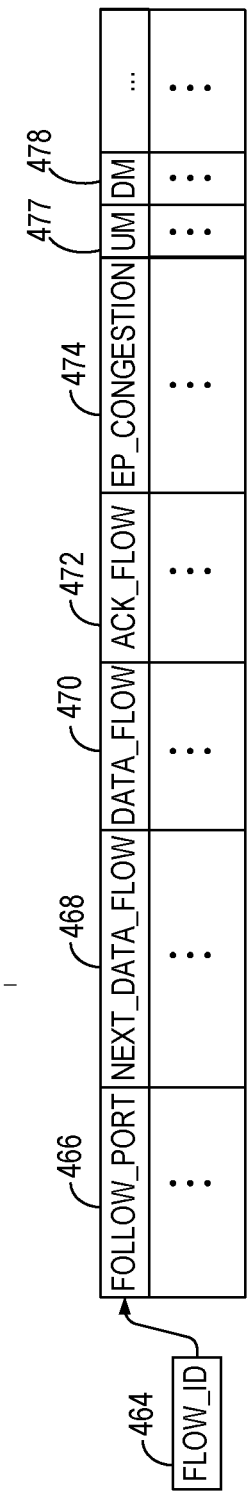
FIG. 4C shows an example of an input flow channel table (IFCT).

FIG. 4C shows an example of an IFCT. In this example, an IFCT can be associated with an input port, and can include a follow_port field 466, a next_data_flow field 468, a data_flow field 470, an ACK_flow field 472, an ep_congestion yield 474, an upstream metering (UM) flag field 477, a downstream metering (DM) flag field 478, and optionally additional fields. An incoming packet's flow_ID value, such as flow_ID 464, can be used as an index to look up the output port number, which is indicated by follow_port field 466, and the state information associated with the corresponding flow. Congestion-control information associated with endpoint congestion (such as ep_congestion field 474) and (hop-by-hop credit-based flow control (such as UM flag field 477 and DM flag field 478), which is described in more detail later in this document, can also be stored in the IFCT. The IFCT can further store information related to dynamic routing associated with different flows.

Figure 4D:
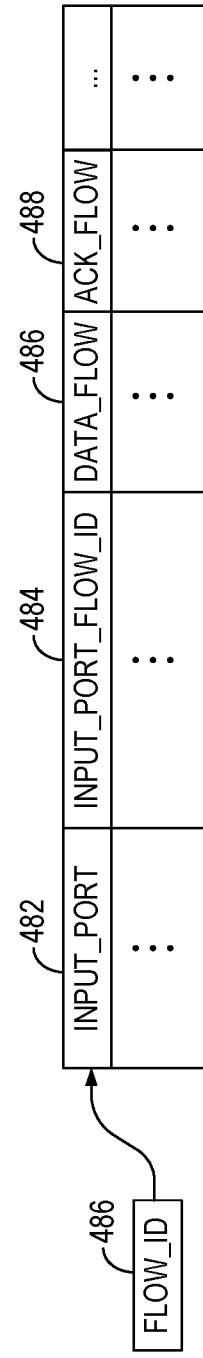
FIG. 4D shows an example of an output flow channel table (OFCT).

FIG. 4D shows an example of an OFCT. In this example, an OFCT can be associated with an output port, and can include an input_port field 482, an input_port_flow_ID field 484 (which corresponds to a packet's existing flow_ID upon its arrival at an input port), a data_flow field 486, an ACK_flow field 488, and optionally additional fields. Data_flow field 486 and ACK_flow field 488 can be used to determine the value of flow_extent from this OFCT onward. The combination of input_port field 482 and input_port_flow_ID field 484 (which can also be referred to as "incoming flow_ID") can be used to determine or allocate the outgoing flow_ID of a packet that is ready for transmission onto the outgoing link corresponding to this OFCT. In one embodiment, the outgoing flow_ID values, such as flow_ID 486, can be used as an index to look up entries in the OFCT.

Exemplary Switch Architecture

In one embodiment, a switch chip supporting the aforementioned features can provide 64 network ports, each of which can operate at 100 Gbps or 200 Gbps, with an aggregate throughput of 12.8 Tbps. Other numbers of ports and data rates are also possible. Each network edge port can support various types of protocols, such as IEEE 802.3 Ethernet, Optimized-IP based protocols, and HPC Portals protocol. Ethernet frames can be bridged based on their layer-2 addresses or be routed based on their layer-3 (IPv4/IPv6) addresses. Optimized-IP frames only have a layer-3 (IPv4/IPv6) header, therefore they are typically routed based on layer-3 addresses. The enhanced Portals format frames typically use specialized NIC and can map directly onto the switch's enhanced fabric format.

When a switch chip is connected to another switch chip, they can communicate using the enhanced fabric frame format, which provides additional control and status fields to support a multi-chip fabric. One of the differentiating features of the present switch architecture when compared with Ethernet switch or alternative technologies such as InfiniBand is that the present switch can provide flow channel based congestion control. The enhanced fabric frame format that operates between switch chips can provide forward and reverse path signaling of the state for flows.

In one embodiment, the switch chip can be implemented based on a crossbar architecture with combined virtual output queuing and crossbar queuing. Buffering and forwarding of data packets can be done with a credit-based request and grant mechanism.

Figure 5A:
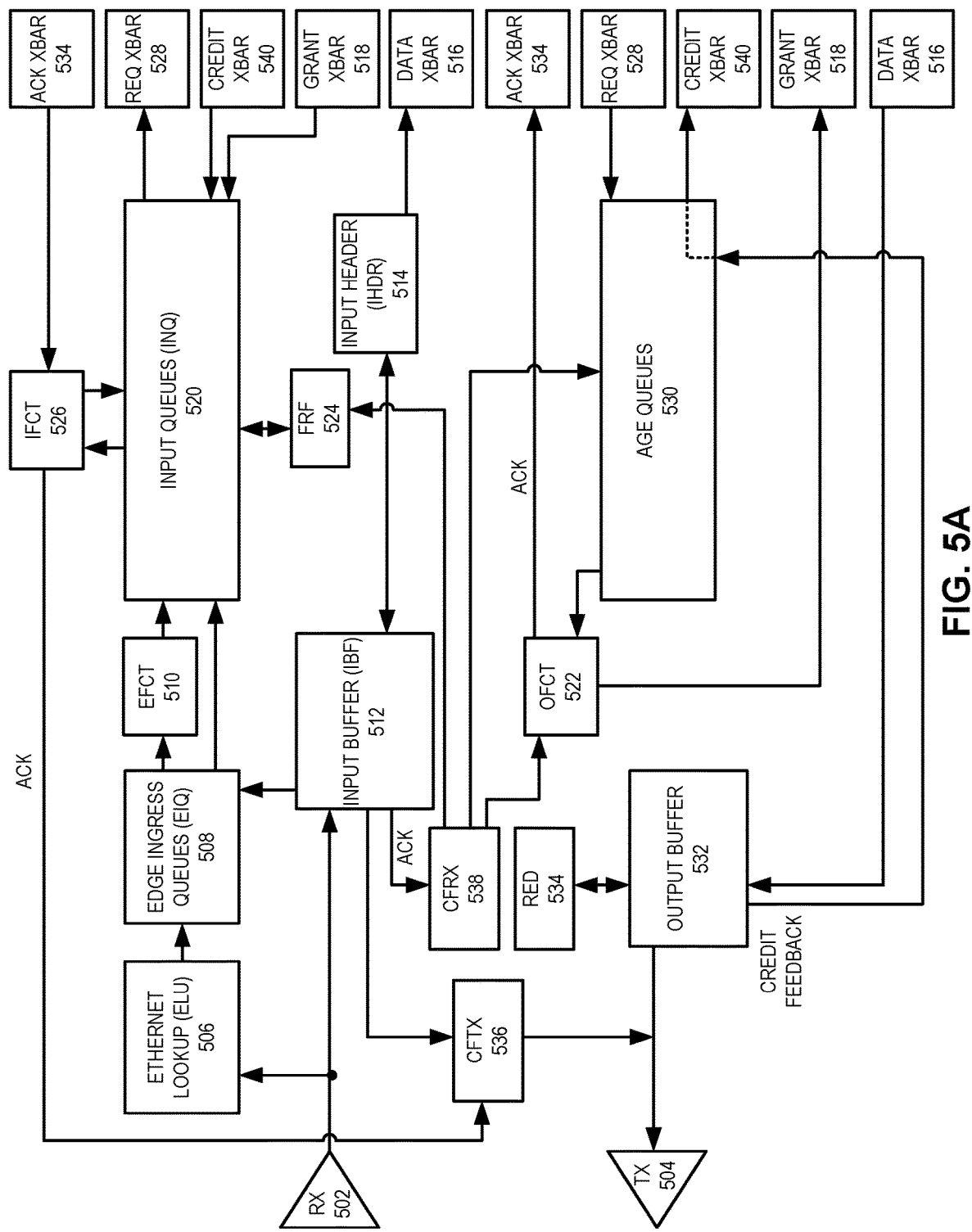
FIG. 5A shows an exemplary switch architecture.

FIG. 5A shows an exemplary switch architecture. In one embodiment, the switch chip can include a receiver (RX) block 502 and a transmitter (TX) block 504. When traffic is received from RX block 502, if the switch chip is configured as an edge switch, the data packets can be sent to an Ethernet look up (ELU) block 506. ELU block 506 can provide address translation (lookup) from an external MAC or IP address (principally, but other header fields may also be used) to the internal fabric address (FA). ELU block 506 can also provide mapping from a packet's own traffic class identifier (such as Ethernet traffic class) to a fabric traffic class identifier, with can be identified by a fabric tag (FTAG) included in a fabric header.

In one embodiment, IEEE 802.3 and Optimized-IP format packets can be passed through ELU block 506. ELU block 506 can extract appropriate headers for use in the lookup process, and return a lookup result to an Ethernet ingress queues (EIQ) block 508, which queues headers for flow channel allocation in EFCT block 510. EIQ block 508 can also associate the addresses of packets stored in the input buffer (IBUF) block 512 with their translated header. For IEEE 802.3 and optimized-IP packets, ELU block 506 can perform a lookup to create fields for forwarding the packets within the fabric.

For an ingress edge port, EIQ block 508 can queue the packet headers waiting for EFCT block 510 to allocate a flow channel. If EFCT block 510 runs out of flow channels, the FIFO queue in EIQ block 508 can fill up, and as configurable thresholds are exceeded, Pause packets can be generated. For packets received from a fabric port, these packets do not need flow channel allocation, and hence their headers are not queued in EIQ block 508.

An input header (IHDR) block 514 which is coupled to IBUF block 512 can perform modifications to a received packet, and update a packet's fabric header fields. IHDR block 514 can receive packet data, ingress time stamps, and grant headers (which can contain modification data and instructions) from IBUF block 512. Such modifications can include removing various Ethernet layer-2 header fields and adding a fabric header. IHDR block 514 can modify packets "on the fly" as packets are read out of IBUF bock 512 and sent to data crossbar 516.

IBUF block 512 can store unmodified packets when they are received by the switch chip, and can support different formats. The stored packet address, which is a pointer denoted as sop_ptr, and the index of the packet can be sent by IBUF block 512 to EIQ block 508, which can match the packet to the ELU block 506's header lookup result.

At some point in time, each packet stored in IBUF block 512 is either sent to a destination port via data crossbar 516 based on a grant sent via a grant crossbar 518 and an input queues (INQ) block 520 (explained below), or is discarded. Both operations can be performed based on a reference to sop_ptr. A grant can also contain other fields from ELU block 506 and EFCT 510, which can be sent with the packet to IHDR block 514. IHDR block 514 in turn can use the control information from the grant header to make appropriate packet modifications before forwarding the packet to the destination port via data crossbar 516. When the buffer in IBUF block 512 fills up, configurable thresholds may be exceeded, which can trigger various flow control and congestion management mechanisms.

EFCT 510 can allocate flow channels to packets, depending on the FTAG, the destination address, and the virtual network identifier (VNI). The match pattern can provide the separation between flows with separate ordering and priority constraints, between the same source and destination fabric ports. Typically, different cores on a node may be running with different VNIs and this separation of the flows allows the different cores to be decoupled.

If the match value is currently unique, a new flow channel can be allocated. If the match value is identical to the match value of an existing allocated flow channel, then the packet is assigned to the corresponding existing flow. The size of the packet can be used to increment the flow's data_flow value. In one embodiment, for an edge port, an OFCT 522 can be used as the EFCT. The acknowledgments, which are returned from downstream flow channel tables, are used to advance a flow's ack_flow value. When this value catches up with the data_flow value the flow channel can be automatically deallocated and its match pattern can be invalidated.

INQ block 520 can receive the header requests from EIQ block 508 and, for an ingress edge port, from EFCT 510 as well. INQ block 520 can store the lookup result header in its header RAMs. The pointer to each header can be stored in one of a set of queues, based on the header's corresponding flow channel. At edge ports, packet headers can be arbitrated for routing in a manner that is fair by application groups (APPGs), which can be used to group applications into different traffic classes. At fabric ports, headers can be arbitrated based on their flow channels. When a header is considered for routing, it can be forwarded to a fabric routing function (FRF) block 524 and subsequently to an IFCT 526 as well.

FRF block 524 can perform the routing function based on the network topology, and select the output port (or ports for multicast) to which a packet is to be forwarded. This routing result can be passed to IFCT 526, where it is combined with the rest of the header, and IFCT 526 can either use the result from FRF block 524 or choose to use the previous route for a given flow if maintaining packet order is important. IFCT 526 can then pass the forwarding result (i.e., the output port information for a given packet) back to INQ block 520 as a new request. This request can then be used to schedule the packet to traverse data crossbar 516 toward the desired output port.

The request can then be placed in a request queue (or queues) in INQ block 520 based on a shaping function corresponding to the flow channel, a virtual channel (VC) identifier, and the output port. (Note that VCs can be used to separate a physical link into groups of virtual links for the purpose of avoiding deadlocks.) After arbitration, the request can be sent over a request crossbar 528 to an age queues (AGEQ) block 530. Later, a corresponding grant can be returned via grant crossbar 518. When the grant is returned, INQ block 520 can fetch the corresponding header and return it to IBUF block 512, where the header is rejoined with its payload before being forwarded to IHDR block 514 and subsequently data crossbar 516.

As described earlier, IFCT 526 can measure the amount of flow data buffered in the local flow queues. It can also measure the amount of unacknowledged data downstream in the flow. IFCT 526 can also store returned acknowledgment code values in its tables and use this flow-specific state information with configuration information indexed by a packet's FTAG value to determine whether the header of the packets it receives is to be forwarded, discarded, or made to wait longer. The "made to wait" case can be realized by not dequeuing the header from the flow queue. The header can eventually be dequeued, and the decision to forward, discard, or made to wait can be made again. In one embodiment, IFCT 516 can have a "discard" interface to IBUF block 512, which allows the sop_ptr value to be passed to IBUF block 512 when a packet is to be discarded. In response, the packet's header can be dropped before being added to a request queue. IFCT 516 can further increment the corresponding statistics for dropped packets.

FRF block 524 can receive routing requests from INQ block 520 for each received packet, and for each routing request can return a routing response to IFCT 526. The routing response can indicate which port or ports the packet should be forwarded to and the VC on which it should be forwarded. For non-multicast requests, the response can indicate both a preferred port and a set of acceptable ports to which the packet can be forwarded, thereby allowing IFCT 526 to use the preferred port for a new flow or a rerouted flow, or, for an existing flow, to maintain the current path via a port that may not be FRF block 524's current preferred choice. In the presence of errors, the FRF may also indicate to the IFCT that there is no legal port the packet can be forwarded to. When this occurs, the packet is discarded.

FRF block 524's routing decisions can be based on a combination of software-configurable table-based rules, dynamic load information, and pseudo-random selection. Rules can take into account factors including the packet's destination, where it is along its path (such as source group, intermediate group, destination group, destination switch), the VC it is received on, and the type of port (edge, local, or global) at which it is received. AGEQ block 530 can provide FRF block 524 with the current load present at the output side of the port associated with a given FRF instance. Each FRF instance can communicate with every other FRF instance within the switch chip to learn the current load present at each output port, and the link up/down status of each port. FRF instances can also communicate with FRF instances in neighboring switch chips to obtain load-related status of the neighboring devices. In one embodiment, FRF block 524 can be configured to support multiple network topologies.

AGEQ block 530 can accept requests from all of the input ports via request crossbar 528, buffer them, arbitrate between them by traffic class using a traffic shaper, and pass them to OFCT block 522 to be granted grant crossbar 518. The buffering of request within AGEQ block 530 can be managed to allow each input to have sufficient space to send requests while also allowing an input with multiple flows targeting a given output to take more space. AGEQ block 530 can also be responsible for managing access to the link either using credit based flow control for the IBUF block of a neighbor switch chip or pause-based flow control for non-fabric links. When a packet is released by AGEQ block 530 (that is, a corresponding grant is issued for the packet that is waiting in IBUF block 512), the packet is to be placed on the outgoing link. Additionally, AGEQ block 530 can have a path allowing for packets initiated on a given port (such maintenance or reduction packets) to arbitrate for resources on the port.

OFCT 522 can be programmed to operate either as an EFCT for an egress edge port or an OFCT for a fabric port. For egress edge port operation, when the block is programmed as EFCT, the headers received from AGEQ block 530 can be passed through the EFCT to grant crossbar 518, largely unchanged. The EFCT can also receive new ACKs from an output buffer (OBUF) block 532 to acknowledge packets leaving the fabric. These ACKs can be returned to ACK crossbar 534 and will the ACKs that close flows in the upstream flow tables. The EFCT can also generate congestion notification messages when AGEQ block 530 is reporting congestion. This congestion, on an egress edge port, usually represents an incast forming and is used to slow down the flow back at the ingress edge port.

For fabric port operation, OFCT 522 can manage the allocation of the flow channels for the next hop switch over an outgoing link. It can work in tandem with the fabric link partner's IFCT and create extension to the flows that the link partner's IFCT can use to manage the forward progress of the packets.

OFCT 522 can also manage the ACKs received from the fabric link and return these ACKs upstream through ACK crossbar 534. Having created or extended an existing flow, OFCT 522 can generate the flow_ID and data_flow values which can be added to the next hop fabric header by IHDR block 514 and add these values to the grant that is returned with other header values back to grant crossbar 518.

The output buffer (OBUF) block 532 can capture packets that have been sent over data crossbar 516 to the corresponding output port. The packets can arrive on, for example, four different column buses and are enqueued on, for example, four separate FIFO queues (explained in more detail in conjunction with FIG. 5B). OBUF block 532 can arbitrate among these FIFO queues, checking whether each packet is a data reduction packet. Any data reduction packet that matches a descriptor in the reduction engine (RED) block 534 can be consumed by RED block 534. All other packets can be enqueued in the elastic FIFO queue where they wait to be transmitted to outgoing link. OBUF block 532 can include an output arbiter, which can select packets from the elastic FIFO queue, completed reduction packets from RED block 534, control packets from a control packet transmitter (CFTX) block 536, and injected packets from a management interface to transmit to the outgoing link.

OBUF block 532 can also generate ACK values to indicate mid-fabric congestion if AGEQ block 530 starts to fill or discard ACKs if AGEQ block 530 has discarded a packet.

In one embodiment, a control packet receiver (CFRX) block 538 can process all the control-related packets which can be extracted from IBUF block 512. These control-related packets can include congestion signaling packets, flow control credit issuing packets, and flow channel ACKs, among others. The congestion signaling information can be sent to FRF block 524 and used for making routing decisions. The credit-based flow control information can be sent to AGEQ block 530 for scheduling packet forwarding to the downstream switch. ACKs can be sent to OFCT 522, which in turn can identify the input port the ACK is to be forwarded to, and subsequently sent to ACK crossbar 534.

Correspondingly CFTX block 536 can send the ACKs (based on IFCT 526), credit-based flow control packets (based on the state of IBUF block 512), and congestion signaling packets to the corresponding output port.

OBUF block 532 can also generate a credit feedback, which indicates the landing space available for outgoing data packets, to AGEQ block 530 (note that this credit is used for crossbar scheduling between inputs and outputs of the crossbar, and is different from credits used for inter-switch flow control). This credit information is passed by AGEQ block 530, optionally via a credit crossbar 540, to INQ block 520, which uses this credit information to schedule packet extraction from IBUF block 512.

As mentioned above, there can be five crossbars in a switch chip: request crossbar 528, grant crossbar 518, credit crossbar 540, ACK crossbar 534, and data crossbar 516.

Request crossbar 528 can send requests from an input to the targeted output AGEQ block. A credit protocol can be used to guarantee that there is a landing space for a request at the output. Each request can contain a pointer (sop_ptr) to where the packet is stored in IBUF block 512.

Grant crossbar 518 can return a grant back to the input which satisfies a request. The grant can returns the pointer (sop_ptr). A grant is only returned when there is space in OBUF block 532 for the corresponding packet. Grants can also optionally return credit for request space in OBUF block 532.

Credit crossbar 540 can return credit for request space in OBUF block 532. ACK crossbar 534 can propagate ACK packets from output ports to input ports, based on OFCT 522. Data crossbar 516 can move granted packets from IBUF block 512 to the targeted OBUF block 532. Grants are only returned when there is a guaranteed landing space for the packet at the output so packets cannot be blocked.

Figure 5B:
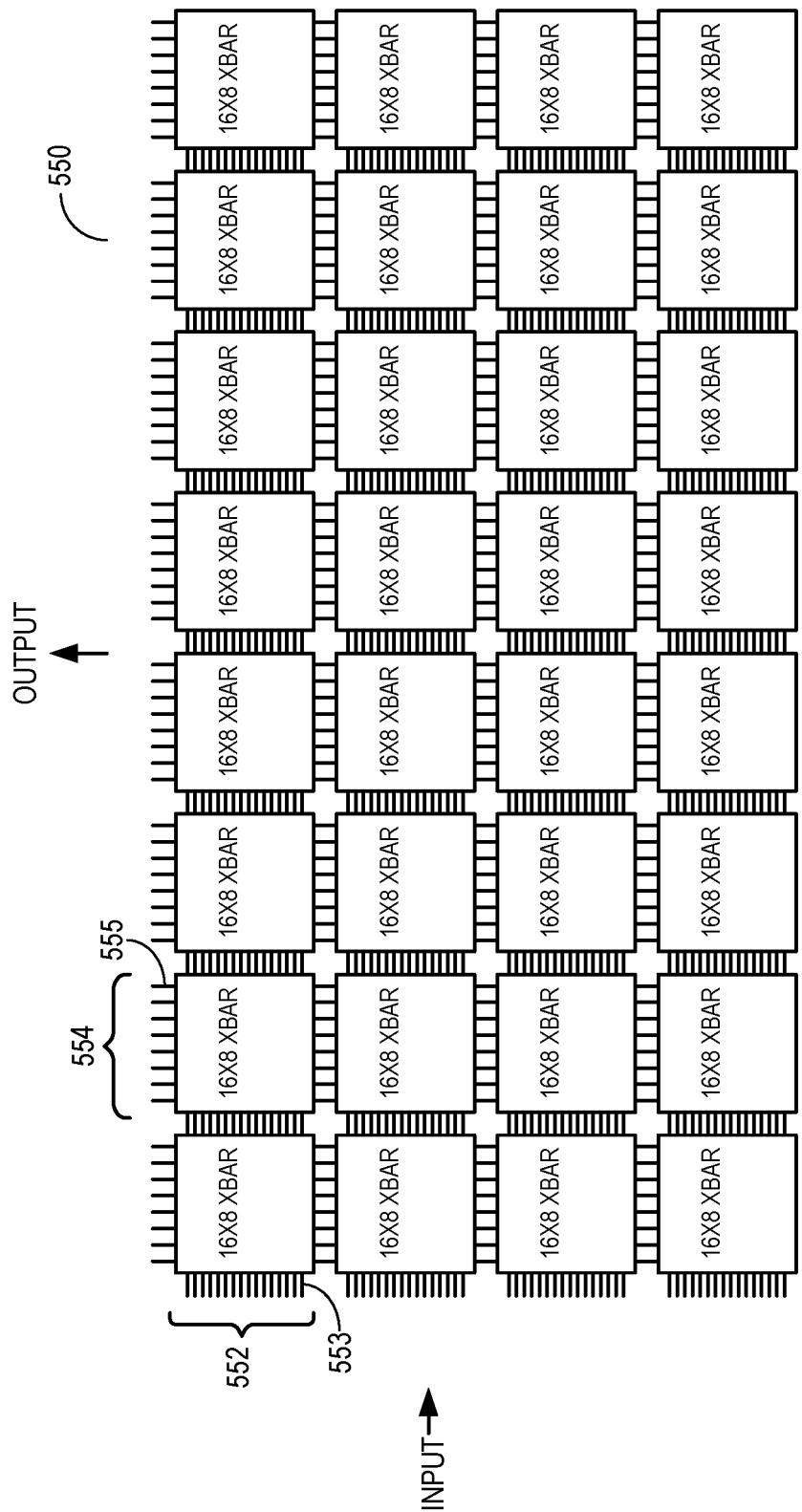
FIG. 5B shows an exemplary matrix of crossbar switch tiles.

FIG. 5B shows an exemplary crossbar. In this example, a crossbar tile matrix 550 can be used for forwarding data, ACKs, requests, grants, and credits. Data crossbar can move multi-clock packets with both headers and data payload, while the other four crossbars move only single-clock packet headers. All five crossbars can use the same basic architecture. As shown in FIG. 5B, crossbar tile matrix 550 can a 64×64 device composed of a 8×4 matrix of 32 crossbar tiles. Each tile can be a 16×8 crossbar switch with 16 inputs, one for each port in its corresponding row (for example, row 552), and 8 outputs, one for each port in its corresponding column (for example, column 554).

Figure 5C:
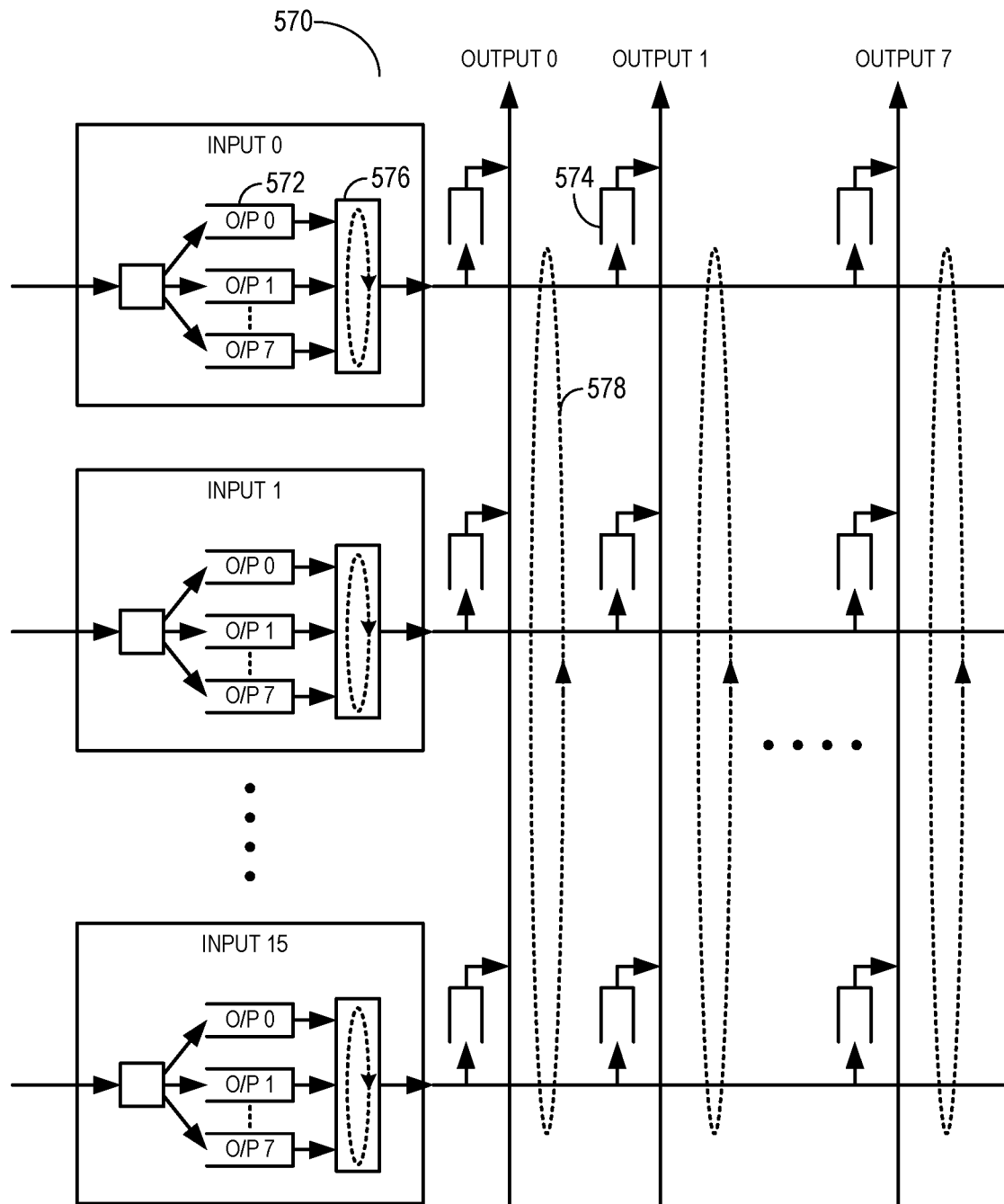
FIG. 5C shows an exemplary crossbar switch with virtual output queuing and crossbar queuing.

FIG. 5C shows an exemplary architecture of a crossbar tile. In this example, a crossbar tile 570 can have 16 input ports and 8 output ports. The input buffer of a respective input port, such as input 0, can be divided into separate virtual output queues, such as queue 572. Each virtual output queue corresponds to a respective output port. The virtual output queue arrangement can avoid input head-of-queue blocking. In addition, at each crossbar switch point there is a crossbar queue, such as queue 574, which can absorb a packet sent by a respective input on a row bus to the corresponding column bus. The crossbar queues can avoid blocking on the output (column) buses and allow the column buses to be utilized to a much fuller extent. During operation, the transmission of a packet from an input to an output is done with a request-grant mechanism. In the first round of arbitration, each virtual output queue can make a request to send its stored packet (if there is any). The transmission of the requests of all the virtual output queues from one input is done by an input arbiter, such as arbiter 576. Once these requests are made, the corresponding grants are issued by an output scheduler. After the grants are received by the input ports, the corresponding data packets are dequeued from the virtual output queues and forwarded by the crossbar switch. The packets are then temporarily stored in the crossbar queues for the appropriate output (column) bus. A second arbiter, such as arbiter 578, can be used to schedule extraction of packets from the multiple crossbar queues corresponding to a given column bus.

Now referring back to FIG. 5B, each row can have 16 row buses (such as row bus 553), which feed input data to all the tiles in that row. Each column can have 8 column buses (such as column bus 555), which deliver the forwarded data to the corresponding output ports. Row buses can be driven from each source in a row to all 8 crossbar tiles in that row. Each row can have identical connections with the one-to-all row bus connections for a single row. Arbitration can be done at the crossbar from the 16 row buses in that row to the 8 column buses in a given column. Buffering is provided at each 16×8 crossbar tile for each of the row buses in order to absorb packets during times when there is contention for a column bus. In one embodiment, a non-jumbo packet is not put on a row bus unless there is room for the entire packet in the targeted crossbar input buffer. To save chip real estate, jumbo packets are allowed to be placed on a row bus even if there is not sufficient space with the row bus being blocked until the packet wins arbitration and space is freed as it is moved onto a column bus (i.e., the input buffer can be sized only to sink a non-jumbo packets). Column buses can be driven from a given crossbar to each destination port within a column. Each destination port performs another level of arbitration between the column buses from the 4 rows. With 16 row buses driving 8 crossbars, each feeding 8 column buses, there can be a 4× speedup between rows and columns.

In one embodiment, row buses and column buses can both use a credit based protocol to determine when they are able to send (see arbiters 576 and 578 in FIG. 5C). In the case of row buses, the source port can maintains credit counts for the input buffers of the crossbars within that row. For the data crossbar, when a packet is allowed to go on a row bus depends on the queue configuration and state. If grants targeting a particular crossbar input buffer all go through a single queue then, space for the packet at the head of the queue is needed before starting the packet transfer. If the grants are distributed across multiple queues, then, in order to prevent small packets from locking out large packets, a packet transfer does not start unless there is space for an entire largest-sized packet in the buffer. In this way, once a packet transfer on a row bus starts, it will not stop until the entire packet has been transferred. Correspondingly, the crossbar input buffers are sufficiently large to handle the maximum packet size plus additional space to cover the worst case round trip (from packet-send to credit-return). This, however, may not be the case for jumbo packets. For jumbo packets, to save on buffering area, the crossbar input buffers can be set to have just enough space to handle a non-jumbo sized maximum-transmission-unit (MTU, e.g., approximately 1500 bytes) packet, with a jumbo packet being allowed to block a row bus while waiting to gain access to the targeted column bus.

For column buses, each crossbar tile can maintain credit counts for the input buffers at each destination port in that column. Unlike row buses, there is no requirement that credits be available for a largest-sized packet before starting transfer of that packet on a column bus. Individual words of the packet can be moved as credits become available. Therefore, the input buffer at the destination for each column bus needs to be only large enough to cover the worst-case round trip (e.g., from packet-send to credit-return).

As shown in FIGS. 5B and 5C, each crossbar tile can have 16 row bus input buffers and 8 possible destinations. Round-robin arbitration can be used between the 16 sources for each destination. For the data crossbar, once a source wins arbitration, it can retain control of the destination column bus until the entire packet has been sent.

In one embodiment, an output control block can be responsible for accepting requests from all of the input ports via the request crossbar, buffering them, and passing them to the OFCT to be granted via the grant crossbar. The AGEQ space can be managed by the output control block to allow a single input with multiple flows targeting a given output to move its requests to the AGEQ. The output control block can also be responsible for managing the use of space in the input buffer on a downstream neighboring switch (i.e., the link partner corresponding to an output port) and allocation of flow channels. Additionally, the output control block can have a path allowing for packets initiated on a given port, such as maintenance or reduction packets, to be arbitrated for resources on the port.

Requests can come into the output control block via a column bus from each row of the matrix. Each column bus can feed an independent FIFO queue with space in the FIFO queue managed via credits. These FIFOs can be sized sufficiently deep to cover the maximum round-trip delay plus some extra space to allow requests to be moved out of the crossbars and to prevent head-of-line blocking. Prior to being written into a FIFO queue the request can be checked for valid error check code (ECC). If an error is detected, the packet can be discarded with an error flagged.

In one embodiment, least recently used (LRU) arbitration can be used between the column bus FIFO queues to choose which FIFO queue is selected with the corresponding request forwarded to the AGEQ block. As requests are removed from each FIFO queue, credits can be returned to the corresponding crossbar.

The output buffer can make requests to the output control block for sending reduction and maintenance packets across the corresponding outgoing link. These requests can be given a higher priority. In one embodiment, reduction packets do not use flow channels, and maintenance packets can use loopback to create a flow, so there is no need to either check for flow channel availability or to use the OFCT to create a grant. They also do not use space in the output buffer so check of space is not required.

The size of the next request to be processed from the output buffer can be checked against the maximum packet size. If it exceeds this value, the request is not processed and an error flag can be set. This can result in the output buffer request path being blocked until a warm reset is performed.

In one embodiment, each input port can be allocated a fixed amount, denoted as fixed_alloc, of AGEQ space. This space can be sufficiently large to accommodate each traffic class associated with a respective input port, with sufficient additional space to cover the request-credit round trip. The allocation of this fixed space among different traffic classes within the same input port can be configurable. A traffic class can be identified by a combination of the shaping queue (SQ) identifier and virtual channel (VC) identifier. In one embodiment, the AGEQ can have 8k locations, each location corresponding to a unit of traffic. The total amount of fixed allocated space can be (64*fixed_alloc), and the remaining space can be 8k-64*fixed_alloc. This remaining space can be shared among all inputs.

The shared space can be managed by the output. Incoming requests can be moved from static to shared space as they arrive if there is room in the shared space, subject to per-input limits. When moving a request to the shared space a credit can be returned immediately via the credit crossbar with the request marked in the AGEQ as being in the shared space. When the request is granted, if it is marked as using the shared space, the shared space is credited. If it is not marked as using shared space, it is considered to have used the static space and a credit is returned to the input with the grant.

Due to conflicts in the credit crossbar, it is possible that credits may not be able to be sent every clock period. A FIFO queue can be used to provide buffering for these transient disruptions. In one embodiment, a request can be accepted from the request crossbar only if there is space in this FIFO queue. A FIFO queue with a depth of 32 locations, for example, can be used to limit the possibility of it backing up into the request crossbar.

The shared space in AGEQ can impose limits for how much space any single input can occupy. These limits can be set as a percentage of the available space. For instance, if the limit is set to 50%, and if one input is active, the input can have access to 50% of the shared space. With two active inputs, each input can have access to 37.5% of the share space, which is calculated as (space_used_by_1+space_left*0.5)/2=(50%+50%*0.5)/2=37.5%. With three active inputs, each input can have access to 29.2% of the shared space, which is calculated as (space_used_by_2+space_left*0.5)/3=(75%+25%*0.5)/3=29.2%, and so on.

The total shared space that can be used by the all the active inputs is limited to the total, which are 50%, 75%, and 87.5% in these three examples, respectively. With this configuration, the shared space allocated to each input can vary dynamically based on how many inputs are currently active. The addition of an active input can cause other active inputs to give up some of their shared space, which is then allocated to the new input.

Given that division can be costly to implement in hardware, this dynamic allocation function of the shared AGEQ space can be implemented as a lookup table with, for example, 64 entries, where each entry corresponds to a number of active input ports. The number of active input ports can be used as an index to the table. The values in the table can be the limit of the shared space any input can access, along with the total space they can consume as a whole. A software-based function can be used to program the values in the table according to how much total shared space there is and what percentage each input is allowed to use. As more inputs become active, each input is allowed less space and the total space available increases. Incoming requests from inputs that are above this limit, or in total above the total space limit, may not be allowed to take more shared space.

In order to track the number of active inputs in the AGEQ, a set of 64 counters (one for each input) can be used. These counters can count up when a request is placed in AGEQ and count down as they are taken out (granted). A second counter that counts of the number of non-zero counts can be used to index into the lookup table for shared space allocation. In addition, in order to manage the shared space, an additional set of 64 counters can be used to track the current usage of the shared space by each input. There can also be a single counter which tracks overall shared space usage. These counters can be compared against the current quotas to determine whether a request is allowed to use the shared space. In one embodiment, all counters can be 13-bits wide which is sufficient to cover, for example, the 8K locations in AGEQ.

Figure 5D:
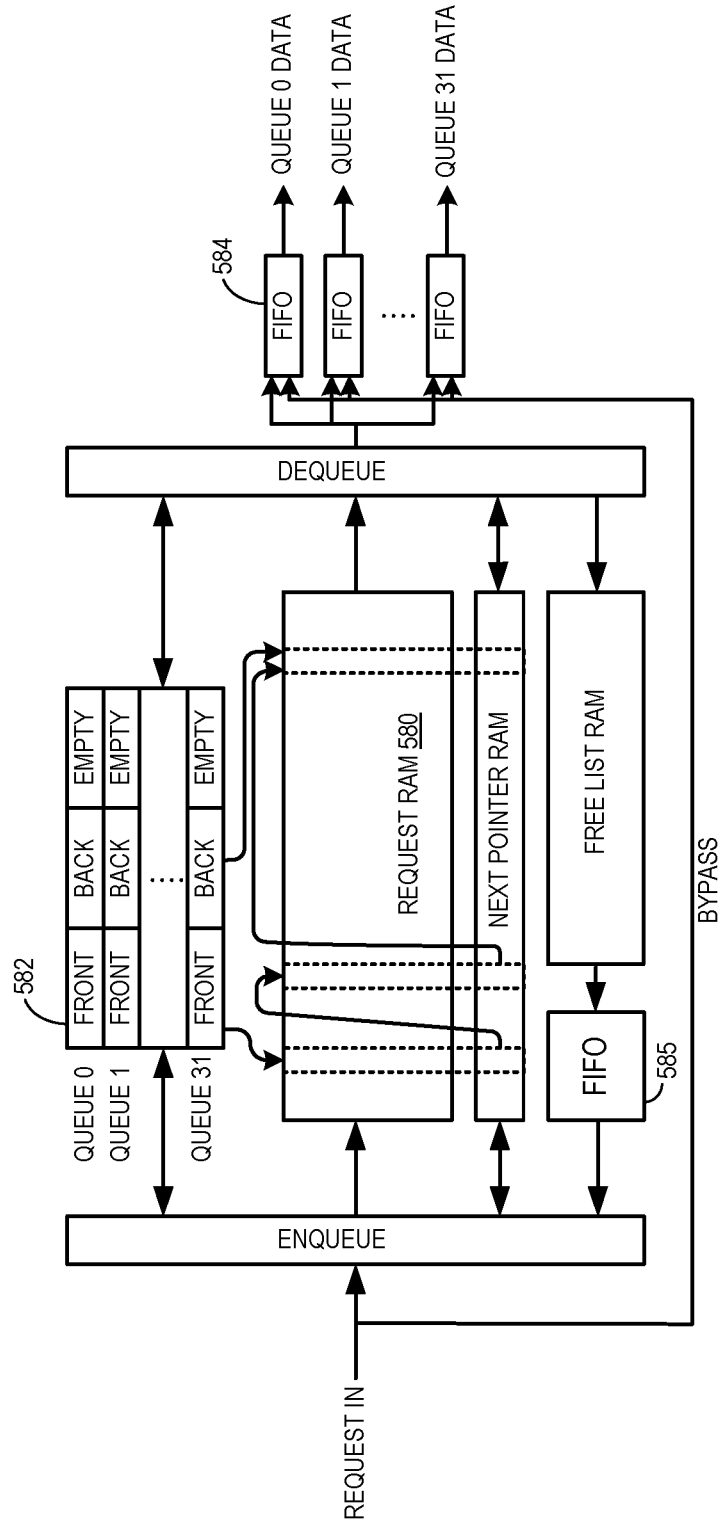
FIG. 5D shows exemplary age queues for storing requests.

FIG. 5D shows an exemplary implementation of the age queues. In this example, the age queues can use a request RAM 580 that has, for example, 8K locations. These locations can be dynamically allocated to a number of separate queues 582, which can correspond to the total number of traffic class (identified by the SQ value) and virtual channel (identified by the VC value) combinations. In one embodiment, a physical link can be divided into four VCs, and the system can support 8 traffic classes. Correspondingly, there are in total 32 (i.e., 4*8) separate queues, each for a unique SQ/VC combination. Each queue can be a linked-list of locations within the storage ram. This gives each SQ/VC combination the ability to occupy more space as needed.

As shown in FIG. 5D, each queue can include a front pointer pointing to the front of the linked-list. Each item in the linked-list also includes a pointer pointing to the next item in the linked-list. In one embodiment, the pointers pointing to the next item can be stored in a next pointer RAM. The last location in the queue can be pointed to by a back pointer. Each location in a respective queue can accommodate a request. Requests can be dequeued from the front of the queue and inserted at the back of the queue.

In addition to the linked-list data structure, each queue can also have a FIFO queue such as FIFO queue 584 of requests at its head. These FIFO queues can be used to ensure that a queue can sustain a request every clock with a mutli-clock read access time from the request RAM. When a new request arrives, if the head FIFO queue for that queue is not full, the request can bypass the request RAM and be written directly into the head FIFO queue. Once requests for a given queue are being written to the request RAM, subsequent requests are also written to the request RAM to maintain order. The bypass path can be used again once there are no more requests for that queue in the request RAM and there is room in the corresponding head FIFO.

When a request is read from a head FIFO queue, and there are corresponding requests queued in the request RAM, a dequeue operation can be initiated. Since only one head FIFO queue is read at a time, only a single dequeue operation can be initiated each clock period. Logic can be included to handle the various race conditions between an ongoing or imminent enqueue operation and a head FIFO queue being read.

The Free List RAM can be a simple FIFO queue which is initialized with pointers to all entries (e.g., 8k entries) whenever a reset is done. A count can be maintained to keep track of how many entries are valid within the Free List RAM. As entries are taken, they are popped off the front of the F1 FO and used. As entries are returned, they are pushed onto the back of a FIFO queue 585. A number of entries (for example, 3) at the head of the Free List RAM can be kept in flops so they are available for quick access.

In order to support full performance for small packets the age queues need to support both an enqueue operation and a dequeue operation every clock period. The operations on the data structures for an enqueue operation are given below. They differ depending on whether the queue being written is empty or not. In most cases a simultaneous enqueue and dequeue to a specific queue can be handled as they are using and updating separate fields. A special case would be the one where the dequeue operation empties the queue. In order to handle this case, the dequeue operation can take place first logically followed by the enqueue operation. This can be made possible by using an empty flag for the queue, which can be set when the queue is emptied by the dequeue operation and then cleared based on the enqueue operation.

Arbitration can be done among requests that are permitted to be granted subject to input buffer management, output buffer management, and flow channel quotas. Arbitration can also be stopped if there are no credits for the OFCT input FIFO queue. In one embodiment, arbitration can be done in two levels, one for among the SQs and one for among the VCs. A traffic shaping arbitration can be used to arbitrate between the SQs. A Deficit Round-robin arbitration can be used to arbitrate between VCs within a given SQ. The Deficit Round-robin arbitration is done between VCs in order to make the arbitration bandwidth fair. This can be implemented with each VC having a counter. All counters start at programmable quanta value stored in a control register (which in one embodiment can be set to match MTU for that SQ). When a VC wins arbitration its count is increased by the packet size. The counter value is then compared against the quanta value. If the counter value is less than the quanta value, that request is allowed to participate in arbitration. When there are valid requests and none can be granted due to their counts being too high, a quanta is subtracted from all counts (while the value is not allowed to go below 0 in one embodiment). This can release all requests to go and the process can repeat. With this arbitration, a VC with small packets on it can win arbitration more often than one with large packets, assuming a steady stream of packets.

In one embodiment, the traffic shaping arbitration can use a series of token buckets to control the bandwidth of each SQ. For example, if there are 8 SQs, there can be 8 leaf buckets (one for each SQ), 4 branch buckets, and one head bucket. Arbitration can be divided into three groups with group 1 having the highest priority, followed by group 2 and then group 3. For group 1 and 2, the arbitration can be done in the same way among eligible SQs. A ×8 Round-robin arbitration can be done between the SQs for each of the 8 priority levels (8 parallel Round-robin arbitration operations). A fixed arbitration can be done between the priority levels. The group 3 arbitration has no priorities and can be a single ×8 Round-robin arbitration. For group 1 arbitration, the priority for each comes from the setting in the leaf buckets. For group 2 arbitration, the priority comes from the setting in the branch buckets. In all cases, the buckets which are checked to be eligible for that group are also the buckets from which packet size tokens are taken if that request wins arbitration.

Packets can be classified in order to select the SQ to which their request is forwarded. This allows traffic associated with an application to be shaped differently to traffic from a different application or a different traffic class. This feature is especially important on the edge ports which connect to a NIC, because the applications are typically configured to use a share of the resources on the node, and similarly they are granted a proportion of the network bandwidth. In one embodiment, this classification can be performed by labeling the packets with an FTAG and a VNI as the packet enters the fabric. The FTAG and VNI are then used as the packet leaves the fabric to select the shaping queue. A configuration register can be used to map FTAGs to SQs.

In one embodiment, the AGEQ can have a number of shaping queues that are addressed by {SQ, VC}. For example, if there are 8 SQs and 4 VCs, there can be a total of 32 individual shaping queues. The corresponding 3-bit SQ index can be a shaping function, and the VC value maps to one of four queues (corresponding to the 4 VCs) within that shaping function. For Ethernet egress (edge) ports, the VC is not needed for deadlock avoidance, therefore all 32 shaping queues are available.

Management of the link partner input buffer can depend on the type of device the link is attached to. If a link is coupled to another switch, credit-based flow control can be used. In one embodiment, one credit can represent a cell of storage in the input buffer. If a link is coupled to other devices, standard Ethernet pause or priority pause based flow control can be used.

For credit based flow control, the link partner input buffer can be divided into a number of buffer classes (for example, 8 classes). In one embodiment, each buffer class can be mapped to a traffic class to facilitate differentiated service. Furthermore, each SQ can be assigned to one of these buffer classes. Credits can be maintained for each of the buffer classes with each credit representing a unit of storage (for example, 32 bytes) in the link partner input buffer. In order to allow credit based flow control to work with various devices with different unit cell sizes, in one embodiment, the cell size can be a programmable value.

A physical link is often divided into VCs, which can in turn be grouped into sets. For instance, there can be two sets of VCs, denoted as X and Y, and each set can include a number (e.g., 4) VCs. Meanwhile, traffic in each VC can be associated one of the SQs (and correspondingly one of the traffic classes). In one embodiment, a maximum-frame-size worth of space can be reserved for each VC in the input buffer, which is a fixed space allocated input buffer for each VC. In addition, each VC set can have a different maximum frame size. The rest of the link partner input buffer is shared dynamically, and this shared space can be used by any SQ and VC, subject to per VC and buffer class limits.

In one embodiment, the local (master) side of the link maintains a count of the number of packets sent from each VC across the sets (e.g., 8 total), a count of the amount of data (e.g., in 32-byte quantities) sent on each VC (e.g., 4 in total), and a count of the amount of data (e.g., in 32-byte quantities) sent for each buffer class (e.g., 8 in total). The link partner (slave) side of the link can maintain the same set of counts with the packets being sent over the outgoing link periodically. The difference between the master and slave counts, therefore, is a count of the number of packets in the link partner input buffer on each VC across all sets and a count of the amount of space (e.g., in 32-byte quantities) currently occupied by each VC and each buffer class. A count can also be maintained for the total amount of space used across all packets.

In one embodiment, the dynamic shared space can be allocated in two ways, each independent of each other. The first is a limit on how much dynamic space each of the VCs can take. The second is a limit to how much dynamic space each buffer class can take. In both cases, the limits are set as a percentage of the available space. For a given packet, allocation of input buffer space needs to within the respective limits in both its targeted VC and buffer class.

For instance, if each VC's dynamic space allocation has its limit set to 50% of all the available shared space, and if one VC is active, it can have access to 50% of the shared input buffer space. If there are two active VCs, then each can take 37.5% (which is calculated as (0.5+0.5*0.5)/2). If there are three active VCs, each can take 29.2% (calculated as (0.75+0.25*0.5)/3), and so on. That is, when there are N active VCs, each VC's share can be calculated by first computing the sum of (1) the total amount of space N−1 VCs are allowed to take, and (2) the remaining space times the percentage limit (which in this case is 50%) each VC is allowed to take; and then divide this sum by N.

Also, the total space used by all the VCs is limited to the given total (50%, 75%, 87.5%, respectively in the above example). With this method, the space allocated to each VC can vary dynamically by how many VCs are currently active. When an additional VC becomes active, it can cause others that are active to give up some of their space, which is then taken by the new active VC.

The example given above for VC dynamic space calculation can also be used for calculating shared space allowed for different buffer classes, based on the number of active buffer classes at a given moment. This allows the input buffer to be utilized more efficiently based on existing traffic load. In general, the available shared space that can be allocated to a packet in the input buffer is subject to the per-VC limit and per-buffer-class limit, according to the VC and buffer class of the packet.

Considering that this calculation may not easily be implemented in hardware at a sufficiently high speed, this function can be implemented as a lookup table. For the VC space that has for example 4 VCs, the VC shared space lookup table can have 16 entries, with each entry corresponding to one instance of possible active VC combinations and specifying the space available to each VC, along with the total space available across all VCs. That is, the total number of entries in a lookup table can be expressed as $$\sum_{i=0}^{N} \binom{N}{i},$$

wherein N is the total number of VCs, i is the number of active VCs, and $$\binom{N}{i}$$

is the number of i-combinations in a set of N samples. When N is 4, the above calculation produces 16, which is the number of entries in the lookup table. In the case of populating a shared space lookup table for 8 buffer classes, the lookup table can have 256 entries $$\left(\sum_{i=0}^{8} \binom{8}{i} = 256\right).$$

Each entry can specify the space available to each buffer class along with the total space available across all buffer classes. In one embodiment, space limit for each entry can be expressed in 2048-byte units.

As mentioned above, the size of each lookup is sufficient to cover all combinations of active VCs or buffer classes. Each VC or buffer class can have an independent setting for their allowed percentages of the shared input buffer space. It is therefore possible to program the values in the table according to how much total dynamic space there is and what percentage each VC or buffer class is allowed to take across all possible combinations. As more VCs or buffer classes become active, each VC or buffer class is allowed less space and the total available shared space for allocation increases. Requests for spaces that are above this limit, or in total above the total limit, may not be allowed to take more shared space.

A VC or buffer class is considered active if it has a request in an age queue or if it has outstanding credits for link partner input buffer space. As an example, assume there are 4 VCs (which results in a 16-entry lookuptable) with limit percentages for each VC set as VC0 (50%), VC1 (40%), VC2 (30%), and VC3 (10%), and a total dynamic space of 16 KB. This results in the space limit values given in the example in FIG. 5E, in quantities of 16-byte units. In this example, each entry represents a possible combination of active VCs among the 4 total VCs. For instance, entry 0 represents the case where there is no active VC. Entry 3 represents the case where VC0 and VC1 are active. Entry 11 represents the case where VC0, VC1, and VC3 are active.

The calculation for the space limit values in each entry is as follows. Take, for example, index 7, which represents the case where VC0, VC1, and VC2 are active. The total percentage of shared space that can be used by these three VCs can be calculated as 0.5+(1−0.5)*0.4+(1−0.5−(1−0.5)*0.4)*0.3=0.79=79%. This total space limit can then be shared among the three VCs proportionally based on their respective percentage limit (i.e., 0.5, 0.4, and 0.3). Hence, the space limit for VC0 expressed in 16-byte units is: (0.5/(0.5+0.4+0.3))*0.79*1024=337. (Note that the total 16 KB shared space equals to 1024 16-byte units.) For VC1, the space limit is (0.4/(0.5+0.4+0.3))*0.79*1024=270. For VC3, the space limit is (0.3/(0.5+0.4+0.3))*0.79*1024=202. The total shares space that can be allocated to these three VCs is 337+270+202=809=0.79*1024.

The above calculation can also be done for a shared space limit lookup table for different buffer (traffic) classes. For example, if there are eight traffic classes and correspondingly eight buffer classes, a lookup table with 256 entries can be created, with each entry indicating the class-specific shared space limits with a given active-class combination.

Figure 5E:
FIG. 5E shows an exemplary shared buffer space limit lookup table.
Figure 5F:
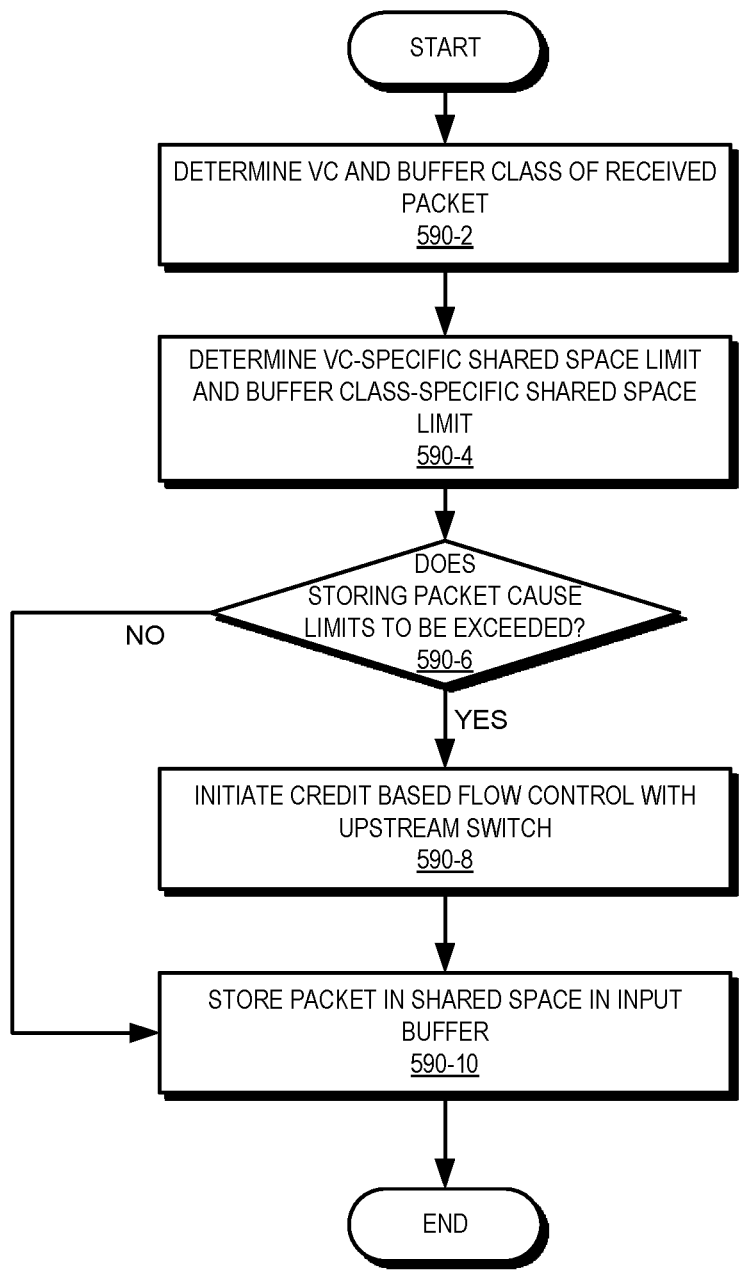
FIG. 5F shows a flow chart of an exemplary process of dynamic input buffer management.

The dynamic input buffer management process described above can be performed by an input buffer management logic block, which in one embodiment can be part of INQ block 520 or IBF block 512 in the exemplary switch architecture showing in FIG. 5A. FIG. 5F shows a flow chart of a dynamic input buffer management process. During operation, the system can first determine the VC and buffer class of a received packet (operation 590-2). In one embodiment, the buffer class can be derived from the traffic class associated with the packet, which can be indicated by the packet's FTAG. Next, the system can determine the VC-specific shared space limit and buffer class-specific shared space limit based on the packet's VC and buffer class, respectively (operation 590-4). Note that this determination can be done by looking up the VC space limit lookup table and buffer class space limit lookup table. An example of the VC space limit lookup table is shown in FIG. 5E. Next the system determines whether storing the packet in the input buffer can cause any of the VC-based or buffer class-based space limits to be exceeded (operation 590-6). Note that VC-based space limits can include the per-VC space limit (which corresponds to the packet's VC), and the overall space limit imposed on all the current active VCs. Similarly, buffer class-based space limits can include the per-buffer class space limit (which corresponds to the packet's traffic class), and the overall space limit imposed on all the current active buffer classes. If any of these limits can be exceeded with the packet being stored in the shared space in the input buffer, the system can initiate credit based flow control with the upstream switch from which the packet is received (operation 590-8). More details on credit based flow control are provided in the description below in conjunction with congestion management. Subsequently, the system can store the packet in the shared space in the input buffer (operation 590-10).

Congestion Management

As described above, each flow at a given switch can have its own private queue of packets. This configuration facilitates separate flow control for each flow. As a result, the network can remain mostly lossless, and one flow using a link can be blocked without blocking any of the other flows using the same link. Unlike a traditional packet switched network, congestion in one part of the network can only affect the flows that are contributing to the congestion. For example, in a conventional network, the buffers before a congested link can quickly fill up with the packets causing the congestion. This in turn can force the switch to issue a pause command or use some other flow control method to prevent neighboring switches from sending packets toward the congested link. Consequently, the packets causing congestion can be stopped or slowed down, and all other packets, which may not be heading to the congested link, can also be stopped or slowed down. As a result, the congestion could spread sideways and increase the size of the saturation tree from a topological perspective.

In contrast, with flow channels, the load corresponding to flows contributing to congestion can be reduced on the links leading up to the congestion. This reduction of load can allow other flows that are sharing these links to use more link bandwidth and deliver their payload more quickly, while only the packets contributing to the congested link are slowed down.

Typically, conventional networks can operate normally provided the network load is not at or near full capacity. This can be the case for small or medium sized networks most of the time. With large or very large networks operating with multiple bandwidth-hungry applications, however, at any point in time part of the network can be saturated with traffic load. Under these circumstances, unfair packet delivery could occur even if individual switches implement locally fair policies.

Figure 6A:
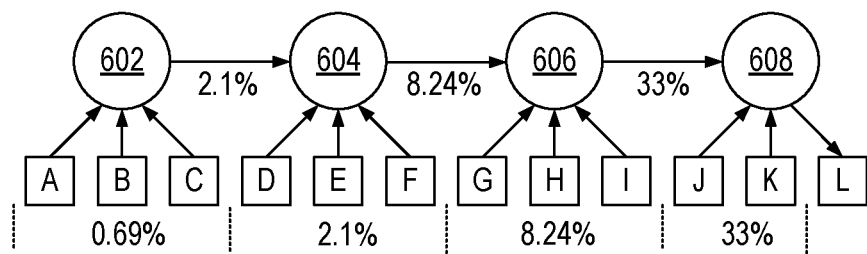
FIG. 6A shows an example where an unfair share of link bandwidth can occur in a network.

FIG. 6A shows an example where an unfair share of link bandwidth can occur in a network. In this example, each of the sources A to K is trying to send a stream of packets to destination L, forming an incast scenario where multiple sources are sending packets to a single destination. Source nodes A, B, and C are coupled to switch 602; source nodes D, E, and F are coupled to switch 604; source nodes G, H, and I are coupled to switch 606; and source nodes and J and K, and destination node L are coupled to switch 608. Assume that each switch has a fair arbitration policy of selecting an equal number of packets from each of its input ports to any particular output port. However, as can be seen in FIG. 6A, sources closer to the destination can receive a much higher proportion of the final link bandwidth than sources the traffic of which needs to pass through more stages of switching. Switch 608 has three sources of incoming data from nodes J, K and switch 606, and can divide the bandwidth on the outgoing link to node L equally among each source. Hence, nodes J, K can each take 33.3% of the bandwidth on the outgoing link toward destination node L.

The next nearest switch, which is switch 606, can do the same and so on. In this example, with only four stages of switches and only three or four inputs on each stage, and only with a total of 11 inputs trying to send to the destination node L, three input sources (nodes A, B, and C) only take ⅟₄₈ the bandwidth taken by two other input sources (nodes J and K) on the outgoing link toward destination node L. Hence, even with locally fair arbitration policies, nodes that are far away from the destination can suffer from very unfair treatment. A more realistic network topology can involve more switching stages, greater numbers of switch inputs, and more sources trying to send to a single destination. A moderate-sized incast could result in six orders of magnitude difference between the delivered bandwidths among different sources.

The unfairness problem described above is often caused by the fact that the arbitration policies implemented by a switch are based on the input ports. That is, the bandwidth throttling is done with a per-port granularity. In contrast, by facilitating flow channels and implementing flow-specific throttling, a network can significantly reduce the amount of unfairness among different flows. For example, in the scenario shown in FIG. 6A, when the switches implement a fair per-flow bandwidth allocation policy, all the eight source nodes can take substantially equal share of the bandwidth of the edge link between switch 608 and destination node L. By providing a much fairer flow based arbitration policy, extreme tail latencies of individual packets can also be substantially reduced. For large system installations, controlling the maximum latencies through a network is often a major concern for architects. Often, this can only be achieved by restricting the input bandwidth into a network to a small percentage of the peak bandwidth. For example, a input bandwidth limit of 20% of the peak bandwidth can be typical for large datacenters. With flow channels and proper control mechanisms, in contrast, it is now possible to build a network that does not impose such restrictions.

In addition to fairness, another challenge faced by network architects is congestion. In general, two types of congestions can occur in a network. The first type is end-point congestion, where an egress edge link coupled to a destination device is congested. The second type is fabric link congestion, where an intermediate fabric link is congested.

Figure 6B:
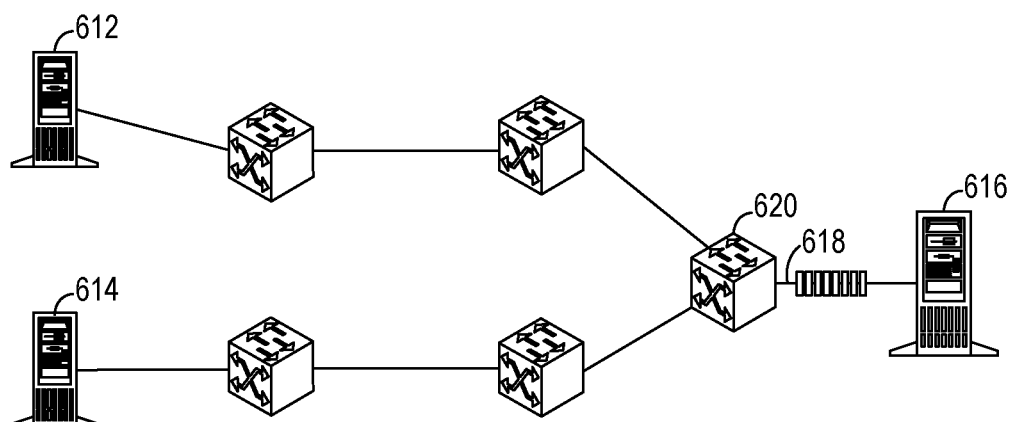
FIG. 6B shows an example of endpoint congestion.

FIG. 6B shows an example of endpoint congestion. In this example, two source hosts 612 and 614 are sending data to a destination host 616. Traffic from source hosts 612 and 614 converges at edge switch 620, and an egress edge link 618 between switch 620 and host 616 can become congested. This congestion scenario can typically occur with incast, where multiple sources are sending traffic to a single destination. Congestion can occur when egress edge link reaches its full data rate capacity, or when destination host 616 cannot process all the incoming packets at a sufficiently fast rate. In any case, the output transmission buffer on switch 620 that is coupled to link 618 can experience an increase in its stored data amount when endpoint congestion occurs.

A switch can detect and mitigate endpoint congestion by monitoring the output buffer on an egress edge link and by sending ACKs with congestion information to upstream switches and source nodes. More specifically, the output buffer coupled to an egress edge link can monitor the state of the buffer and detect congestion when certain criteria are met. When a packet arrives at or leaves an output buffer, the output buffer can compute three congestion-detection parameters, such as: (1) the amount of data stored in the buffer, (2) the number of packets stored in the buffer, and (3) the rate of change of buffer depth (amount of data stored in the buffer). Three threshold values can be set respectively for these three monitored parameters, although more or less can be set. Congestion is considered to be present when at least one of these parameters exceeds the corresponding threshold.

When congestion is detected, the switch can generate and transmit an endpoint-congestion-notification ACK corresponding to the packet that has just entered the output buffer. The ACK can include a value indicating the severity of the congestion. Note that this endpoint-congestion-notification ACK is not intended to notify upstream switches of the successful delivery of the packet, but to inform them of the presence and degree of congestion at the egress edge link. (In fact when this endpoint-congestion-notification ACK is sent, the packet may still be stored in the output buffer waiting to be transmitted onto the egress edge link.) This fast, explicit congestion notification mechanism allows the switches to act quickly on a specific flow contributing to the congestion.

In addition, the output buffer can update the congestion-detection parameters when a packet is dequeued and transmitted onto the egress edge link. If no congestion is present, a regular ACK is generated and sent, which can clear any previous congestion notifications received by the upstream switches operating on the corresponding flow. If congestion is present, the ACK can be marked with a flag, which allows the ACK to notify the switches of persistent congestion at the egress edge link as well as the successful delivery of the packet.

Figure 7A:
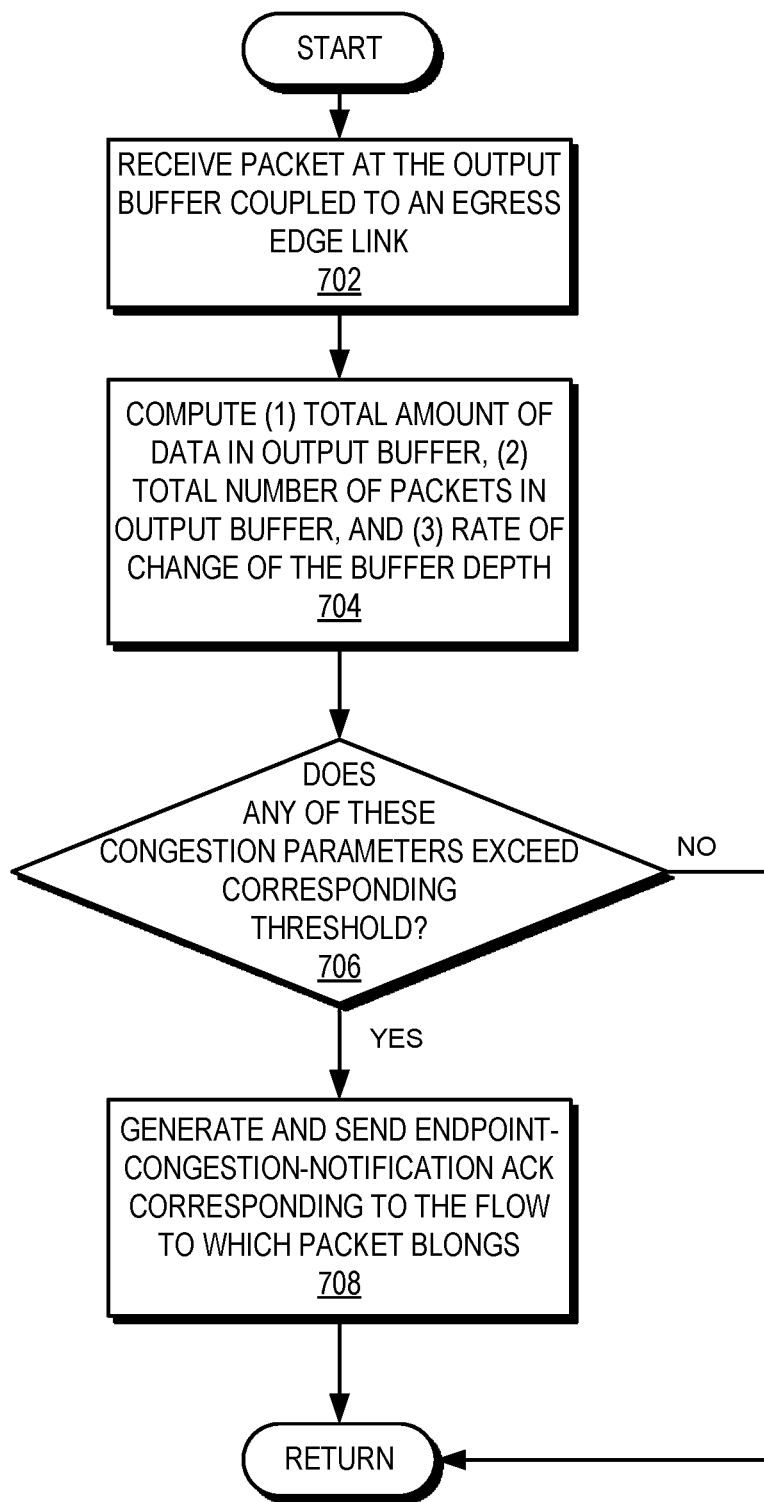
FIG. 7A shows a flow chart of an exemplary process of generating an explicit endpoint-congestion-notification ACK.

FIG. 7A shows a flow chart of an exemplary process of generating an explicit endpoint-congestion-notification ACK. During operation, the system can continuously monitor an egress edge link's output buffer. The system can then receive a packet at the output buffer (operation 702). Upon receipt of the packet, the system can compute the three congestion parameters (total amount of data, total number of packets, and rate of change of buffer depth) for the output buffer (operation 704). The system can further determine whether any of the parameters exceeds a corresponding threshold (operation 706). If at least one parameter exceeds the threshold, congestion is considered to be present. Accordingly, the system can generate and send an explicit endpoint-congestion-notification ACK packet corresponding to the packet's flow to the upstream switches (operation 708). If no congestion is detected, the system can return to normal operation.

Figure 7B:
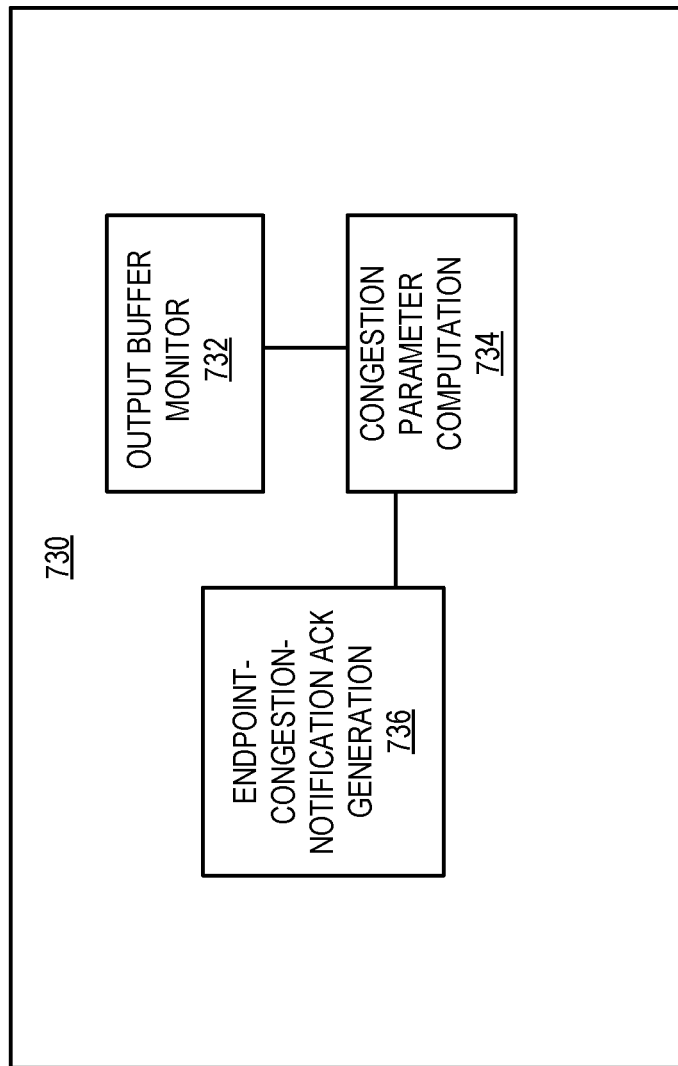
FIG. 7B shows an exemplary endpoint congestion management logic block.

FIG. 7B shows an exemplary endpoint congestion management logic block. In this example, an endpoint congestion management logic block 730 can include an output buffer monitor 732, a congestion parameter computation logic block 734, and an endpoint-congestion-notification ACK generation logic block 736. During operation, output buffer monitor 732 can monitor the state of an output buffer associated with an egress edge link. Based on the state of the monitored output buffer, congestion parameter computation logic block 734 can compute the three congestion parameters (see operation 704 in the flow chart in FIG. 7A). When one of these parameters exceeds the corresponding threshold, endpoint-congestion-notification ACK generation logic block 736 can generate an endpoint-congestion-notification ACK and transmit the ACK to the upstream switch.

Figure 8:
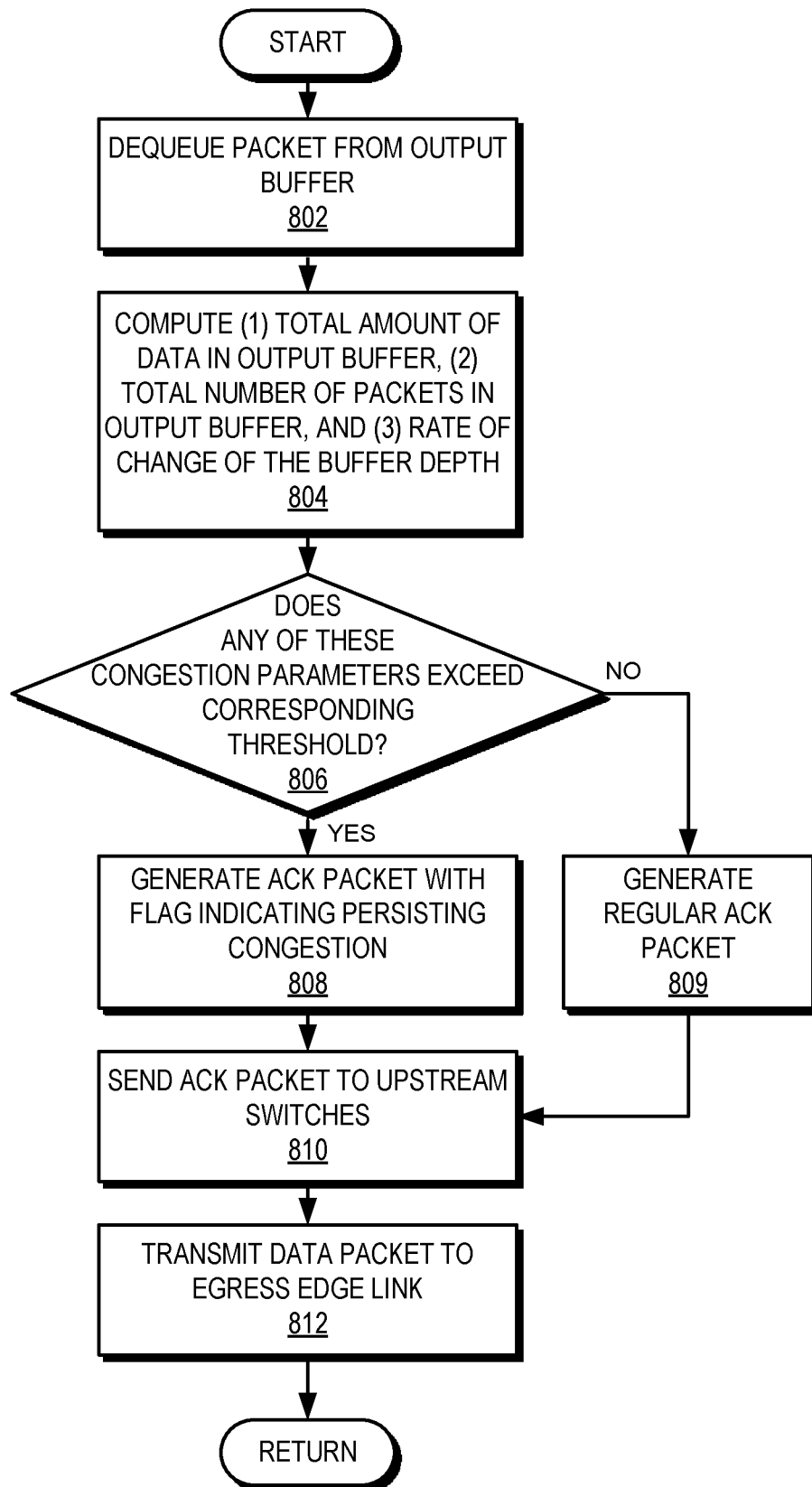
FIG. 8 shows a flow chart showing of exemplary process of generating an ACK in response to a packet being dequeued from an output buffer.

FIG. 8 shows a flow chart showing of exemplary process of generating an ACK in response to a packet being dequeued from an output buffer. In this example, the system first dequeues a packet from the output buffer (operation 802). The system can then compute the three congestion parameters (total amount of data, total number of packets, and rate of change of buffer depth) for the output buffer (operation 804). The system can determine whether any of the parameters exceeds a corresponding threshold (operation 806). If at least one parameter exceeds the threshold, congestion is considered to be present. Accordingly, the system can generate an ACK packet with a marked flag indicating persisting congestion (operation 808). If no congestion is detected, the system can generate a regular ACK packet (operation 809). The system can subsequently send the ACK packet to the upstream switches (operation 810), and transmit the dequeued data packet onto the egress edge link (operation 812).

Note that the endpoint congestion management logic block shown in FIG. 7B can also perform the operations described by the flow chart shown in FIG. 8. In other words, endpoint congestion management logic block 730 can potentially general endpoint-congestion-notification ACKs upon the arrival of a packet at the output buffer as well as the departure of the packet from the output buffer.

As an endpoint-congestion-notification ACK traverses the fabric, the IFCT's of the switches along the path can apply bandwidth limitations to the flow corresponding to the ACK. Effectively, the fabric can slow down the delivery of that flow in a distributed way at each switch along the data path. When an endpoint-congestion-notification ACK passes an IFCT its value can be stored in the flow's table entry as an ep_congestion value, which can be used to select a desired maximum bandwidth for the flow. Each value of ep_congestion can have a corresponding set of high, target, and drop watermark values. For high levels of congestion, when ep_congestion has a high value, the watermark values can have lower values, so that the congestion can be mitigated more aggressively. For low levels of congestion, when ep_congestion has a low value, a different set of greater high, target, and drop watermark values can be used for higher flow bandwidth. For example, a table indexed by the ep_congestion value can be used. For each ep_congestion value, the table can indicate a corresponding set of high, target, and drop watermark values. The entries of this table can be predetermined, so that when an endpoint-congestionnotification ACK is received, the switch can use the ep_congestion value to perform a lookup in this table, and apply the three corresponding watermark values to the identified flow.

In some cases, if the source is injecting data in a greedy manner, only slowing down the forwarding inside the network might not be sufficient to fully remove the congestion. To address this problem, an ingress edge switch can be configured to instruct the source device (which typically resides outside the fabric) to limit data injection on a fine-grain, per-flow basis. This switch-to-host flow control mechanism can be referred to as Fine Gran Flow Control (FGFC).

In particular, especially in an HPC environment, an end host or computing node could have a large number of cores running numerous threads, processes, or virtual machines, each of which could be injecting their own stream of data into the network through a common physical network interface controller (NIC). When congestion is present, a per-port based flow control can only throttle the overall data rate over a single port on the NIC, which can be 40 Gb/s or more. Pushing back on the total data rate on the entire port can cause unfairness to flows that are not contributing to congestion. FGFC can extend the concept of the individual flows or group of associated flows to their ultimate source, which can be a single thread executing on one of the cores.

To slow down data injection from the source, an FGFC logic block on an ingress edge switch (for example, FGFC logic block 434 in edge switch 406 in FIG. 4A) can use a pause-credit hybrid method to throttle incoming data associated a particular flow or group of flows. A pause-based method typically involves a receiving end issuing a pause command to the transmitter end, which in response can stop transmission until further notice. With a credit-based method, the receiving end can issue transmission credits to the transmitting end, which allows the transmitter to send more data but only up to the amount specified by the credit value. This mechanism allows the receiving end to control more precisely its input buffer depth to avoid overflow while allowing transmission to continue. FGFC can use a hybrid method, in which upon detection of congestion the ingress edge switch can issue a FGFC packet for one or more flows with a set timer value to the end host NIC (such as NIC 401 on end host 402 in FIG. 4A). After the FGFC packet is received, the ingress edge switch may turn on a credit-based flow control mode. In response, the NIC can throttle the transmission data rate for the corresponding flow(s) based on the received credit, while allowing other flows to be transmitted at normal data rate. After the predetermined timer expires, the end host NIC can revert to normal transmission for the throttled flow(s), unless another pause command is received. Note that a throttled flow can be identified by any field derived from a packet. A throttled flow can be specific to a single process or thread executed on the end host.

FGFC can implement the control communication between an edge switch and an end host NIC using an Ethernet frame with an Organizationally Unique Identifier (OUI) extended Ether_Type field. These frames can indicate one or more of the following: (1) the protocol used by the flow being controlled; (2) an identifier to indicate the source (e.g., application, process, or thread) generating the packets that need to be throttled; (3) a pause time value for which the flow control is to last (which can prevent a lockup if subsequent FGFC frames are lost due to errors), and (4) a credit value, which can be zero, to indicate the number of frames or amount of data that can be sent during the pause period.

Note that the identifier for indicating the source flow subject to flow control can be different based on the protocol associated with the flow. For layer-2 Ethernet virtual local area network (VLAN) traffic, the identifier can include the VLAN number. For IPv4 traffic, the identifier can include a source/destination IP address pair, a UDP or TCP/IP 5-tuple that includes UDP or TCP port numbers, or an optional flow label. For IPv6 traffic, the identifier can include one or more IPv6 addresses or an IPv6 flow label. For proprietary HPC protocol traffic, the identifier can include a process or thread ID. In general, this identifier is also stored in the EFCT of the edge switch, since it is used to map the corresponding traffic to a flow ID.

To trigger FGFC, the IFCT of an ingress edge switch can monitor its flow-specific input queues. For each queue, the corresponding IFCT entry can indicate three watermark values: high, target, and drop, which can be used to measure the queue depth. In some examples, these watermark values can be included as additional fields in the IFCT as shown in FIG. 4C, or can be stored in a separate table and linked by a field in the IFCT. When the queue depth is less than the target value, no FGFC is necessary. When the queue depth reaches the target watermark value, the IFCT can communicate with an FGFC logic block to initiate FGFC with an end host's NIC. When the queue depth reduces to below the drop watermark value, FGFC can be stopped and normal transmission for the flow can be resumed.

Figure 9A:
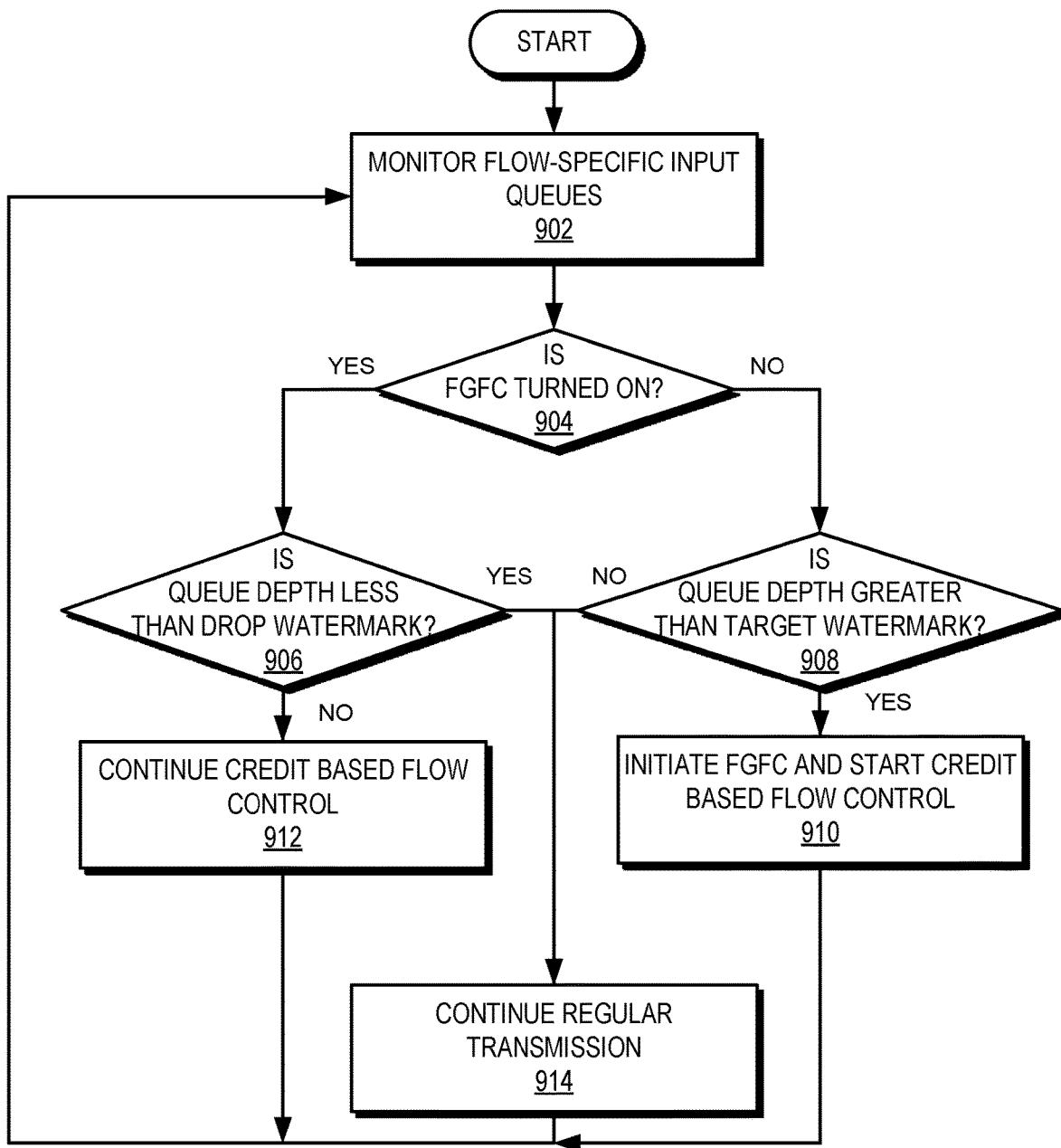
FIG. 9A shows a flow chart of an exemplary fine grain flow control (FGFC) process.

FIG. 9A shows a flow chart of an exemplary FGFC process. During operation, at an ingress edge switch, the system can monitor the flow-specific input queues (operation 902). The system can further determine, for a respective flow, whether FGFC is currently turned on (operation 904). If FGFC is currently turned on for this flow, the system can then determine whether the queue depth is below the drop watermark (operation 906). If the queue depth has not reduced to below the drop watermark, the system can continue the credit based transmission in the FGFC mode (operation 912). If the queue depth has reduced to below the drop watermark, the system can revert to normal transmission for the flow (operation 914). Referring back to operation 904, if FGFC is currently not turned on, the system can determine whether the queue depth is greater than the target watermark (operation 908). If so, the system can initiate FGFC for the flow (operation 910). The FGFC logic block in the edge switch can obtain flow identifying information (e.g., VLAN tag, TCP/IP 5-tuple, thread ID, etc.) from the EFCT entry corresponding to the flow and send an FGFC Ethernet frame to the NIC on the end host. Subsequently, the system can continue to monitor the input queues (operation 902). If the queue depth is not greater than the target watermark, the system can continue regular data transmission (operation 914)

Figure 9B:
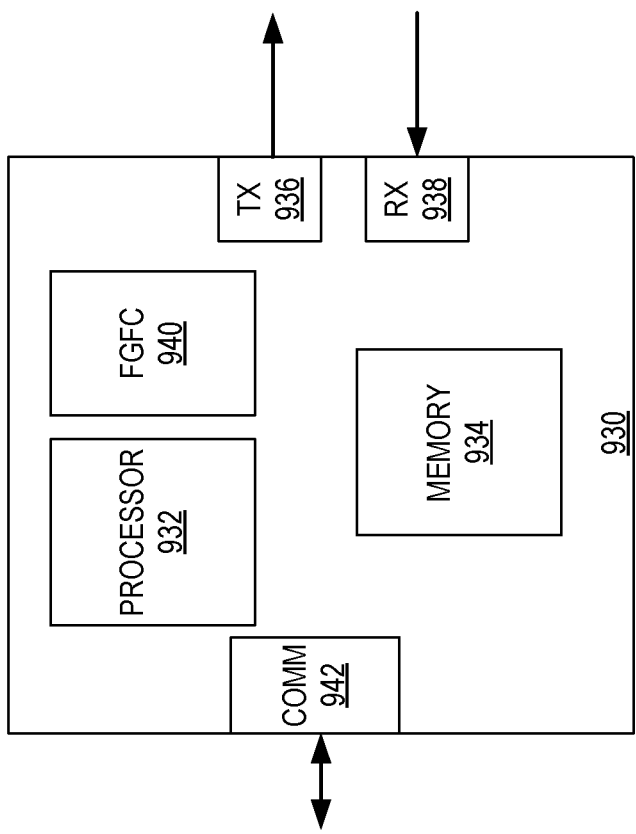
FIG. 9B shows an example of a FGFC-enabled network interface controller.

To facilitate FGFC, a NIC can be configured to process the FGFC Ethernet frame, so that the NIC can communicate to the application or process on an end host that is generating the data. Parsing of the FGFC Ethernet frame and communication to the application or process can be done in software, hardware, or a combination of both. FIG. 9B shows an example of a FGFC-enabled NIC. In this example, a NIC 930 can include a processor 932, a memory 934, a transmitter 936, a receiver 938, a FGFC logic block 940, and a communication logic block 942. During operation, transmitter 936 and receiver 938 can perform communication to and from an edge switch via an edge link. Communication logic block 942 can perform communication via a data bus (such as a Peripheral Component Interconnect Express (PCIe) bus) with the central processing unit of the end host in which NIC 930 resides. Processor 932 and memory 934, which are internal to NIC 930, can perform local processing of the data. During operation, FGFC logic block 940 can work with an edge switch to apply FGFC on a per-flow basis. In addition, FGFC logic block 940 can communicate via communication logic block 942 with the end host's central processing unit to throttle and data injection of an individual application or process corresponding to the specific flow subject to FGFC, thereby controlling the amounted of data injected into the fabric.

Figure 10:
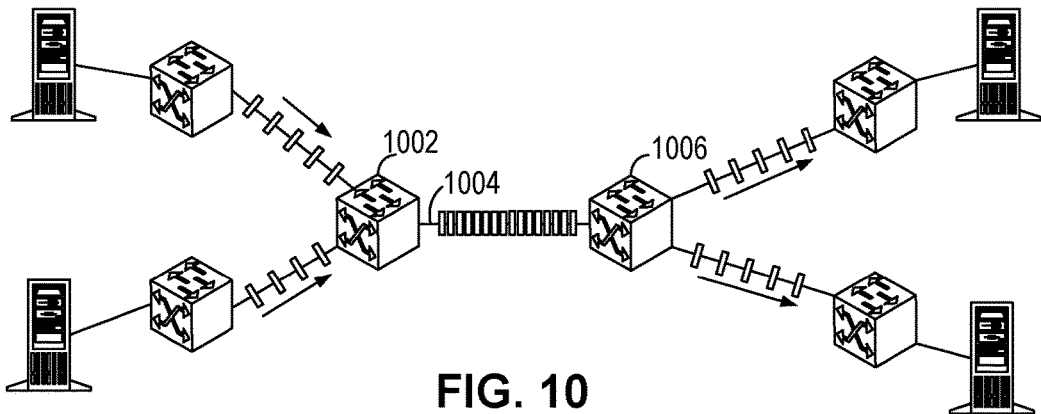
FIG. 10 shows an example of fabric link congestion.

As mentioned above, two types of congestions can occur in a network. A first type is endpoint congestion, and a second type is fabric link congestion. FIG. 10 shows an example of fabric link congestion. In this example, two intermediate switches 1002 and 1006 are in communication via a fabric link 1004. Multiple source/destination pairs can be sending traffic via fabric link 1004. As a result, fabric link 1004 can experience congestion, although the links leading up to and away from fabric link 1004 might not be congested. Fabric link 1004 can appear to be a "hot spot" when such congestion occurs.

To mitigate fabric link congestion, a switch can apply dynamic per-flow credit-based flow control. At a switch, if an input queue starts to fill up, and the queue_extent value for this flow reaches a predetermined threshold, the switch can generate a special ACK to notify the upstream switch's IFCT of the congestion. This special per-hop ACK can be referred to as "HeadroomACK." Upon receiving the HeadroomACK, the upstream switch's IFCT can start a credit based flow control with the downstream switch. In the downstream IFCT entry, a flag Upstream Metering (UM) can be set to indicate that the data transmission from the upstream switch is now metered based on the credits. The HeadroomACK packet can also include a credit value.

When the upstream switch receives a HeadroomACK, a flag called Downstream Metered (DM) can be set in the corresponding entry of the IFCT. The IFCT can also store a signed headroom field in the IFCT entry with the credit value carried by the HeadroomACK (i.e., the headroom value indicates the number of credits). This headroom field can represent the amount of data that can be forwarded to the downstream switch. This establishes a credit based flow control for the corresponding flow. If the upstream IFCT receives a HeadroomACK while the DM flag in the flow's entry is already set, the credit value carried by the HeadroomACK can be added to the existing headroom value.

New packets received by the upstream IFCT can be blocked if the headroom value is not greater than zero (i.e., there is no credit available). These packets can fill this flow's input queue and may in turn cause the IFCT to initiate per-flow credit based flow control with its upstream IFCT, and so on. If the headroom value is greater than zero, a packet stored in the input queue can be dequeued and forwarded to the downstream switch, and the headroom value can be decremented by the size of the forwarded packet, which may cause the headroom value to become zero or negative.

With the flow restricted from sending new packets to the downstream IFCT, the downstream IFCT's input queue can start to drain at some rate depending on its downstream congestion. As described above, each flow's input queue can have three queue-depth watermark values, namely high, target, and drop, which can be used to manage credit-based flow control. The target watermark can be approximately the ideal queue depth for the desired flow bandwidth. It indicates sufficient buffering is available for transmitting data downstream. When there is congestion, the credit-based flow control mechanism can attempt to keep the flow's queue_extent value approximately at this target watermark.

If the queue_extent value is between the high watermark and drop watermark, and is greater than the target watermark, when a packet is forwarded, slightly less than this packet's size of credit can be returned with a HeadroomACK to the upstream switch. If the queue_extent value does not exceed the target watermark, when a packet is forwarded, slightly more than this packet's size of credit can be returned with the HeadroomACK to the upstream switch.

If the queue_extent depth is greater than the high watermark, no credit is returned when packets are forwarded. This mechanism can bring the queue_extent value down more quickly and is usually used when congestion is detected for the first time. If the congestion clears, the flow's input queue can start to empty more quickly. When the queue depth is less than the drop watermark, the credit-based flow control can be switched off. This can done by clearing the UM flag in the IFCT entry and returning a HeadroomACK with the maximum credit value to the upstream switch. When received by the upstream IFCT the HeadroomACK clears the entry's DM flag and flow control against the headroom value is turned off.

Note that in a typical network topology there can be a number of switches and between two endpoints there can be multiple data paths. In a multi-path network, it is possible to use various methods to control fabric link congestion. For example, the injection limits, described later in this document, can control the maximum total amount of data in the entire fabric. This means that if a particular fabric link is overloaded, a flow can use a different data path that does not go through the congested link. It is possible to detect an overloaded link and generate "reroute" ACKs for a set of flows. The reroute ACKs can temporarily block the flow in an upstream switch, and when all the ACKs for that flow have been returned, the flow can be unblocked and become free to use a different path across the fabric. A dynamic load-based adaptive routing mechanism can then direct the lead packet to use a different uncongested fabric link. In turn the load across the entire fabric can become more balanced.

Figure 11:
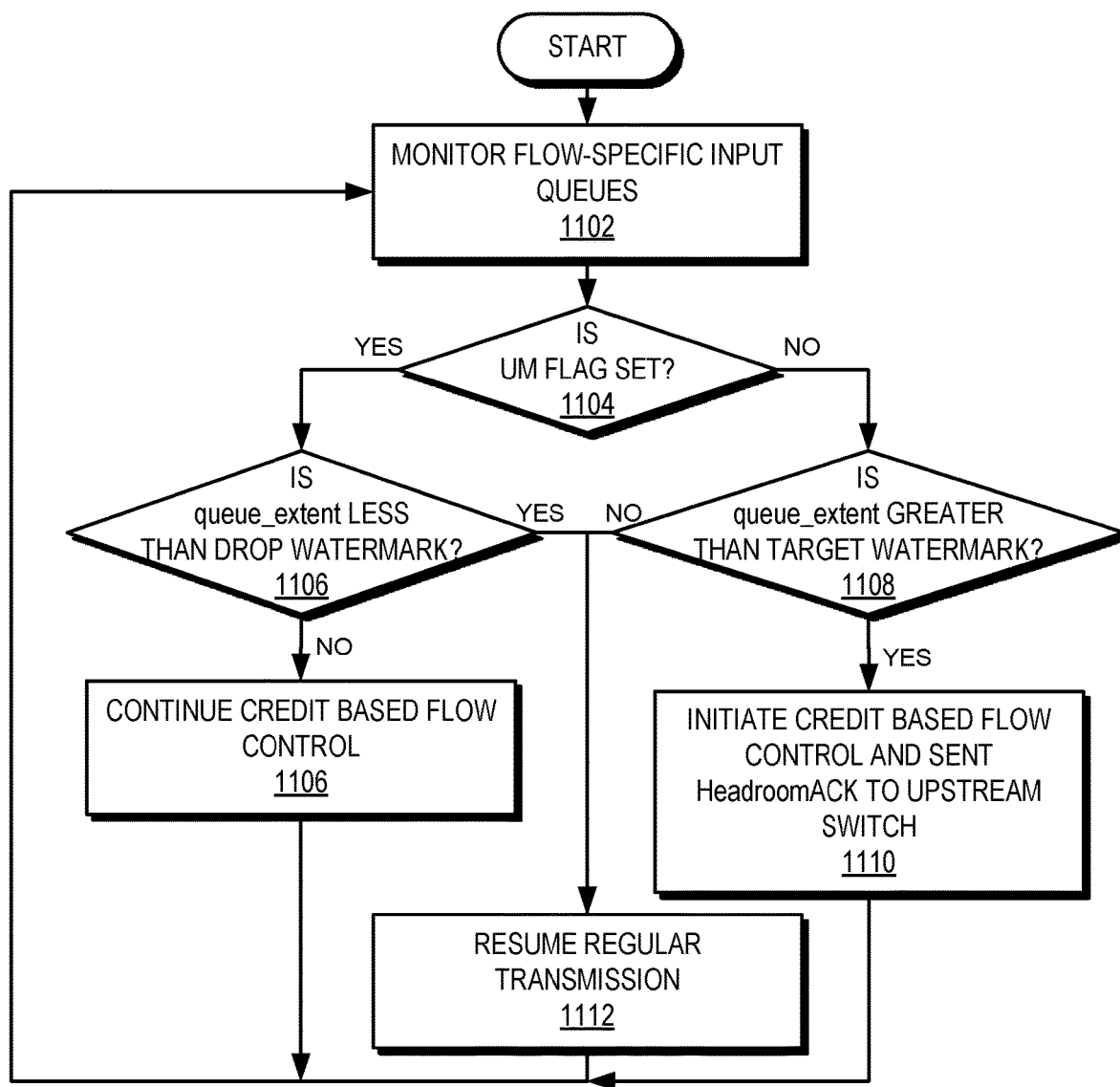
FIG. 11 shows a flow chart of an example process of applying credit-based flow control on a congested fabric link.

FIG. 11 shows a flow chart of an example process of applying credit-based flow control on a congested fabric link. During operation, a switch system can monitor its flow-specific input queues (operation 1102). The system can determine whether an entry in its IFCT has a UM flag set (operation 1104). If the UM flag is set, which means that credit-based flow control is on, the system can further determine whether the queue_extent value is less than the drop watermark value (operation 1106). If the queue_extent value is less than the drop watermark value, the system can clear the UM flag, turn off the credit-based flow control, and resume normal data transmission (operation 1014). If the queue_extent value is greater than the drop watermark value, the system can continue the credit-based flow control (operation 1106). Referring back to operation 1104, if the UM flag is not set, which means the system is in regular transmission mode, the system can determine whether the queue_extent value is greater than the target watermark value (operation 1108). If so, the system can initiate credit-based flow control and send a HeadroomACK to the upstream switch (operation 1110). If the queue_extent value is not greater than the target watermark value, the system can continue with regular data transmission (operation 1112).

In general, a flow channel switch can use a combination of several congestion detection and control mechanisms. For example, different degrees of endpoint congestion can be reported using the endpoint-congestion-notification ACK that can be returned from the final fabric egress edge port. This ACK type can be used to manage the bandwidth of flows into a significantly congested egress edge port. The system can also use a per-hop credit-based flow control to manage fabric link congestion. This per-hop congestion management mechanism can be effective against low to moderate levels of congestion, because the response time can be much shorter than the network-wise round trip delay.

If the congestion is severe, perhaps caused by a wide incast, the system can also apply a per-flow injection limit. A flow's injection limit can be determined based on the ep_congestion value. The injection limit can be compared with the flow_extent value in all IFCTs the flow passes through. If the flow_extent is greater than this limit the IFCT can block the forwarding of packets from the input queue for this flow. This mechanism can reduce the rate of forwarding of packets over an entire flow to as little as a single packet.

The system can also protect unrelated traffic from extreme congestion caused by incasts with a large number of contributors. In this case, the ep_congestion value can be set to a high value and the average amount of data of a flow can be reduced to a small fraction of a packet. This can be achieved by only releasing the next packet of an individual flow into the fabric from the ingress edge port's IFCT after a programmable delay has elapsed since when the ACK of the previous packet has been received.

In addition to per-flow injection limits, the system can measure the amount of data that has been injected into the fabric on a per-ingress-port basis, and set injection limits to impose a cap on the total amount of data a port can inject into the fabric. Since every ingress port can apply this injection limit, the system can control the maximum amount of data allowed inside the fabric. Limiting the total amount of data into the fabric can ensure that buffer exhaustion does not occur where bandwidth is scarce. As a result, traffic which is not using the paths with reduced bandwidth are not affected.

To facilitate per-port injection limit, an IFCT can maintain a total traffic count. Each time a packet is injected into the fabric from the edge port the total count can be incremented. When a flow's ACK is returned, the total traffic count can be decremented. Once all the ACKs of all the flows of an ingress port have been returned (i.e., when the sum of the flow_extent values for all the flows becomes zero), the total traffic count can be set to zero.

Figure 12:
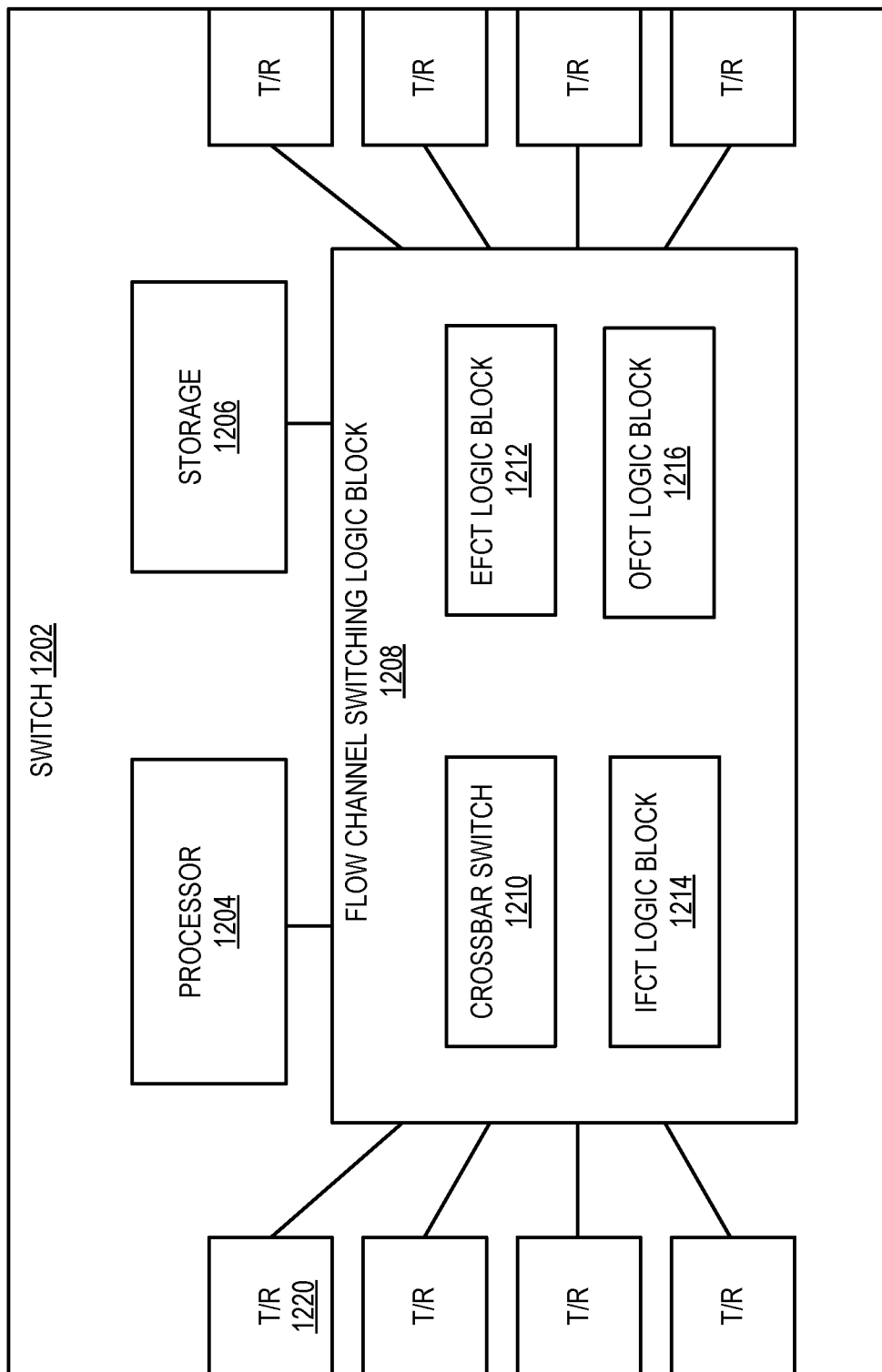
FIG. 12 shows an exemplary edge switching system that facilitates flow channels.

FIG. 12 shows an exemplary edge switching system that facilitates flow channels (which, for example, can correspond to switch 406 in FIG. 4A). In this example, a switch 1202 can include a number of communication ports, such as port 1220. Each port can include a transmitter and a receiver. Switch 1202 can also include a processor 1204, a storage device 1206, and a flow channel switching logic block 1208. Flow channel switching module 1208 can be coupled to all the communication ports and can further include a crossbar switch 1210, an EFCT logic block 1212, an IFCT logic block 1214, and an OFCT logic block 1216.

Crossbar switch 1210 can include one or more crossbar switch chips, which can be configured to forward data packets and control packets (such as ACK packets) among the communication ports. EFCT logic block 1212 can process packets received from an edge link and map the received packets to respective flows based on one or more header fields in the packets. In addition, EFCT logic block 1212 can assemble FGFC Ethernet frames, which can be communicated to an end host to control the amount of data injected by individual processes or threads. IFCT logic block 1214 can include the IFCT, and perform various flow control methods in response to control packets, such as endpoint-congestion-notification ACKs and fabric-link credit-based flow control ACKs. OFCT logic block 1216 can include a memory unit that stores the OFCT and communicate with another switch's IFCT logic block to update a packet's flow ID when the packet is forwarded to a next-hop switch.

Figure 13:
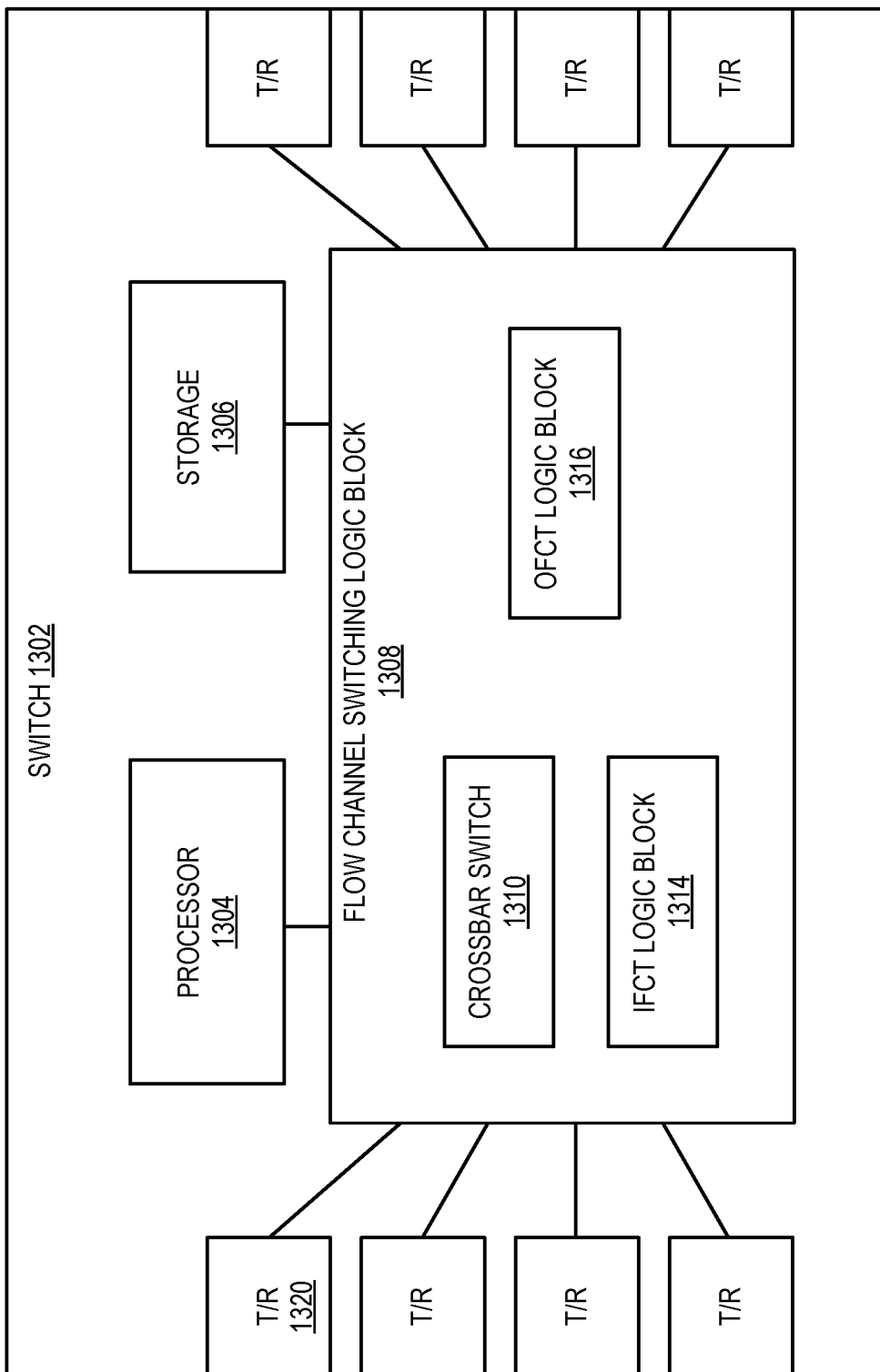
FIG. 13 shows an exemplary intermediary switching system that facilitates flow channels.

FIG. 13 shows an exemplary intermediary switching system that facilitates flow channels (which, for example, can correspond to switches 408 and 430 in FIG. 4A). In this example, a switch 1302 can include a number of communication ports, such as port 1320. Each port can include a transmitter and a receiver. Switch 1302 can also include a processor 1304, a storage device 1306, and a flow channel switching logic block 1308. Flow channel switching module 1308 can be coupled to all the communication ports and can further include a crossbar switch 1310, an EFCT logic block 1312, an IFCT logic block 1314, and an OFCT logic block 1316.

Crossbar switch 1310 can include one or more crossbar switch chips, which can be configured to forward data packets and control packets (such as ACK packets) among the communication ports. EFCT logic block 1312 can process packets received from an edge link and map the received packets to respective flows based on one or more header fields in the packets. In addition, EFCT logic block 1312 can assemble FGFC Ethernet frames, which can be communicated to an end host to control the amount of data injected by individual processes or threads. IFCT logic block 1314 can include the IFCT, and perform various flow control methods in response to control packets, such as endpoint-congestion-notification ACKs and fabric-link credit-based flow control ACKs. OFCT logic block 1316 can include a memory unit that stores the OFCT and communicate with another switch's IFCT logic block to update a packet's flow ID when the packet is forwarded to a next-hop switch.

In summary, the present disclosure describes a data-driven intelligent networking system that can accommodate dynamic traffic with fast, effective congestion control. The system can maintain state information of individual packet flows, which can be set up or released dynamically based on injected data. A packet flow can be mapped to their layer-2, layer-3, or other protocol-specific header information. Each flow can be provided with a flow-specific input queue upon arriving at a switch. Packets of a respective flow are acknowledged after reaching the egress point of the network, and the acknowledgement packets are sent back to the ingress point of the flow along the same data path in the reverse direction. As a result, each switch can obtain state information of each flow and perform flow control of a per-flow basis. Such flow control allows the network to be better utilized while providing versatile traffic-engineering and congestion control capabilities.

The methods and processes described above can be performed by hardware logic blocks, modules, or apparatus. The hardware logic blocks, modules, or apparatus can include, but are not limited to, application-specific integrated circuit (ASIC) chips, field-programmable gate arrays (FPGAs), dedicated or shared processors that execute a piece of code at a particular time, and other programmable-logic devices now known or later developed. When the hardware logic blocks, modules, or apparatus are activated, they perform the methods and processes included within them.

The methods and processes described herein can also be embodied as code or data, which can be stored in a storage device or computer-readable storage medium. When a processor reads and executes the stored code or data, the processor can perform these methods and processes.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for facilitating dynamic buffer management in a switch, the method comprising:
    reserving a fixed space of an input buffer for each virtual channel of a physical link;
    determining a virtual channel and buffer class associated with a received packet on the physical link;
    determining one or more active virtual channels;
    determining a virtual channel space limit in a shared space of the input buffer corresponding to the virtual channel associated with the received packet by calculating a total amount of dynamic space in the input buffer available to the active virtual channels and a percentage each of the active virtual channels is allowed to take across all possible active virtual channel combinations;
    determining one or more active buffer classes;
    determining a buffer class space limit in the shared space of the input buffer corresponding to the buffer class associated with the received packet by calculating a total amount of dynamic space in the input buffer available to the active buffer classes and a percentage each of the active buffer classes is allowed to take across all possible active buffer classes combinations; and
    storing the received packet in the input buffer subject to the virtual channel space limit and buffer class space limit, the determining of the one or more active virtual channels and the one or more active buffer classes being based on one of existence of a request in an age queue or having outstanding credits for link partner input buffer space.

2. The method of claim 1, further comprising:
    determining that storing the received packet in the input buffer meets a predetermined condition based on the determined virtual channel space limit; and
    initiating credit based flow control with an upstream switch.

3. The method of claim 1, further comprising:
    determining that storing the received packet in the input buffer meets a predetermined condition based on the determined buffer class space limit; and
    initiating credit based flow control with an upstream switch.

4. The method of claim 1, wherein determining the virtual channel space limit comprises looking up a virtual channel space limit lookup table based on the active virtual channels; and
    wherein determining the buffer class space limit comprises looking up a buffer class space limit lookup table based on the active buffer classes.

5. The method of claim 4,
    wherein an entry in the virtual channel space limit lookup table indicates respective space limits for each active virtual channel; and
    wherein an entry in the buffer class space limit lookup table indicates respective space limits for each active buffer class.

6. The method of claim 5,
    wherein each entry in the virtual channel space limit lookup table indicates a first amount of the shared space that can be used by all active virtual channels; and
    wherein each entry in the buffer class space limit lookup table indicates a second amount of the shared space that can be used by all active buffer classes.

7. The method of claim 1,
    wherein the input buffer comprises a statically allocated space that is associated with the virtual channel and buffer class associated with the received packet; and
    wherein the shared space in the input buffer is shared among a number of virtual channels or buffer classes.

8. A switch that facilitates dynamic buffer management, the switch comprising:
    an input buffer; and
    an input queues logic block coupled to the input buffer, and to:
        reserve a fixed space of an input buffer for each virtual channel of a physical link;
        determine a virtual channel and buffer class associated with a received packet on the physical link;
        determine one or more active virtual channels;
        determine a virtual channel space limit in a shared space of the input buffer corresponding to the virtual channel associated with the received packet by calculating a total amount of dynamic space in the input buffer available to the active virtual channels and a percentage each of the active virtual channels is allowed to take across all possible active buffer classes combinations;
        determine one or more active buffer classes;
        determine a buffer class space limit in the shared space of the input buffer corresponding to the buffer class associated with the received packet by calculating a total amount of dynamic space in the input buffer available to the active buffer classes and a percentage each of the active buffer classes is allowed to take across all possible active buffer classes combinations; and
        store the received packet in the input buffer subject to the virtual channel space limit and buffer class space limit.

9. The switch of claim 8, wherein the input queues logic block is further to:
    determine that storing the received packet in the input buffer meets a predetermined condition based on the determined virtual channel space limit; and
    initiate credit based flow control with an upstream switch.

10. The switch of claim 8, wherein the input queues logic block is further to:
    determine that storing the received packet in the input buffer meets a predetermined condition based on the determined buffer class space limit; and
    initiate credit based flow control with an upstream switch.

11. The switch of claim 8, further comprising a virtual channel space limit lookup table and a buffer class space limit table;
    wherein while determining the virtual channel space limit, the input queues logic block is further to look up the virtual channel space limit lookup table based on the active virtual channels; and wherein while determining the buffer class space limit, the input queues logic block is further to look up the buffer class space limit lookup table based on the active buffer classes.

12. The switch of claim 11, wherein an entry in the virtual channel space limit lookup table indicates respective space limits for each active virtual channel; and wherein an entry in the buffer class space limit lookup table indicates respective space limits for each active buffer class.

13. The switch of claim 12, wherein each entry in the virtual channel space limit lookup table indicates a first amount of the shared space that can be used by all active virtual channels; and wherein each entry in the buffer class space limit lookup table indicates a second amount of the shared space that can be used by all active buffer classes.

14. The switch of claim 8, wherein the input buffer comprises a statically allocated space that is associated with the virtual channel and buffer class associated with the received packet; and wherein the shared space in the input buffer is shared among a number of virtual channels or buffer classes.

15. A network system, comprising:

a number of interconnected switches, wherein a respective switch comprises:

an input buffer; and an input queues logic block coupled to the input buffer, and to:

reserve a fixed space of the input buffer for each virtual channel of a physical link;

determine a virtual channel and buffer class associated with a received packet on the physical link;

determine one or more active virtual channels;

determine a virtual channel space limit in a shared space in the input buffer corresponding to the virtual channel associated with the received packet by calculating a total amount of dynamic space in the input buffer available to the active virtual channels and a percentage each of the active virtual channels is allowed to take across all possible active buffer classes combinations;

determine one or more active buffer classes;

determine a buffer class space limit in the shared space of the input buffer corresponding to the buffer class associated with the received packet by calculating a total amount of dynamic space in the input buffer available to the active buffer classes and a percentage each of the active buffer classes is allowed to take across all possible active buffer classes combinations; and store the received packet in the input buffer subject to the virtual channel space limit and buffer class space limit, the determination of the one or more active virtual channels and the one or more active buffer classes being based on one of existence of a request in an age queue or having outstanding credits for link partner input buffer space.

16. The network system of claim 15, wherein the input queues logic block is further to:

determine that storing the received packet in the input buffer meets a predetermined condition based on the determined virtual channel space limit; and initiate credit based flow control with an upstream switch.

17. The network system of claim 15, wherein the input queues logic block is further to:

determine that storing the received packet in the input buffer meets a predetermined condition based on the determined buffer class space limit; and initiate credit based flow control with an upstream switch.

18. The network system of claim 15, wherein the respective switch further comprises a virtual channel space limit lookup table and a buffer class space limit table;

wherein while determining the virtual channel space limit, the input queues logic block is further to look up the virtual channel space limit lookup table based on the active virtual channels; and wherein while determining the buffer class space limit, the input queues logic block is further to look up the buffer class space limit lookup table based on the active buffer classes.

19. The network system of claim 18, wherein an entry in the virtual channel space limit lookup table indicates respective space limits for each active virtual channel; and wherein an entry in the buffer class space limit lookup table indicates respective space limits for each active buffer class.

20. The network system of claim 19, wherein each entry in the virtual channel space limit lookup table indicates a first amount of the shared space that can be used by all active virtual channels; and wherein each entry in the buffer class space limit lookup table indicates a second amount of the shared space that can be used by all active buffer classes.

21. The network system of claim 15, wherein the input buffer comprises a statically allocated space that is associated with the virtual channel and buffer class associated with the received packet; and wherein the shared space in the input buffer is shared among a number of virtual channels or buffer classes.

\* \* \* \* \*